US012752652B2

(12) United States Patent
Scapin et al.

(10) Patent No.: US 12,752,652 B2
(45) Date of Patent: Oct. 6, 2026

(54) MOBILE DEVICE, CHARGING STATION, MOBILE SUPPORT, FIXING BRACKET, ACCESSORY, ANTENNA MODULE, RELATED ASSEMBLIES AND ASSOCIATED INSTALLATION METHODS

(71) Applicant: STIGA S.P.A. IN BREVE ANCHE ST. S.P.A., Castelfranco Veneto (IT)

(72) Inventors: Michele Scapin, Cittadella (IT); Carlo Foscaro, Casacorba di Vedelago (IT); Andrea Comin, Follina (IT); Mauro Cecchetto, San Martino di Lupari (IT); Alessandro Morgan, Refrontolo (IT); Matteo Bonilauri, Marostica (IT); Giuliano Fantin, Riese Pio X (IT); Cosimo Scremin, Altivole (IT)

(73) Assignee: STIGA S.P.A. IN BREVE ANCHE ST. S.P.A. (IT)

( * ) Notice: Subject to any disclaimer, the term of this patent is extended or adjusted under 35 U.S.C. 154(b) by 22 days.

(21) Appl. No.: 18/835,065

(22) PCT Filed: Feb. 2, 2023

(86) PCT No.: PCT/IB2023/050928
§ 371 (c)(1),
(2) Date: Aug. 1, 2024

(87) PCT Pub. No.: WO2023/148661
PCT Pub. Date: Aug. 10, 2023

(65) Prior Publication Data

US 2025/0162435 A1 May 22, 2025

(30) Foreign Application Priority Data

Feb. 2, 2022 (IT) ........................ 102022000001823
Feb. 2, 2022 (IT) ........................ 102022000001832
Feb. 2, 2022 (IT) ........................ 102022000001835

(51) Int. Cl.
*B60L 53/30* (2019.01)
*A01D 34/00* (2006.01)
(Continued)

(52) U.S. Cl.
CPC ............... *B60L 53/30* (2019.02); *B60L 53/68* (2019.02); *G01S 19/43* (2013.01); *H01Q 1/22* (2013.01);
(Continued)

(58) Field of Classification Search
CPC ...... B60L 53/30; B60L 53/68; B60L 2200/40; G01S 19/43; G01S 19/44; G01S 19/04;
(Continued)

(56) References Cited

U.S. PATENT DOCUMENTS 5,636,852 A 6/1997 Sistrunk et al.
9,516,806 B2 12/2016 Yamauchi et al.
(Continued)

FOREIGN PATENT DOCUMENTS

CN 105644595 A 6/2016
CN 210047486 U 2/2020
(Continued)

OTHER PUBLICATIONS

Reflector and 2D Lidar Based Autonomous Docking System (Year: 2020).*
(Continued)

*Primary Examiner* — Rexford N Barnie
*Assistant Examiner* — Terrence R Willoughby
(74) *Attorney, Agent, or Firm* — Price Heneveld LLP

(57) ABSTRACT

The invention relates to a mobile support (40) usable for installation operations of a mobile device (2) for land maintenance. The mobile support (40) comprises a gripping
(Continued)

portion (41), movement means (44) and a constraining portion (45) configured to carry an antenna module (10). The mobile support (40) further comprises means configured to simulate at least one encumbrance related to the encumbrance of the mobile device (2) or related to the encumbrance of a payload of the mobile device (2). The invention further relates to a charging station (20) for electrically charging a mobile device (2). A seat configured to house an antenna module (10) is defined in the charging station (20). The casing (11) of the antenna module (10) can be removably constrained to the charging station (20). The invention further relates to an installation method of a mobile device (2) which is based on the RTK technique and which comprises a step of associating a mobile support (40) of an antenna module (10) removably associated with a charging station (20).

14 Claims, 21 Drawing Sheets

(51) Int. Cl.

| | |
|---|---|
| ***A01D 101/00*** | (2006.01) |
| ***B60L 53/68*** | (2019.01) |
| ***G01S 19/43*** | (2010.01) |
| ***H01Q 1/22*** | (2006.01) |

(52) U.S. Cl.
CPC ........ *A01D 34/008* (2013.01); *A01D 2101/00* (2013.01); *B60L 2200/40* (2013.01)

(58) Field of Classification Search
CPC .... H01Q 1/22; A01D 34/008; A01D 2101/00; G05D 1/2246; G05D 1/6484; G05D 2105/15; G05D 2107/23; G05D 2109/10; G05D 1/248; G05D 1/2297; Y02T 10/70; Y02T 10/7072; Y02T 90/12
See application file for complete search history.

(56) References Cited

U.S. PATENT DOCUMENTS

| | | | | |
|---|---|---|---|---|
| 9,538,702 | B2 | 1/2017 | Balutis et al. | |
| 2012/0265391 | A1 | 10/2012 | Letsky | |
| 2019/0110395 | A1 | 4/2019 | Andersson et al. | |
| 2021/0364632 | A1 | 11/2021 | Sagalovich | |
| 2023/0228052 | A1 * | 7/2023 | Mandeville | B05B 12/00 239/754 |
| 2023/0244243 | A1 * | 8/2023 | Lundkvist | G05D 1/0225 701/25 |
| 2024/0260519 | A1 * | 8/2024 | Renner | A01G 25/092 |

FOREIGN PATENT DOCUMENTS

| | | | | |
|---|---|---|---|---|
| CN | 113905283 | | 1/2022 | |
| DE | 1677255 | U | 6/1954 | |
| EP | 3557359 | | 10/2019 | |
| EP | 3412128 | B1 | 5/2021 | |
| EP | 3833177 | B1 | 6/2021 | |
| EP | 4079135 | A1 | 10/2022 | |
| KR | 101399566 | B1 | 5/2014 | |
| KR | 102261791 | B1 * | 6/2021 | G05D 1/0088 |
| WO | 9749528 | A1 | 12/1997 | |
| WO | 2015119264 | | 8/2015 | |
| WO | 2021162840 | | 8/2021 | |

OTHER PUBLICATIONS

Indego Transporter, Deine Heimwerker Community, Oct. 19, 2018, 7 pages.

* cited by examiner

FIG. 14D
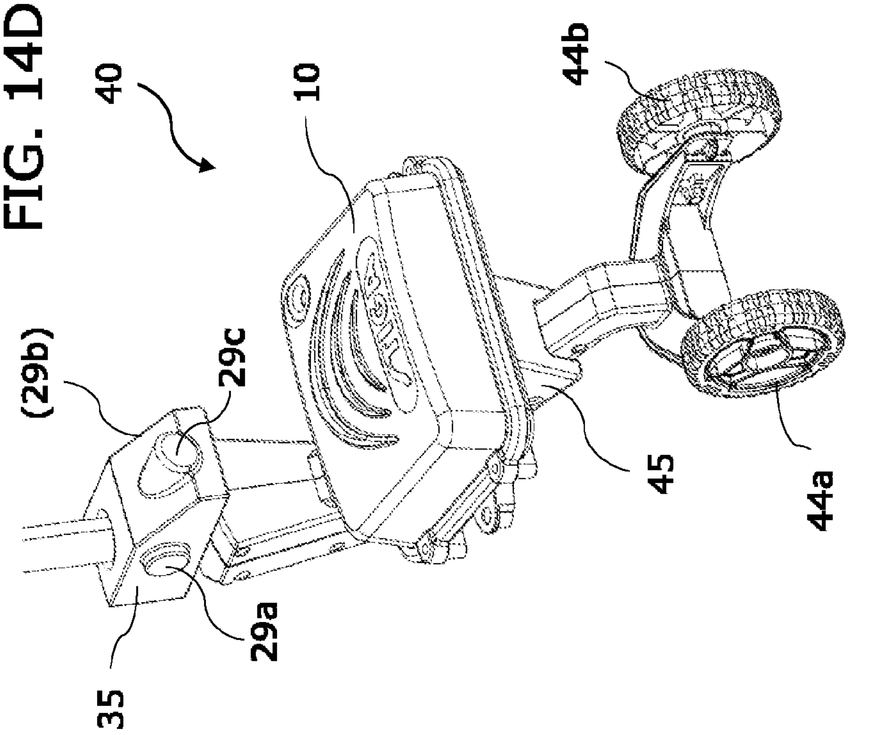
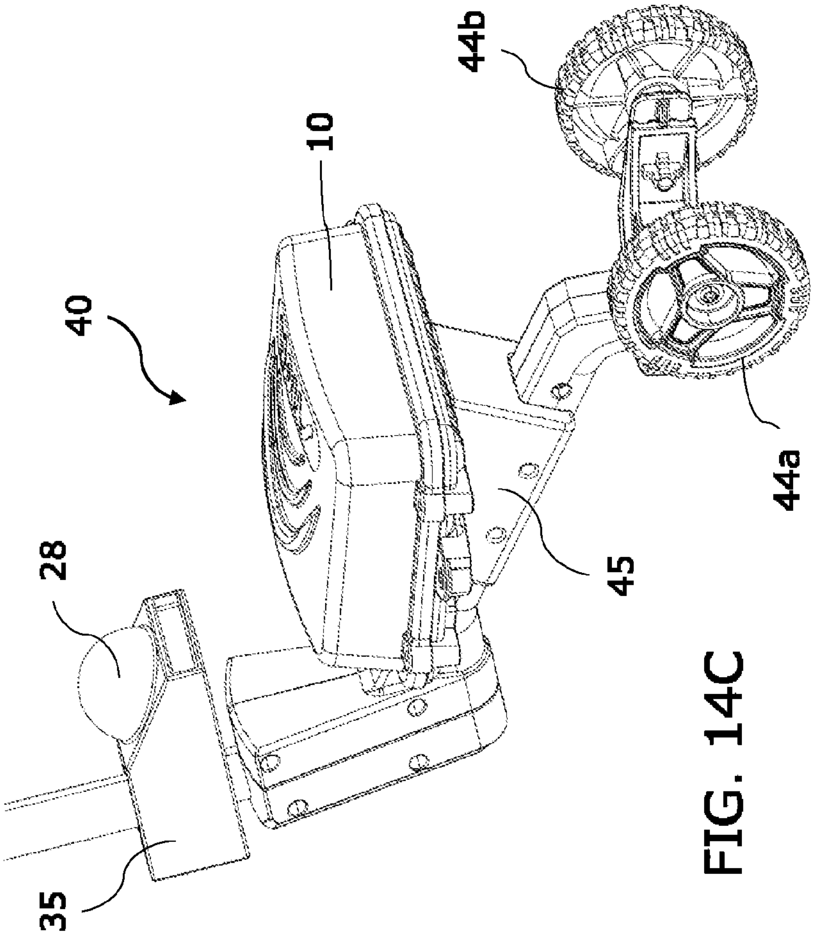
FIG. 14C

MOBILE DEVICE, CHARGING STATION, MOBILE SUPPORT, FIXING BRACKET, ACCESSORY, ANTENNA MODULE, RELATED ASSEMBLIES AND ASSOCIATED INSTALLATION METHODS

FIELD OF THE INVENTION

The present invention relates to an accessory for the movement of a robot lawnmower of the autonomous type. The accessory according to the present invention is configured to be applied to a robot lawnmower of medium and/or small dimensions, so as to be able to record the perimeter of the working area in a more facilitated manner with respect to the solutions currently present in the state of the art.

Furthermore, the present invention relates to a GNSS Global Navigation Satellite System antenna module for the location of mobile devices within a working area, in which the mobile devices are directed to carry out land maintenance operations, for example cutting grass, soil tillage, verification of a state of the turfgrass, or activities in the agricultural field.

The present invention further relates to an electrical charging station for the mobile device, and in which such a charging station has a seat responsible for housing the antenna module.

The present invention further relates to a mobile support which can be controlled by an operator and configured to carry the antenna module. The present invention further relates to an installation method of the mobile device within the working area by means of the aid of the antenna module.

BACKGROUND ART

Various methods are known in the field of agriculture and gardening to define a perimeter of the working area within which a robot can operate. The most common methods are:

1) The burial of a wire which defines the perimeter;
2) The guidance of the robot, by means of a joystick or a mobile application, of the robot thus defining the perimeter by virtue of the movement and recorded positions;
3) The guidance of a robot by means of a handle embedded in the robot itself and collapsible therein, the robot then defining the perimeter by virtue of the movement and recorded positions;
4) The use of a trolley, on which to apply a part detachable from the robot or from the charging base, the robot then defining the perimeter by virtue of the movement and the recorded positions;

EP3557359A1 describes a trolley to which a detachable element can be added from a robot of the autonomous type for the care of turfgrass; in particular it can detach a navigation module adapted to record the positions of the robot. By means of such a trolley, the operator can record a perimeter by pushing the trolley along a perimeter and thus define the virtual perimeter of the working area. This document does not describe an accessory for defining a perimeter, which can be coupled and detached easily and in a short time; this document also has critical issues, such as the fragility of the handle and the low precision which results from having small wheels, which can thus become stuck or encounter difficulties in uneven or not perfectly flat terrain.

EP3833177B1 describes a robot of the autonomous type for the care of turfgrass which includes a telescopic and collapsible handle within the shell of the robot, by means of which the operator can push the robot along a perimeter and thus define the virtual perimeter of the working area. This document does not describe an accessory for defining a perimeter, which can be coupled and detached easily and in a short time; this document also has critical issues, such as the fragility of the handle and the low precision which results from having small wheels, which can thus become stuck or encounter difficulties in uneven or not perfectly flat terrain.

Similarly, U.S. Pat. No. 9,538,702B2 and U.S. Pat. No. 9,516,806B2 disclose an autonomous robot lawnmower which includes a telescopic handle, by means of which the operator can define a perimeter and thus a working area. This document does not describe an accessory for defining a perimeter, which can be coupled and detached easily and in a short time; this document also has critical issues, such as the fragility of the handle and the poor structural strength of the handle, which, having to be adapted to be received inside the robot, can only be small.

Patent EP3412128B1 describes an autonomous-type robot with an extendable handle incorporated to help an operator to define a working area. This document does not describe an accessory for defining a perimeter, which can be coupled and detached easily and in a short time; this document also has critical issues, such as the fragility of the components and the system per se.

It is known in the field of gardening and land maintenance to use satellite geolocation systems adapted to establish the position of a mobile device within the working area, for example in order to allow the mobile device to be self-driving or semi self-driving. In such case a GNSS-Global Navigation Satellite System satellite geolocation detector can be mounted on board the mobile device and provide information about the geographical position of the mobile device.

However, satellite geolocation detectors can ensure limited, and sometimes insufficient, accuracy in the event of self-driving: this entails a significant limitation in the technological field of land maintenance, in which the maintenance operations often require an accuracy in the order of centimetres. In fact, it should be noted that mobile devices in such a technological field very often comprise cutting tools for executing the maintenance operations: consequently, adequate precision in detecting the position of the mobile device is necessary for safety reasons.

The existence of satellite geolocation systems is known in the field of gardening and land maintenance comprising a first GNSS position detector mounted on board the mobile device, and a second GNSS position detector fixed at a certain point: in such a case a control unit can be configured to estimate the position of the mobile device as a function of the position signals of both the first and of the second detector. It should be noted that the estimate of the position of the mobile device, combining the information derived from the first GNSS position detector and the information derived from the second GNSS position detector, is greatly improved. The algorithm used to improve the accuracy of the position estimate, using a fixed reference station, is called “Real Time Kinematics” or “RTK”. Real-time kinematic satellite navigation is a technique used in hydrographic surveys and surveying based on GPS, GLONASS, or Galileo signals where a single reference station provides real-time connections, providing centimetre-level accuracy.

The fixed GNSS position detector, defining the fixed reference station, is commonly constrained to a fixed structure, for example the roof of a house or a pole: the more the fixed GNSS position detector is placed in an open and unobstructed place, the greater the quality of the received satellite signal, consequently resulting in an improvement in the position accuracy.

However, such an RTK configuration is rather rigid, as it requires the definitive sacrifice of a GNSS position detector to define the fixed detection station, and to ensure carrying a power socket to the reference station, for example on the roof of the house.

Problems are also known in the field of gardening and land maintenance related to the definition of the boundary of the working area, especially when defined in terms of geographical coordinates, for example obtained from a satellite detector. In fact, a low precision in detecting the coordinates representative of the perimeter of the working area can determine a safety risk, such that the mobile device, when in one of its self-driving conditions, could cross the real perimeter of the working area. Therefore, a high accuracy of the mapping of the working area perimeter is essential for greater safety: however, the current systems belonging to the state of the art do not allow to obtain a high precision in the definition of the working area, or have high costs not compatible with the market.

CN113905283A discloses a charging base for a self-driving robot. The charging base comprises a charging station, a reference station for an RTK positioning system, a first installation platform for the RTK station and a second installation platform for the RTK station. The first platform is associated with the charging station, whereas the second platform is distinct from the charging station and allows height adjustments of the RTK station.

EP3557359A1 describes a push trolley, to which it is possible to apply an element which is separable from an autonomous-type robot for the care of a lawn. In particular, the element which is separable from the robot and applicable to the trolley is a navigation module suitable for detecting the positions of the robot. By means of such a trolley, an operator can record a virtual map of a working area for the robot by moving the trolley with the navigation module along the perimeter of the working area.

US2021/0364632A1 describes a system for navigation in an external environment of an autonomous vehicle, the system including a GNSS antenna and a SLAM component. The GNSS antenna is in connection with a base station and with at least one satellite. The system also includes a mobile device associated with an operator.

Further solutions known in the technical field of the invention are disclosed in US2012/0265391A1, WO2015/119264A1 and US2021/0162840A1.

OBJECTS OF THE INVENTION

The present invention has the objective of providing an accessory which allows the movement of an autonomous robot along a perimeter, so as to allow the definition and recording of a working area within which the device can subsequently operate.

Furthermore, the present invention has the objective of providing a method which allows the movement of an autonomous robot along a perimeter, so as to allow the definition and recording of a working area within which the device can subsequently operate.

Furthermore, the present invention has the objective of providing an assembly comprising an autonomous robot and an accessory, which allows the movement of an autonomous robot along a perimeter, so as to allow the definition and recording of a working area within which the device can subsequently operate.

Furthermore, the present invention has the objective of providing an accessory which allows the movement of an autonomous robot along a perimeter, so as to allow the definition and recording of a working area in a more precise way with respect to the known art.

Furthermore, the present invention has the objective of providing an accessory which allows the movement of an autonomous robot along a perimeter, so as to allow the definition and recording of a working area, said device being easily couplable/detachable.

Furthermore, the present invention has the objective of providing an accessory which allows the movement of an autonomous robot along a perimeter, so as to allow the definition and recording of a working area, said device being more robust with respect to the solutions of the known art.

Therefore, the object of the present invention is to solve at least one of the drawbacks and/or limitations of the previous solutions.

A first objective is to make the RTK configuration more flexible, whereby the position detector of the reference station can possibly be used for other purposes.

A further objective is to provide a solution to the problem of positioning the position detector of the reference station and its power supply.

A further objective is to ensure an adequate reception of the satellite signal for the reference station.

A further objective is to facilitate the movement of the reference station if the satellite reception is not sufficient.

A further objective is to protect the reference station from atmospheric agents.

A further objective is to maintain the accuracy provided by the RTK configuration and to reduce the associated costs.

A further objective is to provide a mobile support adapted to facilitate the operations of defining the working area, for example the perimeter of the working area.

A further objective is to provide a method that allows the definition of the working area, for example the perimeter of the working area.

These and other objects, which will appear more clearly from the following description, are substantially achieved by a GNSS antenna module defining the reference station and a charging station in accordance with one or more of the appended claims and/or the following aspects.

Aspects of the Invention

A first aspect relates to an accessory (9) configured for use in combination with a self-driving mobile device (2) for the maintenance of land, said mobile device (2) being in particular a robot lawnmower and in particular comprising a payload such as a cutting blade (7), said accessory (9) being notably usable by an operator to execute land maintenance operations by means of said mobile device (2) and/or to execute an installation of said mobile device and/or to define a working area (1) for said mobile device (2) and/or to move said mobile device (2), wherein said accessory (9) comprises:

a) a support portion (72) configured to support said mobile device (2) or part of said mobile device (2), b) movement means configured to allow an advancement and/or a backward movement, notably an advancement and/or a backward movement by pushing or dragging, of said accessory (9) maintaining a contact with the ground and c) a gripping portion configured to allow an operator to grip and/or push or drag said accessory (9).

A second aspect in accordance with any one of the preceding aspects, in which said support portion (72) comprises engagement means configured to establish a constraint condition between said mobile device (2) and said accessory (9), in particular said constraint condition being a temporary constraint condition which can be established and/or removed by means of manually executable manoeuvres.

A third aspect in accordance with any one of the preceding aspects, in which said engagement means comprise a bulkhead (78) extending away from a support surface of said support portion (72), optionally in which said support surface is a flat surface and said bulkhead (8) extends along a direction substantially orthogonal to said support surface.

A fourth aspect in accordance with any one of the preceding aspects, in which said engagement means comprise at least one among:

a) a removable interlocking system;

b) a magnetic coupling;

c) a quick-coupling/release system;

d) a screw coupling.

A fifth aspect in accordance with any one of the preceding aspects, in which an opening (79) is obtained in said support portion (72), said opening (79) being configured to facilitate manoeuvres of said mobile device (2) adapted to establish and/or remove said constraint condition.

A sixth aspect in accordance with any one of the preceding aspects, in which considering a front edge of said support portion (72), the distance between said opening (79) and said front edge is greater than the distance between said engagement means and said front edge, in particular in which the distance between said opening (79) and said front edge is greater than the distance between said bulkhead (78) and said front edge.

A seventh aspect in accordance with any one of the preceding aspects, in which said movement means comprise a first wheel (71*a*) and a second wheel (71*b*) movable by rotation about a same rotation axis and axially spaced from each other, and in which said wheels (71*a*, 71*b*) can rotate:

a) in the same rotation direction, allowing the advancement or backward movement of said accessory (9) and/or b) in opposite rotation directions, allowing the rotation in place of said accessory (9).

An eighth aspect in accordance with any one of the preceding aspects, in which said movement means (5) further comprise a transmission axis (73), in which said first wheel (71*a*) and said second wheel (71*b*) are connected to each other by means of said transmission axis (73), said transmission axis (73) being able to have substantially constant extension or variable extension.

A ninth aspect in accordance with any one of the preceding aspects, in which said movement means are configured to alternatively and/or jointly allow:

a) an advancement and/or a backward movement of said accessory (9) and/or b) a definition and/or simulation of at least one encumbrance.

A tenth aspect in accordance with any one of the preceding aspects, in which adjustment means are comprised in said movement means or are associated with said movement means, said adjustment means being configured to adjust the distance between said first wheel (71*a*) and said second wheel (71*b*), in particular the distance in the axial direction between said first wheel (71*a*) and said second wheel (71*b*), optionally in which said adjustment means are configured such that between said first wheel (71*a*) and said second wheel (71*b*) there is a translational degree of freedom.

An eleventh aspect in accordance with any one of the preceding aspects, in which said transmission axis has variable extension and comprises at least:

a) a first rod (73*a*) applied to said first wheel (71*a*), b) a second rod (73*b*) applied to said second wheel (71*b*), c) a connection joint between said first rod (73*a*) and said second rod (73*b*) or an intermediate rod (73*c*) in telescopic coupling with said first rod (73*a*) and with said second rod (73*b*), optionally in which said connection joint (11) is configured to allow an adjustment of the extension of said transmission axis (10) along the width of said accessory (9), so that the operator can define and/or simulate a plurality of encumbrances in width, among which at least:

a) an encumbrance in width of said mobile device (2) adjacent to a boundary of said working area (1), for example a wall, not passable by said mobile device (2), and b) an encumbrance in width of a cutting blade of said mobile device (2) adjacent to a boundary of said working area (1), for example a pavement, passable by said mobile device (2).

A twelfth aspect in accordance with any one of the preceding aspects, in which locking means are comprised in said adjustment means or associated with said adjustment means, said fixing means being configured to selectively inhibit variations in the distance between said first wheel (71*a*) and said second wheel (71*b*) and/or to selectively suppress said translational degree of freedom between said first wheel (71*a*) and said second wheel (71*b*), optionally in which said fixing means comprise at least one fixing device, such as a clip or a pin, in particular a first clip (89*a*) or a first pin having effect on said first rod (73*a*) and a second clip (89*b*) or a second pin having effect on said second rod (73*b*).

A thirteenth aspect in accordance with any one of the preceding aspects, in which said movement means and/or said adjustment means are intended to define and/or simulate an encumbrance, in particular an encumbrance in width, greater than the encumbrance of said mobile device (2) or greater than the encumbrance of said at least one payload of said mobile device (2).

A fourteenth aspect in accordance with any one of the preceding aspects, in which said movement means and/or said adjustment means are intended to define and/or simulate a safety encumbrance in the context of a subsequent navigation of said mobile device (2), in particular near a boundary section of said working area (1), such as a boundary section formed by a wall or a hedge or a tree trunk, not passable by said mobile device (2) and potentially harmful for said mobile device (2) in the event of a collision and/or rubbing, and/or such as a boundary section separating said working area (1) from a road or a pool, whereby a possible encroachment of said mobile device (2) would cause the onset of a situation of potential danger to people and/or such as a boundary section at which said mobile device (2) is expected to perform, notably in a subsequent operating step, at least one manoeuvre of the type of an abrupt change in its advancement direction.

A fifteenth aspect in accordance with any one of the preceding aspects, in which said support portion (72) is translatable relative to said movement means and/or rotatable relative to said movement means.

A sixteenth aspect in accordance with any one of the preceding aspects, in which said support portion (72) has a translational degree of freedom with respect to said transmission axis (73), in particular with sliding direction substantially coincident or parallel to the extension direction of said transmission axis (73) and/or with excursion in the space defined between said first wheel (71*a*) and said second wheel (31*b*), optionally in which said accessory (9) further comprises a locking system configured to allow an operator to lock said support portion (72) in a desired position relative to said transmission axis (73), said locking system (13) being able to comprise a removable interlocking system and/or a magnetic coupling and/or a quick-coupling/release system and/or a screw coupling.

A seventeenth aspect in accordance with any one of the preceding aspects, further comprising a handlebar (75) extending away from said support portion (72), in which said gripping portion belongs to said handlebar (75), in particular in which said support portion (72) extends from an end region of said portion of said support portion (72) bordering said movement means, said end region being notably close to an edge of said support portion (72) opposite said front edge.

An eighteenth aspect in accordance with any one of the preceding aspects, in which said handlebar (75) comprises at least one longitudinal rod extending between said gripping portion and said support portion (72) being able to have substantially constant or variable size, said handlebar (75) comprising at least a first rod, a second rod and an adjustment joint, such that said first rod and said second rod define in combination the longitudinal extension of said handlebar (75) and/or in which said adjustment joint is configured to allow an adjustment of the longitudinal extension of said handlebar (75).

A nineteenth aspect in accordance with any one of the preceding aspects, further comprising at least one joint for adjusting an inclination, said joint being interposed between said handlebar (75) and said support portion (72), in which said joint is configured to allow an operator to vary the orientation of said handlebar (75) with respect to said support portion (72) between at least a first orientation and at least a second orientation.

A twentieth aspect in accordance with any one of the preceding aspects, further comprising at least one lateral template adjustable in extension along a width dimension of the accessory (9), said lateral template being configured to define and/or simulate at least one encumbrance in width, in particular to define and/or simulate:

a) an encumbrance in width of said mobile device (2) adjacent to a boundary of said working area (1), for example a wall, not passable by said mobile device (2) and/or b) an encumbrance in width of said payload of said mobile device (2) adjacent to a boundary of said working area (1), for example a pavement, passable by said mobile device (2).

A twenty-first aspect in accordance with any one of the preceding aspects, in which said lateral template is applied to said support portion (72) and/or in which said lateral template comprises a bar, a case configured to slidably house said bar and an adjustment organ of the position of said bar relative to said case and/or in which said accessory (9) comprises a first lateral template and a second lateral template protruding respectively from a left side and from a right side of said accessory (9).

A twenty-second aspect in accordance with any one of the preceding aspects, further comprising a support structure (74) notably applied to said handlebar (75) at or near the gripping portion and configured to constrain a remote device (90), for example a smartphone or a tablet, to said accessory (9).

A twenty-third aspect in accordance with any one of the preceding aspects, in which said support structure (74) is constrained to said handlebar (75), in particular in which the constraint between said support structure (74) and said handlebar (75) is configured to allow an adjustment of the position of said support structure (74) in the width direction of said handlebar (75).

A twenty-fourth aspect in accordance with any one of the preceding aspects, in which said support structure (74) is oriented so that said remote device (90) faces the operator during a working condition of said accessory (9) and/or in which said accessory (9) comprises means for adjusting the orientation of said support structure (74) with respect to said gripping portion and/or in which said support structure (74) comprises a housing shell of said remote device (90), said shell comprising a body and a plurality of retaining walls, said retaining walls extending from opposite ends of said body, optionally in which, having taken a first axis of symmetry of said casing and a second axis of symmetry of said shell which are orthogonal to each other, said body and said retaining walls are configured to exhibit a first resilience in the direction of said first axis of symmetry and a second resilience in the direction of said second axis of symmetry, said first resilience and said second resilience being different from each other, and/or to exhibit a first bending strength in the event of applying a bending moment around said first axis of symmetry and a second bending strength in the event of applying a bending moment around said second axis of symmetry, said first bending strength and said second bending strength being different from each other.

A twenty-fifth aspect comprising:

i) an accessory (9) according to one of the preceding claims and ii) a self-driving mobile device (2) for the maintenance of land, said mobile device (2) being in particular a robot lawnmower and in particular comprising a payload such as a cutting blade (7), wherein said system (8) exhibits at least one assembly configuration, in which said mobile device (2) or part of said mobile device (2) is supported on said support portion (72) and/or is supported by said support portion (72), so that an advancement and/or a backward movement of said accessory (9), notably an advancement and/or a backward movement pushing or dragging said accessory (9), results in a simultaneous and preferably equivalent advancement and/or backward movement of said mobile device (2).

A twenty-sixth aspect in accordance with any one of the preceding aspects, in which the mobile device (2) comprises:

a) at least one idle wheel, in particular a first front idle wheel (6*c*) and optionally also a second front idle wheel (6*d*) and/or b) at least one drive wheel, in particular a first rear drive wheel (6A) and a second rear drive wheel (6*b*), in which, in said assembly configuration of said system (8), said at least one idle wheel is in contact with the ground and is kept in contact with the ground in the event of an advancement and/or a backward movement of said accessory (9), in particular in said assembly configuration of said system (8) said first front idle wheel (6*c*) and said second front idle wheel (6*d*) both being in contact with the ground and both being kept in contact with the ground in the event of an advancement and/or a backward movement of said accessory (9), and in which, in said assembly configuration of said system (8), said at least one drive wheel is raised with respect to the ground and is kept raised with respect to the ground in the event of an advancement and/or a backward movement of said accessory (9), in particular in said assembly configuration of said system (8) said first rear drive wheel (6A) and said second rear drive wheel (6*b*) both being raised with respect to the ground and both being kept raised with respect to the ground in the event of an advancement and/or a backward movement of said accessory (9).

A twenty-seventh aspect in accordance with any one of the preceding aspects, in which the movement means of said accessory (9) comprise at least one wheel having a diameter greater than said at least one drive wheel of said mobile device (2), in particular said first wheel (71*a*) of said accessory (9) having a diameter greater than said first rear drive wheel (6A) of said mobile device (2) and said second wheel (71*b*) of said accessory having a diameter greater than said second rear drive wheel (19) of said mobile device.

A twenty-eighth aspect in accordance with any one of the preceding aspects, in which said support portion (72) of said accessory (9) has, in the direction orthogonal to that of advancement and/or backward movement of said accessory (9), a smaller extension with respect to the distance between said first rear drive wheel (6A) and said second rear drive wheel (6*b*) of said mobile device (2), so as to allow said first rear drive wheel (6A) and said second rear drive wheel (6*b*) of said mobile device (2) to be positioned outside said support portion (72) of said accessory (9) in said assembly configuration of said system (8).

A twenty-ninth aspect in accordance with any one of the preceding aspects, in which, in said assembly configuration of said system (8), there is a constraint condition between said accessory (9) and said mobile device (2), said constraint condition being established by the engagement means of said accessory (9).

A thirtieth aspect in accordance with any one of the preceding aspects, in which said mobile device (2) comprises a shell (18) defining an encumbrance of said mobile device (2) and containing a plurality of functional elements of said mobile device (2), said shell (18) being configured to expose, at the face of said mobile device (2) facing the ground:

a) said payload, in particular said cutting blade (7), and
b) a lifting and/or transport handle of said mobile device (2).

A thirty-first aspect in accordance with any one of the preceding aspects, in which said lifting and/or transport handle comprises:

a) a bar (70) graspable by an operator and
b) a pocket (80) adjacent to said bar (70) to allow the insertion of an operator's hand so as to grasp the bar (70).

A thirty-second aspect in accordance with any one of the preceding aspects, in which, in said assembly configuration of said system (8), said bulkhead (78) of said accessory (9) is housed in said pocket (80) of said lifting and/or transport handle of said mobile device (2).

A thirty-third aspect in accordance with any one of the preceding aspects, in which, in said assembly configuration of said system (8), said bar (70) of said lifting and/or transport handle of said mobile device (2) overlaps said opening (79) of said support portion (72) of said accessory (9), so that said bar (70) is allowed to be grasped by an operator when said system (8) is in said assembly configuration, in particular so as to lift said mobile device (2) and suppress said constraint condition between said accessory (9) and said mobile device (2).

A thirty-fourth aspect in accordance with any one of the preceding aspects, in which, in said assembly configuration of said system (8), the face of said mobile device (2) facing the ground in use is slightly inclined with respect to the flat support surface of said support portion (72) of said accessory (9).

A thirty-fifth aspect in accordance with any one of the preceding aspects, in which, in said assembly configuration of said system (8), the housing of said bulkhead (78) of said accessory (9) in said pocket (80) of said lifting and/or transport handle of said mobile device (2) is a housing with clearance at least in the direction of advancement and/or backward movement of said accessory (9).

A thirty-sixth aspect in accordance with any one of the preceding aspects, in which, in said assembly configuration of said system (8), the housing of said bulkhead (78) of said accessory (9) in said pocket (80) of said lifting and/or transport handle of said mobile device (2) is a housing with clearance at least in the direction of advancement and/or backward movement of said accessory (9).

A thirty-seventh aspect in accordance with any one of the preceding aspects, in which, in said assembly configuration of said system (8), said payload, in particular said cutting blade (7), of said mobile device (2) does not overlap said support portion (72) of said accessory (9).

A thirty-eighth aspect in accordance with any one of the preceding aspects, said mobile device (2) further comprising first drive means of said at least one drive wheel, in particular of said first rear drive wheel (6A) and of said second rear drive wheel (6*b*), and second drive means of said payload, in particular said cutting blade (7), said first drive means and said second drive means being able to comprise dedicated electric motors or a shared electric motor, in which said mobile device (2) is configured to automatically deactivate said first drive means and optionally to automatically activate said second drive means when said system (8) is in said assembly configuration.

A thirty-ninth aspect in accordance with any one of the preceding aspects, in which said gripping portion of said accessory (9) is configured to allow an operator to impart, by means of an impulsive thrust of said accessory (9) towards said mobile device (2), said impulsive thrust generating a force capable of lifting a portion of said mobile device (2) from the ground such as to establish said constraint condition between said accessory (9) and said mobile device (2), in particular such as to cause an insertion of said bulkhead (78) of said accessory (9) in said pocket (80) of said lifting and/or transport handle of said mobile device (2).

A fortieth aspect in accordance with any one of the preceding aspects, said mobile device (2) further comprising a communication node (4), said communication node (4) being configured to allow the transmission and/or reception of data and/or information on a communication network, said communication network being a local area network and/or a remote network, in which said system (8) further comprises a remote device (91) such as a smartphone or a tablet, said remote device (91) being operatively connected to said mobile device (2) and being able to be supported by said support structure (74) of said accessory (9) when said system (8) is in said assembly configuration, optionally in which said system (8) further comprises a remote infrastructure (90) such as a server or a cloud, said remote infrastructure (90) being operatively connected to said remote device (91) and also optionally to said mobile device (2).

A forty-first aspect in accordance with any one of the preceding aspects, said mobile device (2) further comprising at least one on-board rechargeable battery and a first member of a releasable-type connection system, in particular a connection socket (81) or a connection head, said system (8) further comprising a charging station (20), said charging station (20) comprising a charging device and a second member of said releasable-type connection system, the connection between said first member and said second member allowing said at least one on-board battery of said mobile device (2) to be charged by said charging device of said charging station (20).

A forty-second aspect in accordance with any one of the preceding aspects, in which said mobile device (2) comprises a GNSS locator (4) and in which said charging station (20) comprises a GNSS antenna module, in which said GNSS antenna module is configured to serve as a reference station for said GNSS locator (4) for the purposes of a navigation of said mobile device (2) according to the RTK algorithm.

A forty-third aspect comprising a method for maintaining a working area (1) by means of a mobile device (2) for land maintenance, said mobile device (2) being in particular a robot lawnmower and comprising in particular a payload such as a cutting blade (7), wherein said mobile device (2) is capable of operating at least according to a first operating mode and a second operating mode, said first operating mode being a self-driving mode and said second operating mode being a manually-driven mode, wherein, in said second operating mode, said mobile device (2) is associated with an accessory (9) and/or supported by an accessory (9) and/or constrained to an accessory (9), said accessory (9) comprising:

a) a support portion (72) configured to support said mobile device (2) or part of said mobile device (2), b) movement means configured to allow an advancement and/or a backward movement, notably an advancement and/or a backward movement by pushing or dragging, of said accessory (9) maintaining a contact with the ground and c) a gripping portion configured to allow an operator to grip and/or push or drag said accessory (9), wherein, in said second operating mode, said mobile device (2) or part of said mobile device (2) is supported on said support portion (72) and/or is supported by said support portion (72), so that an advancement and/or a backward movement of said accessory (9), notably an advancement and/or a backward movement pushing or dragging said accessory (9), results in a simultaneous and preferably equivalent advancement and/or backward movement of said mobile device (2), wherein said working area (1) comprises at least a first region and a second region, said first region being a region of said working area (1) deemed relatively safe and/or a region relatively distant from a boundary of said working area (1), said second region being a region of said working area (1) deemed relatively critical and/or a region relatively close to a boundary of said working area (1), wherein the maintenance method comprises the steps of:

i) maintaining said first region, said mobile device (2) operating in said first region according to said first operating mode, and ii) maintaining said second region, said mobile device (2) operating in said second region according to said second operating mode.

A forty-fourth aspect comprising a method for defining a working area (1) for a mobile device (2) for land maintenance, said mobile device (2) being in particular a robot lawnmower and comprising in particular a payload such as a cutting blade (7), the installation method comprising the steps of:

i) arranging at least one mobile device (2), said mobile device (2) comprising a GNSS locator (4), ii) arranging an accessory (9) comprising:

a) a support portion (72) configured to support said mobile device (2) or part of said mobile device (2), b) movement means configured to allow an advancement and/or a backward movement, notably an advancement and/or a backward movement by pushing or dragging, of said accessory (9) maintaining a contact with the ground and c) a gripping portion configured to allow an operator to grip and/or push or drag said accessory (9), iii) forming an assembly between said mobile device (2) and said accessory (9), in said assembly said mobile device (2) or part of said mobile device (2) being supported on said support portion (72) of said accessory (9) and/or being supported by said support portion (72) of said accessory (9), so that an advancement and/or a backward movement of said accessory (9), notably an advancement and/or a backward movement by pushing or dragging said accessory (9), determines a simultaneous and preferably equivalent advancement and/or backward movement of said mobile device (2), iv) manually moving said assembly at least along a path intended to act as a boundary of said working area (1), v) detecting, during the movement of said assembly along said path, at least a first position signal, said first position signal being a position signal emitted and/or generated by said GNSS locator (4) of said mobile device (2), vi) deriving the geographical coordinates of a plurality of points of said path at least based on said first position signal; and vii) executing a mapping of said working area (1) starting from said geographical coordinates.

A forty-fifth aspect in accordance with any one of the preceding aspects, said method implementing an RTK algorithm, in which:

in said step i), an antenna module (10) is arranged together with said mobile device (2), optionally wherein said antenna module (10) is the antenna module of a charging station (20) for mobile devices for land maintenance, in particular for robot lawnmowers, in said step iv), said antenna module (10) is maintained in a fixed position, in said step v), a second position signal is detected simultaneously with said first position signal, configured to execute charging operations of said mobile device (2), said second position signal being a position signal emitted and/or generated by said antenna module (10) and in said step vi), the geographical coordinates of said plurality of points of said path are obtained based on said first position signal and based on said second position signal.

A forty-sixth aspect comprising an installation method (300) comprising at least the following steps:

arranging a mobile support (1) in accordance with any one of the preceding claims;

arranging a mobile device (2), constraining said mobile device (2) to the constraint system (7) of the mobile support (1), applying a force to said gripping portion (3) so as to allow lifting said at least one rear drive wheel (19) of said mobile device (2) from the ground, so that said at least one front idle wheel (20) of said mobile device (1) is in contact with the ground, moving the mobile support (1) along a perimeter of said working area (100) and/or one or more boundary lines delimiting said working area (100) and/or at one or more obstacles of said working area (100), f- defining, as a function of at least the detected position of the mobile device (2) during said movement, a virtual perimeter representative of said perimeter and/or one or more virtual boundary lines representative of said one or more boundary lines and/or one or more virtual obstacles representative of said one or more obstacles and in which the method optionally comprises the steps of:

sending said perimeter and/or said one or more virtual boundary lines to a remote device (200), for example a smartphone, a tablet or a computer and displaying, by means of a virtual map, said virtual perimeter and/or said one or more virtual boundary lines of said working area (100), for example on a screen of a remote device (200), in particular in which said step of displaying the virtual map is substantially contextual to the step of moving said mobile device (2) along a perimeter of said working area (100) and/or one or more boundary lines delimiting said working area (100) and/or at one or more obstacles of said working area (100).

conveying at least one electrical signal carrying at least one piece of information about the existence of at least one collision condition with an obstacle and/or about the existence of at least one condition of proximity to an obstacle, said information being detected by at least one obstacle and/or impact sensor, said obstacle and/or impact sensor being of electronic or electromechanical type and being configured to detect a collision condition with an obstacle and/or proximity to an obstacle, for example by means of a switching of the state of an electrical contact integrated in said obstacle and/or impact sensor; in which said obstacle and/or impact sensor can be alternatively integrated in the mobile support (1) and/or in the mobile device (2).

conveying at least one electrical signal carrying at least one piece of information about the presence of an obstacle and/or the distance between a possible obstacle and at least one contactless-type sensor, said contactless-type sensor being able to comprise: an optical sensor or an array of optical sensors and/or a video camera and/or a radio frequency sensor or an array of radio frequency sensors and/or a time-of-flight sensor and/or an inductive sensor or a capacitive sensor and/or a magnetic sensor and/or an ultrasonic sensor and/or a radar sensor and/or a lidar sensor; in which said contactless-type sensor can be alternatively integrated in the mobile support (1) and/or in the mobile device (2).

A forty-seventh aspect comprising a maintenance method (400) comprising at least the following steps:

arranging a mobile support (1) in accordance with any one of the preceding claims;

arranging a mobile device (2), constraining said mobile device (2) to the constraint system (7) of the mobile support (1), applying a force to said gripping portion (3) so as to allow lifting said at least one rear drive wheel (19) of said mobile device (2) from the ground, so that said at least one front idle wheel (20) of said mobile device (1) is in contact with the ground, moving said mobile support (1) along a perimeter of said working area (100) and/or inside said working area (100) and/or outside said working area (100), so that said mobile device (2) can execute operations for the maintenance and care of the turfgrass.

Charging Station and Antenna Module Assembly 100

A forty-eighth aspect in accordance with any one of the preceding aspects, an assembly (100) is included comprising:

a charging station (20) configured to electrically charge a mobile device (2) adapted to execute land maintenance operations, said charging station (20) comprising:

at least one connector configured to establish an electrical connection between said charging station (20) and a power supply network;

at least one charging system (26) configured to charge a battery of the mobile device (2);

an antenna module (10) comprising:

a casing (11) defining a containment volume;

a satellite position locator (12) housed in said containment volume and configured to emit a position signal representative of the position of said antenna module (10), in particular of the geolocation, in the form of geographical coordinates, of said antenna module (10);

a transmitter (14) housed in said containment volume and configured to transmit information, in particular position information of the antenna module, remotely through a communication network;

a control unit (15) housed in said containment volume and operatively connected to said satellite locator (12) and to said transmitter (14), said control unit (15) being configured at least for:

receiving said position signal from the antenna module (10);

generating at least one piece of information related to the position of the antenna module (10) based on said position signal; and commanding the transmitter (14) to remotely transmit said at least one piece of information related to the position of the antenna module (10).

Installation Method 400 by Means of Mobile Device 2

A forty-ninth aspect relates to an installation method (400, 500) for defining a working area (1) within which a mobile device (2) is configured to execute land maintenance operations, said installation method comprising the steps of:

arranging an antenna module (10) comprising:

a casing (11) defining a containment volume;

a satellite position locator (12) housed in said container volume and configured to emit a position signal representative of the position of said antenna module (10), in particular of the geolocation, in the form of geographical coordinates, of said antenna module (10);

a transmitter (14) housed in said containment volume and configured to transmit information, in particular at least one piece of position information of the antenna module (10), remotely through a communication network;

a control unit (15) housed in said inner containment volume and operatively connected to said satellite locator (12) and to said transmitter (14), said control unit (15) being configured at least for:

receiving said position signal of the antenna module (10);

generating at least one piece of information related to the position of the antenna module (10) based on said position signal, commanding the transmitter (14) to remotely transmit said at least one piece of information related to the position of the antenna module (10);

maintaining said antenna module (10) in a substantially fixed position;

arranging at least one mobile device (2) adapted to execute land maintenance operations within the working area (1), said mobile device (2) comprising:

a respective satellite position locator (3) configured to emit a position signal representative of the position of said at least one mobile device (2), in particular of the geolocation, in the form of geographical coordinates, of said at least one mobile device (2);

a remote communication system (4), in particular comprising a receiver or a transceiver (14), and configured to transmit information, in particular at least one piece of position information of the mobile device (2), remotely through a communication network;

an on-board controller (5) operatively connected to said satellite locator (3) of the mobile device and to said communication system (4), said on-board controller (5) being notably configured at least for:

receiving said position signal from the mobile device (2);

generating at least one piece of information related to the position of the mobile device (2) based on said position signal; and commanding the communication system (4) to remotely transmit said at least one piece of information related to the position of the mobile device (2), moving the mobile device (2) along a perimeter (8*a*) of the working area (1) and/or one or more boundary lines delimiting the working area (1) and/or at one or more obstacles (8*b*) in the working area (1);

executing, during said movement, an adjustment procedure (50) of the position of the mobile device (2), said adjustment procedure (50) comprising the step of calculating a correct position of the mobile device (2) as a function:

of a position signal of the antenna module (10) and of a position signal of the mobile device (2), defining, as a function of said correct position of the mobile device, a virtual perimeter representative of said perimeter (8*a*) and/or one or more virtual boundary lines representative of said one or more boundary lines and/or one or more virtual obstacles (8*b*) representative of said one or more obstacles (8*b*), in particular said virtual perimeter and/or said one or more virtual boundary lines comprising geographical coordinates representative of said perimeter (8*a*) of the working area (1) and/or of said one or more boundary lines of the working area (1), optionally wherein the method further comprises the steps of:

sending said perimeter (8*a*) and/or said one or more virtual boundary lines to a remote device (90), for example a smartphone, a tablet or a computer and displaying, by means of a virtual map, said virtual perimeter and/or said one or more virtual boundary lines of the working area (1), for example on a screen of the remote device (90).

Mobile Support (40)

A fiftieth aspect relates to a mobile support (40), said mobile support (40) being usable in particular for defining a working area (1) for a mobile device (2) adapted to execute land maintenance operations, in which said mobile support (40) comprises:

a gripping portion (41) configured to allow the gripping of an operator, and a bottom portion (43), a longitudinally extended handlebar (75) (42) interposed in connection between said gripping portion (41) and said bottom portion (43);

movement means (44), in particular one or more idle wheels movable by rotation, constrained to the bottom portion (43) of the mobile support (40) and configured to allow, during a use condition of the mobile support (40), an advancement of said mobile support (40) keeping in contact with the ground, said movement means (44) being configured to support the mobile support (40), at least one constraining portion (45) arranged at the bottom portion (43) of the mobile support (40) and configured to carry an antenna module (10).

Installation Method 500 by Means of Mobile Support 40

A fifty-first aspect relates to an installation method (500) comprising at least the following steps:

arranging a mobile support (40) in accordance with any one of claims 1 to 12;

arranging an antenna module (10);

constraining said antenna module (10) to the constraining portion (45) of the mobile support (40);

moving the mobile support (40) along a perimeter (8*a*) of the working area (1) and/or one or more boundary lines delimiting the working area (1) and/or at one or more obstacles (8*b*) in the working area (1) detecting the position signal of the antenna module (10) emitted during said movement of the support (40);

defining, as a function of at least the detected position of the antenna module (10) during said movement, a virtual perimeter representative of said perimeter (8*a*) and/or one or more virtual boundary lines representative of said one or more boundary lines and/or one or more virtual obstacles (8*b*) representative of said one or more obstacles (8*b*), optionally wherein the method further comprises the steps of:

sending said perimeter (8*a*) and/or said one or more virtual boundary lines to a remote device (90), for example a smartphone, a tablet or a computer and displaying, by means of a virtual map, said virtual perimeter and/or said one or more virtual boundary lines of the working area (1), for example on a screen of a remote device (90), in particular in which said step of displaying the virtual map being substantially contextual to the step of moving the mobile device (2) along a perimeter (8*a*) of the working area (1) and/or one or more boundary lines delimiting the working area (1) and/or at one or more obstacles (8*b*) in the working area (1).

Installation Method 400 by Means of a Mobile Device 2 and Correction Procedure A fifty-second aspect relates to an installation method (400, 500) intended for the definition of a working area (1) within which a mobile device (2) is configured to execute maintenance operations, said installation method comprising the steps of:

arranging an antenna module (10) comprising:

a casing (11) defining a containment volume;

a satellite position locator (12) housed in said container volume and configured to emit a position signal representative of the position of said antenna module (10), in particular of the geolocation, in the form of geographical coordinates, of said antenna module (10);

a transmitter (14) housed in said containment volume and configured to transmit information remotely through a communication network;

a control unit (15) housed in said inner containment volume and operatively connected to said satellite locator (12) and to said transmitter (14), said control unit (15) being configured at least for:

receiving said position signal of the antenna module (10);

generating at least one piece of information related to the position of the antenna module (10) based on said position signal; and commanding the transmitter (14) of the antenna module to remotely transmit said at least one piece of information related to the position of the antenna module (10);

arranging at least one mobile device (2) adapted to execute land maintenance operations within the working area (1), said mobile device (2) comprising:

a respective satellite position locator (3) configured to emit a position signal representative of the position of said at least one mobile device (2), in particular of the geolocation, in the form of geographical coordinates, of said at least one mobile device (2);

a remote communication system (4), comprising in particular a receiver or a transceiver (14), and an on-board controller (5) operatively connected to said satellite locator and to said communication system (4);

commanding the communication system (4) to remotely transmit said position signal of the mobile device; and in which the installation method comprises executing a first installation procedure (60) by moving said mobile device (2), said first installation procedure (60) comprising the steps of:

maintaining said antenna module (10) in a substantially fixed position;

moving the mobile device (2) along a perimeter (8*a*) of the working area (1) and/or one or more boundary lines delimiting the working area (1) and/or at one or more obstacles (8*b*) in the working area (1);

executing an adjustment procedure (50) of the position of the mobile device (2), said adjustment procedure (50) comprising the step of calculating a correct position of the mobile device (2) as a function:

of the fixed position signal of the antenna module (10), and of the position signal of the mobile device (2) emitted during said movement, defining, as a function of the correct position of the mobile device (2), a virtual perimeter representative of said perimeter (8*a*) and/or one or more virtual boundary lines representative of said one or more boundary lines and/or one or more virtual obstacles (8*b*) representative of said one or more obstacles (8*b*), in particular said virtual perimeter and/or said one or more virtual boundary lines comprising geographical coordinates representative of said perimeter (8*a*) of the working area (1) and/or of said one or more boundary lines of the working area (1), and/or of said one or more obstacles (8*b*).

Installation Method 500 by Means of a Mobile Support 40 and Correction Procedure A fifty-third aspect relates to an installation method (400, 500) intended for the definition of a working area (1) within which a mobile device (2) is configured to execute maintenance operations, said installation method comprising the steps of:

arranging an antenna module (10) comprising:

a casing (11) defining a containment volume;

a satellite position locator (12) housed in said container volume and configured to emit a position signal representative of the position of said antenna module (10), in particular of the geolocation, in the form of geographical coordinates, of said antenna module (10);

a transmitter (14) housed in said containment volume and configured to transmit information remotely through a communication network;

a control unit (15) housed in said inner containment volume and operatively connected to said satellite locator (12) and to said transmitter (14), said control unit (15) being configured at least for:

receiving said position signal of the antenna module (10);

generating at least one piece of information related to the position of the antenna module (10) based on said position signal; and commanding the transmitter (14) of the antenna module to remotely transmit said at least one piece of information related to the position of the antenna module (10);

arranging at least one mobile device (2) adapted to execute land maintenance operations within the working area (1), said mobile device (2) comprising:

a respective satellite position locator (3) configured to emit a position signal representative of the position of said at least one mobile device (2), in particular of the geolocation, in the form of geographical coordinates, of said at least one mobile device (2);

a remote communication system (4), comprising in particular a receiver or a transceiver (14), and an on-board controller (5) operatively connected to said satellite locator and to said communication system (4);

commanding the communication system (4) to remotely transmit said position signal of the mobile device; and in which the installation method comprises executing a second installation procedure (61) by moving a mobile support (40), said second installation procedure (61) comprising the steps of:

arranging a mobile support (40) comprising:

a gripping portion (41) configured to allow the gripping of an operator, a bottom portion (43), an elongated handlebar (75) (42) interposed in connection between said gripping portion (41) and said bottom portion (43);

movement means (44), in particular one or more idle wheels movable by rotation, constrained to the bottom portion (43) of the mobile support (40) and configured to contact the ground of said working area (1) during a working condition of the mobile support (40), said movement means (44) being configured to support the mobile support (40), at least one constraining portion (45) arranged at the bottom portion (43) of the mobile support (40) and configured to carry said antenna module (10);

constraining the antenna module to the constraining portion (45) of the mobile support (40);

maintaining the mobile device (2) in a substantially fixed position;

moving the support (40) along a perimeter (8*a*) of the working area (1) and/or one or more boundary lines delimiting the working area (1) and/or at one or more obstacles (8*b*) in the working area (1);

executing an adjustment procedure (50) of the position of the antenna module (10) during said movement of the mobile support (40), said adjustment procedure (50) comprising the step of calculating a correct position of the antenna module (10) as a function:

of the position signal of the antenna module (10) emitted during said movement, and.

of the fixed position signal of the mobile device (2), defining, as a function of the correct position of the antenna module (10), a virtual perimeter representative of said perimeter (8*a*) and/or one or more virtual boundary lines representative of said one or more boundary lines and/or one or more virtual obstacles (8*b*) representative of said one or more obstacles (8*b*), in particular said virtual perimeter and/or said one or more virtual boundary lines comprising geographical coordinates representative of said perimeter (8*a*) of the working area (1) and/or of said one or more boundary lines of the working area (1), and/or of said one or more obstacles (8*b*).

In a fifty-fourth aspect in accordance with any one of the preceding aspects, a seat (21) configured to house said antenna module (10) is defined in said charging station (20).

In a fifty-third aspect in accordance with the preceding aspect, said charging station (20) comprises a coupling system (22) configured to constrain said casing (11) of the antenna module (10) in said seat (21), said coupling system (22) notably comprising at least one among a removable interlocking coupling, a screw coupling, a magnetic coupling, a quick-coupling/release coupling system.

In a fifty-fourth aspect in accordance with any one of the preceding aspects, the charging station (20) comprises a cover (23) arranged to close the seat (21), optionally in which the cover (23) is movable between:

a use position, in which the cover (23) prevents access to said seat (21); and a service position, in which the cover (23) allows access to said seat (21), in particular in which the cover (23), when arranged in said service position, is configured to allow the insertion of the antenna module (10) in said seat (21) and/or the extraction of the antenna module (10) from said seat (21).

In a fifty-fifth aspect in accordance with the preceding aspect, said cover (23) is configured to exert a protection action of said antenna module (10), in particular a water protection.

In a fifty-sixth aspect in accordance with any one of the two preceding aspects, the cover (23) is constrained to the charging station (20) by means of elements such as releasable hinges or hooks so as to allow the position of the cover (23) to be switched from the use position to the service position and vice versa.

In a fifty-seventh aspect in accordance with any one of the preceding aspects, the casing (11) of the antenna module (10) can be removably constrained to the charging station (20).

In a fifty-eighth aspect in accordance with any one of the preceding aspects, said antenna module (10) is a portable antenna module (10).

In a fifty-ninth aspect in accordance with any one of the preceding aspects, said assembly (100) can be articulated according to:

a first arrangement, in which the antenna module (10) is constrained to the charging station (20) and located in said seat (21), and a second arrangement, in which the antenna module (10) is separate from the charging station (20) and can be located remotely from the charging station (20).

In a sixtieth aspect in accordance with any one of the preceding aspects, said assembly (100) further comprises a fixing bracket (30) configured to constrain the antenna module (10) to an external installation (31) when in the second arrangement.

In a sixty-first aspect in accordance with the preceding aspect, said fixing bracket (30) comprises a support portion (33) configured to be constrained to said casing (11) of the antenna module (10) and an anchoring portion (32) configured to be constrained to said external installation (31), in which optionally said fixing bracket (30) is in a single body, in particular in plastic material.

In a sixty-second aspect in accordance with the preceding aspect, said support portion (33) comprises a pair of arms connectable to opposite sides of said casing (11) of the antenna module (10), for example by means of screws and/or mechanical couplings.

In a sixty-third aspect in accordance with any one of the preceding aspects, said anchoring portion (32) comprises an abutment plate (32*a*), connectable to the wall, for example by means of screws, in which in particular said assembly (100) further comprises a fixing ring configured to engage to said abutment plate (32*a*) so as to lock said fixing bracket (30) to a pole or tree trunk.

In a sixty-fourth aspect in accordance with any one of the preceding aspects, said mobile device (2) comprises:

a respective satellite position locator (3) configured to emit a position signal representative of the position of said at least one mobile device (2), in particular of the geolocation, in the form of geographical coordinates, of said at least one mobile device (2);

a remote communication system (4), in particular comprising a receiver or a transceiver (14), and configured to transmit information, in particular position information of the mobile device (2), remotely through a communication network, an on-board controller (5) operatively connected to said satellite locator (3) and to said communication system (4), said on-board controller (5) being notably configured at least for:

receiving said position signal from the mobile device (2);

generating at least one piece of information related to the position of the mobile device (2) based on said position signal, and commanding the communication system (4) to remotely transmit said at least one piece of information related to the position of the mobile device (2).

Location System 200

A sixty-fifth aspect in accordance with any one of the preceding aspects relates to a location system (200) comprising:

- an assembly (100) according to any of the preceding aspects; and
- at least one mobile device (2) adapted to execute land maintenance operations.

In a sixty-sixth aspect in accordance with the preceding aspect, said mobile device (2) comprises:

- a respective satellite position locator (3) configured to emit a position signal representative of the position of said at least one mobile device (2), in particular of the geolocation, in the form of geographical coordinates, of said at least one mobile device (2);
- a remote communication system (4), in particular comprising a receiver or a transceiver (14), and configured to transmit information, in particular position information of the mobile device (2), remotely through a communication network,
- an on-board controller (5) operatively connected to said satellite locator (3) and to said communication system (4), said on-board controller (5) being notably configured at least for:
  - receiving said position signal from the mobile device (2);
  - generating at least one piece of information related to the position of the mobile device (2) based on said position signal, and
  - commanding the communication system (4) to remotely transmit said at least one piece of information related to the position of the mobile device (2).

In a sixty-seventh aspect in accordance with any one of the preceding aspects, at least one processor, chosen among the on-board controller (5) of the mobile device (2), the control unit (15) of the antenna module (10) and an auxiliary control unit, is configured to execute an adjustment procedure (50) of the position of the mobile device (2), said adjustment procedure (50) comprising the step of calculating a correct position of the mobile device (2) as a function:

- of a position signal of the antenna module (10) and
- of a position signal of the mobile device (2), for example a position signal assumed by the mobile device (2) during an autonomous movement thereof.

In a sixty-eighth aspect in accordance with the preceding aspect, said processor is configured to receive:

- said at least one piece of information related to the position of the antenna module (10) transmitted by means of the transmitter (14) and
- said at least one piece of information related to the position of the mobile device (2) transmitted by means of the communication system (4), said adjustment procedure (50) being optionally executed during a self-driving condition of the mobile device (2).

In a sixty-ninth aspect in accordance with any one of the preceding aspects, said step of calculating the correct position of the mobile device (2) by means of the adjustment procedure (50) comprises a step of executing an algorithm of the "Real Time Kinematic" RTK type.

In a seventieth aspect in accordance with the preceding aspect, said RTK algorithm calculating the correct position of the mobile device (2) as a function of the position signal of the antenna module (10) and the position signal of the mobile device (2), said antenna module (10) defining in particular a reference station of the RTK algorithm.

In a seventy-first aspect in accordance with any one of the preceding aspect, said mobile device (2) is self-driving and comprises a movement system configured to determine a movement of said at least one mobile device (2) within the working area (1) and in which the on-board controller (5) of the mobile device (2) is further operatively connected to the movement means (6) and is configured to self-drive the mobile device (2) as a function of the correct position of the mobile device (2) during driving, said correct position of the mobile device (2) during driving being calculated by means of the adjustment procedure (50).

In a seventy-second aspect in accordance with any one of the preceding aspects from 23, said processor is configured to execute an installation procedure (60) of the mobile device (2) to define a spatial limit within which the mobile device (2) is configured to execute maintenance operations within the working area (1), said installation procedure (60) comprising the steps of:

- moving the mobile device (2) along a perimeter (8*a*) of the working area (1) and/or along one or more boundary lines delimiting the working area (1) and/or at one or more obstacles (8*b*) in the working area (1); 1 detecting the position signal of the mobile device (2) emitted during said movement;
- detecting the position signal of the antenna module (10), in particular the antenna module (10) being in a fixed position and constrained to the charging station (20) to define a reference station,
- calculating the correct position of the mobile device (2) during said movement by means of the adjustment procedure (50);
- defining, as a function of said correct position of the mobile device (2), a virtual perimeter representative of said perimeter (8*a*) and/or one or more virtual boundary lines representative of said one or more boundary lines and/or one or more virtual obstacles (8*b*) representative of said one or more obstacles (8*b*).

In a seventy-third aspect in accordance with the preceding aspect, said installation procedure (60) is executed as a function of the correct position of the mobile device (2) progressively assumed during said movement

- said virtual perimeter and/or said one or more virtual boundary lines and/or said one or more virtual obstacles (8*b*) optionally comprising geographical coordinates representative of said perimeter (8*a*) of the working area (1) and/or of said one or more boundary lines of the working area (1) and/or of said one or more obstacles (8*b*) in the working area (1).

In a seventy-fourth aspect in accordance with any one of the preceding aspects, said installation procedure (60) of the mobile device (2) further comprises the steps of:

- establishing a connection condition of said mobile device (2) with said charging station (20);
- determining the position of said charging station (20) as coincident to the correct position of said mobile device (2) in said connection condition with said charging station (20).

In a seventy-fifth aspect in accordance with any one of the preceding aspects, said installation procedure (60) of the mobile device (2) further comprises the step of including a plurality of intermediate points along said perimeter (8*a*) of the working area (1) and/or along said one or more boundary lines delimiting the working area (1), said intermediate points being configured to act as restoration points following an event which previously caused an interruption of said installation step, such as a detection of an obstacle or a detection of an unsuitable terrain or an entry into a shadow area of a position signal.

In a seventy-sixth aspect in accordance with any one of the preceding aspects, said processor is configured to execute a mapping procedure of the working area (1), comprising the steps of:

obtaining a first region and at least one further region in said working area (1) and assigning to said first region and to said at least one further region different tolerance thresholds relative to the uncertainty in the detected or estimated position of the mobile device (2).

A seventy-seventh aspect, optionally in accordance with any one of the preceding aspects, relates to an assembly process (300) of an antenna module (10), said process comprising the steps of:

arranging an antenna module (10) comprising:

a casing (11) defining a containment volume;

a satellite position locator (12) housed in said containment volume and configured to emit a position signal representative of the position of said antenna module (10), in particular of the geolocation, in the form of geographical coordinates, of said antenna module (10);

a transmitter (14) housed in said containment volume and configured to transmit information, in particular position information of the antenna module (10), remotely through a communication network;

a control unit (15) housed in said containment volume and operatively connected to said satellite locator (12) and to said transmitter (14), said control unit (15) being configured at least for:

receiving said position signal from the antenna module (10);

generating at least one piece of information related to the position of the antenna module (10) based on said position signal; and commanding the transmitter (14) to remotely transmit said at least one piece of information related to the position of the antenna module (10);

arranging a charging station (20) configured to electrically charge the battery of a mobile device (2) adapted to execute land maintenance operations, said charging station (20) comprising:

at least one connector configured to establish a connection between said charging station (20) and a power supply network;

at least one charging system (26) configured to charge a battery of the mobile device (2);

a seat (21) configured to house said antenna module (10);

arranging the antenna module (10) in said seat (21) of the charging station (20), optionally constraining said antenna module (10) to said casing (11).

A seventy-eighth aspect, optionally in accordance with any one of the preceding aspects, relates to an installation method (400) for defining a working area (1) within which a mobile device (2) is configured to execute land maintenance operations, said installation method comprising the steps of:

arranging an antenna module (10) comprising:

a casing (11) defining a containment volume;

a satellite position locator (12) housed in said container volume and configured to emit a position signal representative of the position of said antenna module (10), in particular of the geolocation, in the form of geographical coordinates, of said antenna module (10);

a transmitter (14) housed in said containment volume and configured to transmit information, in particular at least one piece of position information of the antenna module (10), remotely through a communication network;

a control unit (15) housed in said inner containment volume and operatively connected to said satellite locator (12) and to said transmitter (14), said control unit (15) being configured at least for:

receiving said position signal of the antenna module (10);

generating at least one piece of information related to the position of the antenna module (10) based on said position signal, commanding the transmitter (14) to remotely transmit said at least one piece of information related to the position of the antenna module (10);

maintaining said antenna module (10) in a substantially fixed position;

arranging at least one mobile device (2) adapted to execute land maintenance operations within the working area (1), said mobile device (2) comprising:

a respective satellite position locator (3) configured to emit a position signal representative of the position of said at least one mobile device (2), in particular of the geolocation, in the form of geographical coordinates, of said at least one mobile device (2);

a remote communication system (4), in particular comprising a receiver or a transceiver (14), and configured to transmit information, in particular at least one piece of position information of the mobile device (2), remotely through a communication network;

an on-board controller (5) operatively connected to said satellite locator (3) of the mobile device and to said communication system (4), said on-board controller (5) being notably configured at least for:

receiving said position signal from the mobile device (2);

generating at least one piece of information related to the position of the mobile device (2) based on said position signal; and commanding the communication system (4) to remotely transmit said at least one piece of information related to the position of the mobile device (2), moving the mobile device (2) along a perimeter (8*a*) of the working area (1) and/or along one or more boundary lines delimiting the working area (1) and/or at one or more obstacles (8*b*) in the working area (1).

In a seventy-ninth aspect in accordance with the preceding aspect, the installation method (400) comprises:

executing, during said movement, an adjustment procedure (50) of the position of the mobile device (2), said adjustment procedure (50) comprising the step of calculating a correct position of the mobile device (2) as a function:

of a position signal of the antenna module (10) and of a position signal of the mobile device (2), defining, as a function of said correct position of the mobile device, a virtual perimeter representative of said perimeter (8*a*) and/or one or more virtual boundary lines representative of said one or more boundary lines and/or one or more virtual obstacles (8*b*) representative of said one or more obstacles (8*b*), in particular said virtual perimeter and/or said one or more virtual boundary lines comprising geographical coordinates representative of said perimeter (8*a*) of the working area (1) and/or of said one or more boundary lines of the working area (1).

In an eightieth aspect in accordance with any one of the preceding aspects, the method (400) further comprises the steps of:

sending said perimeter (8*a*) and/or said one or more virtual boundary lines to a remote device (90), for example a smartphone, a tablet or a computer and displaying, by means of a virtual map, said virtual perimeter and/or said one or more virtual boundary lines of the working area (1), for example on a screen of the remote device (90).

In an eighty-first aspect in accordance with any one of the preceding aspects, the installation method (400) comprises:

a self-driving step, in which the on-board controller (5) commands the movement means to determine the movement and the direction of the mobile device (2) within the working area (1) as a function of the correct position assumed, during the self-driving procedure itself, by the mobile device (2), in particular in which said working area (1) is defined by said virtual perimeter and/or by said one or more virtual boundary lines.

In an eighty-second aspect in accordance with any one of the preceding aspects, the installation method (400) comprises:

a step of returning to the charging station (20) comprising approaching, and optionally also connecting, the mobile device (2) to the charging station (20), the position assumed by the mobile device (2) during said procedure of returning to the charging station (20) being obtained by means of the adjustment procedure (50).

In an eighty-third aspect in accordance with any one of the preceding aspects, the installation method (400) further comprises at least one step among:

transmitting the signal representative of the position signal of the antenna module (10), in particular transmitting said position signal, directly to the mobile device (2), transmitting the signal representative of the position signal of the antenna module (10), in particular transmitting said position signal, to a remote server (91) by means of the transmitter (14) of the antenna module (10), in particular in which the transmitter (14) of the antenna module (10) is configured to transmit the position signal of the antenna module (10) to a remote server (91) by means of an internet network, in particular said transmitter (14) of the antenna module (10) comprising an internet network access module, for example an LTE, 4G, 3G, 2G, 5G, UMTS module or a Wi-Fi module, transmitting the signal representative of the position signal of the mobile device (2), in particular transmitting said position signal, to said remote server (91) by means of the communication system (4), in particular in which the communication system (4) of the mobile device (2) is configured to transmit the signal of its position to the remote server (91) by means of an internet network, in particular said communication system (4) comprising an internet network access module, for example an LTE, 4G, 3G, 2G, 5G, UMTS module or a Wi-Fi module.

In an eighty-fourth aspect in accordance with any one of the preceding aspects, said constraining portion (45) of the mobile support (40) comprises a coupling system configured to be constrained to the antenna module (10), said coupling system comprising at least one among a removable interlocking coupling, a screw coupling, a magnetic coupling, a quick-coupling/release system.

In an eighty-fifth aspect in accordance with any one of the preceding aspects, during an operating condition, the mobile support (40) is resting on the ground on the movement means and is supported in height by an operator, said operator gripping the mobile support (40) at the gripping portion (41).

In an 86th aspect in accordance with any one of the preceding aspects, said constraining portion (45) of the mobile support (40) is arranged, during an operating condition of the mobile support (40), at a distance from the ground less than 400 mm, in particular less than 300 mm, in particular less than 250 mm.

In an 87th aspect in accordance with any one of the preceding aspects, the mobile support (40) extends in length between an end portion of the bottom portion (43) and a respective end portion of the gripping portion (41), said length being between 500 mm and 2000 mm, preferably between 500 mm and 1700 mm, even more preferably between 1200 mm and 1700 mm.

In an 88th aspect in accordance with any one of the preceding aspects, the mobile support (40), in particular excluding the antenna module (10), has a weight between 0.5 kg and 3 kg.

In an 89th aspect in accordance with any one of the preceding aspects, the movement means (44) of the mobile support (40) comprise a first and a second wheel (44*a*, 44*b*) movable by rotation about a same rotation axis A and axially spaced from each other, in particular said wheels (44*a*, 44*b*) being aligned along said rotation axis A and being arranged at the bottom portion (43) of the mobile support (40).

In a 90th aspect in accordance with the preceding aspect, the distance between the first and the second wheel is between 150 mm and 400 mm to define an encumbrance in width.

In a 91st aspect in accordance with any one of the preceding aspects, said handlebar (75) (42) of the mobile support (40) comprises at least a first rod (42*a*), a second rod (42*b*) and a connection joint (42*c*) between said first rod and said second rod.

In a 92nd aspect in accordance with the preceding aspect, said first rod (42*a*) branches off between said bottom portion (43) and said second rod, and said second rod (42*b*) branches off between said first rod and said gripping portion (41), so that said first rod and said second rod define in combination the longitudinal extension of said handlebar (75) (42).

In a 93rd aspect in accordance with any one of the two preceding aspects, said connection joint (42*c*) is configured to allow an adjustment of the longitudinal extension of said handlebar (75) (42) and/or an adjustment of the inclination of said second rod with respect to the first second rod.

In a 94th aspect in accordance with any one of the preceding aspects, the mobile support (40) comprises at least a first operating joint between said handlebar (75) (42) and said bottom portion (43), optionally in which said first joint is configured to allow a user to vary the orientation of said handlebar (75) (42) with respect to said bottom portion (43) between a first orientation in which said handlebar (75) (42) and said bottom portion (43) are aligned with each other along the advancement direction of said mobile support (40) and at least a second orientation in which said handlebar (75) (42) is inclined to the left or to the right of said bottom portion (43).

In a 95th aspect in accordance with any one of the preceding aspects, the mobile support (40) comprises at least a second operating joint between the bottom portion (43) and said movement means (44), in particular so as to allow easier conduct of said mobile support (40) at external encumbrances arranged at a distance with respect to the ground and/or at steep portions of land.

In a 96th aspect in accordance with the preceding aspect, said second joint is configured to allow a user to operate a rotation of said movement means (44) with respect to an axis orthogonal to the ground, in particular so as to allow a deviation of the advancement direction of said mobile support (40) with respect to a straight direction.

In a 97th aspect in accordance with any one of the preceding aspects, the mobile support (40) comprises at least one template (46) adjustable in extension along a width dimension of the mobile support (40), said template (46) being configured to simulate at least one encumbrance in width.

In a 98th aspect in accordance with the preceding aspect, said template (46) is configured to simulate at least one among:

- an encumbrance in width of said mobile device (2) adjacent to a boundary of said working area (1), for example a wall, not passable by said mobile device (2), and
- an encumbrance in width of a cutting blade of said mobile device (2) adjacent to a boundary of said working area (1), for example a pavement, passable by said mobile device (2).

In a 99th aspect in accordance with any one of the two preceding aspects, said template (46) is applied to said bottom portion (43).

In a 100th aspect in accordance with any one of the preceding aspects, said template (46) comprises a bar, a case configured to slidably house said bar, and an organ, for example a screw, for adjusting the position of said bar relative to said case.

In a 101st aspect in accordance with any one of the preceding aspects, said template (46) is rotatably applied to said mobile support (40), in particular said template (46) being rotatably applied to said bottom portion (43), so as to be able to selectively protrude from a left side or from a right side of said mobile support (40).

In a 102nd aspect in accordance with any one of the preceding aspects, said mobile support (40) comprises a first template and a second template protruding respectively from a left side and from a right side of said mobile support (40).

In a 103rd aspect in accordance with any one of the preceding aspects, the mobile support (40) comprises an auxiliary support structure (47) arranged near the gripping portion (41) of the mobile support (40) and configured to constrain a remote device (90), for example a smartphone or a tablet.

In a 104th aspect in accordance with the preceding aspect, said auxiliary support structure (47) is oriented so that said remote device (90) is facing the operator during an operating condition of the mobile support (40).

In a 105th aspect in accordance with any one of the two preceding aspects, said mobile support (40) comprises means for adjusting the orientation of said auxiliary support structure (47) with respect to said gripping portion (41), said adjustment means preferably comprising at least one joint.

In a 106th aspect in accordance with any one of the preceding aspects, said auxiliary structure (47) comprises a housing shell of said remote device (90), said shell comprising a body and a plurality of retaining walls, said retaining walls extending from opposite ends of said body.

In a 107th aspect in accordance with any one of the preceding aspects, having taken a first axis of symmetry of said casing and a second axis of symmetry of said shell which are orthogonal to each other, said body and said retaining walls are configured to exhibit a first resilience in the direction of said first axis of symmetry and a second resilience in the direction of said second axis of symmetry, said first resilience and said second resilience being different from each other, and/or to exhibit a first bending strength in the event of applying a bending moment around said first axis of symmetry and a second bending strength in the event of applying a bending moment around said second axis of symmetry, said first bending strength and said second bending strength being different from each other.

A 108th aspect, optionally in accordance with any one of the preceding aspects, relates to an assembly (150) comprising:

- a mobile support (40) according to any one of the preceding aspects, and
- an antenna module (10) comprising:
  - a casing (11) defining a containment volume;
  - a satellite position locator (12) housed in said containment volume and configured to emit a position signal representative of the position of said antenna module (10), in particular of the geolocation, in the form of geographical coordinates, of said antenna module (10);
  - a control unit (15) housed in said containment volume and operatively connected to said satellite locator (12) and to said transmitter (14), said control unit (15) being optionally configured at least for:
    - receiving said position signal from the antenna module (10);
    - generating at least one piece of information related to the position of the antenna module (10) based on said position signal, in which the mobile support (40) carries said antenna module (10).

In a 109th aspect in accordance with the preceding aspect, at least one processor, among the control unit (15) of the antenna module (10) and a remote control unit, is configured to execute an installation procedure (61) comprising the steps of:

- constraining the antenna module (10) to the constraining portion (45) of the mobile support (2);
- moving the mobile support (40) along a perimeter (8*a*) of the working area (1) and/or one along or more boundary lines delimiting the working area (1) and/or at one or more obstacles (8*b*) in the working area (1);
- detecting the position signal of the antenna module (10) emitted during said movement of the support (40);
- defining, as a function of at least the detected position of the antenna module (10) during said movement, a virtual perimeter representative of said perimeter (8*a*) and/or one or more virtual boundary lines representative of said one or more boundary lines and/or one or more virtual obstacles (8*b*) representative of said one or more obstacles (8*b*).

In a 110th aspect in accordance with any one of the preceding two aspects, said antenna module (10) is arranged, during said operating condition of the mobile support (40), at a distance from the ground less than 400 mm, in particular less than 300 mm, in particular less than 250 mm.

In a 111th aspect in accordance with any one of the preceding aspects from 64, the installation procedure (61) further comprises the steps of:

sending said perimeter (8*a*) and/or said one or more virtual boundary lines to a remote device (90), for example a smartphone, a tablet or a computer and displaying, by means of a virtual map, said virtual perimeter and/or said one or more virtual boundary lines of the working area (1), for example on a screen of a remote device (90).

In a 112th aspect in accordance with the preceding aspect, said step of displaying the virtual map is substantially contextual to the step of moving the mobile support (40) along the perimeter (8*a*) of the working area (1) and/or the boundary lines delimiting the working area (1) and/or at one or more obstacles (8*b*) in the working area (1).

In a 113th aspect in accordance with any one of the preceding aspects from 64, the installation procedure (61) comprises the step of constraining said remote device (90) to the auxiliary support structure (47) of the mobile support (40).

In a 114th aspect in accordance with any one of the preceding aspects from 63, in which the assembly (150) further comprises:

a mobile device (2) configured to execute land maintenance operations and a charging station (20) configured to electrically charge said mobile device (2), said charging station (20) comprising:

at least one connector configured to establish an electrical connection between said charging station (20) and a power supply network;

at least one charging system (26) configured to charge a battery of the mobile device (2);

in which a seat (21) configured to house said antenna module (10) is defined in said charging station (20).

In a 115th aspect in accordance with the preceding aspect, said assembly (150) can be articulated according to:

a first arrangement in which the antenna module (10) is constrained to the charging station (20) and located in said seat (21); and a second arrangement in which the antenna module (10) is constrained to the mobile support (40) to define said virtual perimeter and/or said one or more virtual boundary lines and/or said one or more virtual obstacles (8*b*).

In a 116th aspect in accordance with any one of the preceding aspects from 69, said mobile device (2) comprises:

a respective satellite position locator (3) configured to emit a position signal representative of the position of said at least one mobile device (2), in particular of the geolocation, in the form of geographical coordinates, of said at least one mobile device (2);

a remote communication system (4), in particular comprising a receiver or a transceiver (14), and configured to transmit information, in particular position information of the mobile device (2), remotely through a communication network.

In a 117th aspect in accordance with the preceding aspect and/or with any one of the preceding aspects, the mobile device (2) comprises:

an on-board controller (5) operatively connected to said satellite locator (3) and to said communication system (4), said on-board controller (5) being notably configured at least for:

receiving said position signal from the mobile device (2);

generating at least one piece of information related to the position of the mobile device (2) based on said position signal, and commanding the communication system (4) to remotely transmit said at least one piece of information related to the position of the mobile device (2).

In a 118th aspect in accordance with any one of the preceding aspects, at least one processor, chosen among the on-board controller (5) of the mobile device (2), the control unit (15) of the antenna module (10) and an auxiliary control unit, is configured to execute an adjustment procedure (50) of the position of the mobile device (2), said adjustment procedure (50) comprising the step of calculating a correct position of the mobile device (2) as a function:

of a position signal of the antenna module (10), and of a position signal of the mobile device (2) assumed by the mobile device during an autonomous movement thereof in the working area, in particular wherein said processor is configured to receive:

said at least one piece of information related to the position of the antenna module (10) transmitted by means of the transmitter (14), and said at least one piece of information related to the position of the mobile device (2) transmitted by means of the communication system (4).

In a 119th aspect in accordance with any one of the preceding aspects, said adjustment procedure (50) is executed during a self-driving condition of the mobile device (2).

In a 120th aspect in accordance with any one of the preceding aspects, said adjustment procedure (50) is executed during an installation procedure (60; 61).

In a 121st aspect in accordance with any one of the preceding aspects, the installation method comprises:

arranging at least one mobile device (2) adapted to execute land maintenance operations within the working area (1), said mobile device (2) comprising a respective satellite position locator configured to emit a position signal representative of the position of said at least one mobile device (2), in particular of the geolocation, in the form of geographical coordinates, of said at least one mobile device (2);

removing the antenna module (10) from the mobile support (40);

installing said antenna module (10) in a seat (21) of a charging station (20) of the mobile device (2) or positioning the antenna module (10) in a fixed position, for example constraining the antenna module (10) to a fixed structure for example a pole, a tree or a roof;

a self-driving step of the mobile device (2), in which an on-board controller (5) of the mobile device (2) commands movement means of the mobile device (2) to determine the movement and the direction of the mobile device (2) within the working area (1) as a function of the virtual perimeter of the working area (1).

In a 122nd aspect in accordance with any one of the preceding aspects, the step of calculating the correct position of the mobile device (2) during said self-driving step is executed by means of an algorithm of the “Real Time Kinematic” RTK type, said RTK algorithm calculating the position of the mobile device (2) as a function of the position signal of the antenna module (10) and the position signal of the mobile device (2), said antenna module (10) being substantially fixed in position and defining in particular a reference station of the RTK algorithm.

In a 123rd aspect in accordance with any one of the preceding aspects, the transmitter (14) of the antenna module (10) is housed in said containment volume of the antenna module and configured to transmit information remotely through a communication network, in particular said transmitter (14) being a wireless transmitter (14).

In a 124th aspect in accordance with the preceding aspect, the transmitter (14) is configured to transmit remotely, in particular to the remote device (90), said at least one piece of information related to the position of the antenna module (10).

In a 125th aspect in accordance with any one of the preceding aspects, the mobile support (40), does not comprise a tool configured to carry out land maintenance operations, in particular it does not comprise a cutting blade operatively configured to cut the turfgrass.

An 126th aspect relates to an installation method (400) intended for the definition of a working area (1) within which a mobile device (2) is configured to execute maintenance operations, said installation method comprising the steps of:

arranging an antenna module (10) comprising:
- a casing (11) defining a containment volume;
- a satellite position locator (12) housed in said container volume and configured to emit a position signal representative of the position of said antenna module (10), in particular of the geolocation, in the form of geographical coordinates, of said antenna module (10);
- a transmitter (14) housed in said containment volume and configured to transmit information remotely through a communication network;
- a control unit (15) housed in said inner containment volume and operatively connected to said satellite locator (12) and to said transmitter (14), said control unit (15) being configured at least for:
  - receiving said position signal of the antenna module (10);
  - generating at least one piece of information related to the position of the antenna module (10) based on said position signal; and
  - commanding the transmitter (14) of the antenna module to remotely transmit said at least one piece of information related to the position of the antenna module (10);

arranging at least one mobile device (2) adapted to execute land maintenance operations within the working area (1), said mobile device (2) comprising:
- a respective satellite position locator (3) configured to emit a position signal representative of the position of said at least one mobile device (2), in particular of the geolocation, in the form of geographical coordinates, of said at least one mobile device (2);
- a remote communication system (4), comprising in particular a receiver or a transceiver (14), and an on-board controller (5) operatively connected to said satellite locator and to said communication system (4);

commanding the communication system (4) to remotely transmit said position signal of the mobile device; and in which the installation method comprises executing a first installation procedure (60) by moving said mobile device (2), said first installation procedure (60) comprising the steps of:
- maintaining said antenna module (10) in a substantially fixed position;
- moving the mobile device (2) along a perimeter (8*a*) of the working area (1) and/or one or more boundary lines delimiting the working area (1) and/or at one or more obstacles (8*b*) in the working area (1);
- executing an adjustment procedure (50) of the position of the mobile device (2), said adjustment procedure (50) comprising the step of calculating a correct position of the mobile device (2) as a function:
  - of the fixed position signal of the antenna module (10), and
  - of the position signal of the mobile device (2) emitted during said movement,
- defining, as a function of the correct position of the mobile device (2), a virtual perimeter representative of said perimeter (8*a*) and/or one or more virtual boundary lines representative of said one or more boundary lines and/or one or more virtual obstacles (8*b*) representative of said one or more obstacles (8*b*), in particular said virtual perimeter and/or said one or more virtual boundary lines comprising geographical coordinates representative of said perimeter (8*a*) of the working area (1) and/or of said one or more boundary lines of the working area (1), and/or of said one or more obstacles (8*b*).

In an 127th aspect in accordance with the preceding aspect, the antenna module (10) is arranged at a charging station (20) configured to electrically charge said mobile device (2) adapted to execute land maintenance operations.

In a 128th aspect in accordance with any one of the preceding aspects from 81, said charging station (20) comprises:
- at least one connector (27) configured to establish an electrical connection between said charging station (20) and a power supply network;
- at least one charging system (26) configured to charge a battery of the mobile device (2);
- a seat (21) configured to house said antenna module (10), said seat (21) comprising a coupling system (22) configured to constrain said casing (11) of the antenna module (10) in said seat (21), in particular said coupling system (22) comprising at least one among a removable interlocking coupling, a screw coupling, a magnetic coupling, a quick-coupling/release system.

In a 129th aspect in accordance with any one of the preceding aspects, said antenna module (10) is constrained to said charging station (20) in particular during the execution of the installation method (400).

In a 130th aspect in accordance with any one of the preceding aspects, the antenna module (10) is applied, in particular during the execution of the installation method (400), to an external installation (31), for example a pole, a tree trunk or an outdoor structure, preferably said antenna module (10) being constrained to said external installation (31).

In a 131st aspect in accordance with any one of the preceding aspects, the installation method (400) further comprises the steps of:
- sending said perimeter (8*a*) and/or said one or more virtual boundary lines to a remote device (90), for example a smartphone, a tablet or a computer.

In a 132nd aspect in accordance with any one of the preceding aspects, the installation method (400) comprises:
- displaying, by means of a virtual map, said virtual perimeter and/or said one or more virtual boundary lines of the working area (1), for example on a screen of a remote device (90).

In a 133rd aspect in accordance with the preceding aspect, said step of displaying the virtual map is substantially contextual to the step of moving the mobile device (2).

In a 134th aspect in accordance with any one of the preceding aspects, said step of calculating, by means of the adjustment procedure (50), the correct position of the mobile device (2) comprises a step of executing an algorithm of the "Real Time Kinematic" RTK type, said RTK algorithm notably calculating the correct position of the mobile device (2) both as a function of the position signal of the antenna module (10), and as a function of the position signal of the mobile device (2), said antenna module (10) defining in particular a reference station of the RTK algorithm.

In a 135th aspect in accordance with any one of the preceding aspects, the installation method (400) comprises the step of including, during the movement of said mobile device, the generation of a plurality of intermediate points configured to act as restoration points, following an event which has previously determined an interruption of the step of defining said virtual perimeter and/or of said one or more virtual boundary lines, said event being for example a detection of an obstacle or a detection of unsuitable terrain or an entry into a shadow area of a position signal.

A 136th aspect, optionally in accordance with any one of the preceding aspects and preferably in accordance with aspects 81 to 90, relates to an installation method (500) intended for the definition of a working area (1) within which a mobile device (2) is configured to execute maintenance operations, said installation method (500) comprising the steps of:

- arranging an antenna module (10) comprising:
  - a casing (11) defining a containment volume;
  - a satellite position locator (12) housed in said container volume and configured to emit a position signal representative of the position of said antenna module (10), in particular of the geolocation, in the form of geographical coordinates, of said antenna module (10);
  - a transmitter (14) housed in said containment volume and configured to transmit information remotely through a communication network;
  - a control unit (15) housed in said inner containment volume and operatively connected to said satellite locator (12) and to said transmitter (14), said control unit (15) being configured at least for:
    - receiving said position signal of the antenna module (10);
    - generating at least one piece of information related to the position of the antenna module (10) based on said position signal; and
    - commanding the transmitter (14) of the antenna module to remotely transmit said at least one piece of information related to the position of the antenna module (10);
- arranging at least one mobile device (2) adapted to execute land maintenance operations within the working area (1), said mobile device (2) comprising:
  - a respective satellite position locator (3) configured to emit a position signal representative of the position of said at least one mobile device (2), in particular of the geolocation, in the form of geographical coordinates, of said at least one mobile device (2);
  - a remote communication system (4), comprising in particular a receiver or a transceiver (14), and an on-board controller (5) operatively connected to said satellite locator and to said communication system (4);
- commanding the communication system (4) to remotely transmit said position signal of the mobile device; and in which the installation method comprises executing a second installation procedure (61) by moving a mobile support (40), said second installation procedure (61) comprising the steps of:
- arranging a mobile support (40) comprising:
  - a gripping portion (41) configured to allow the gripping of an operator, a bottom portion (43),
  - an elongated handlebar (75) (42) interposed in connection between said gripping portion (41) and said bottom portion (43);
  - movement means (44), in particular one or more idle wheels movable by rotation, constrained to the bottom portion (43) of the mobile support (40) and configured to contact the ground of said working area (1) during a working condition of the mobile support (40), said movement means (44) being configured to support the mobile support (40),
  - at least one constraining portion (45) arranged at the bottom portion (43) of the mobile support (40) and configured to carry said antenna module (10);
- constraining the antenna module to the constraining portion (45) of the mobile support (40);
- maintaining the mobile device (2) in a substantially fixed position;
- moving the support (40) along a perimeter (8*a*) of the working area (1) and/or one or more boundary lines delimiting the working area (1) and/or at one or more obstacles (8*b*) in the working area (1);
- executing an adjustment procedure (50) of the position of the antenna module (10) during said movement of the mobile support (40), said adjustment procedure (50) comprising the step of calculating a correct position of the antenna module (10) as a function:
  - of the position signal of the antenna module (10) emitted during said movement, and
  - of the fixed position signal of the mobile device (2),
- defining, as a function of the correct position of the antenna module (10), a virtual perimeter representative of said perimeter (8*a*) and/or one or more virtual boundary lines representative of said one or more boundary lines and/or one or more virtual obstacles (8*b*) representative of said one or more obstacles (8*b*), in particular said virtual perimeter and/or said one or more virtual boundary lines comprising geographical coordinates representative of said perimeter (8*a*) of the working area (1) and/or of said one or more boundary lines of the working area (1), and/or of said one or more obstacles (8*b*).

In a 137th aspect in accordance with of the preceding aspect, the mobile device (2) is self-driving, in which said mobile device (2) comprises a movement system configured to determine a movement of said at least one mobile device (2) within the working area (1) and in which the on-board controller (5) of the mobile device (2) is further operatively connected to the movement means (6) and is configured to self-drive the mobile device (2) as a function of the correct position of the mobile device (2) during driving, said correct position of the mobile device (2) during driving being calculated by means of the adjustment procedure (50).

In a 138th aspect in accordance with any one of the preceding aspects, the installation method (400, 500) further comprises the steps of:

- sending said perimeter (8*a*) and/or said one or more virtual boundary lines to a remote device (90), for example a smartphone, a tablet or a computer, and/or displaying, by means of a virtual map, said virtual perimeter and/or said one or more virtual boundary lines of the working area (1), for example on a screen of a remote device (90).

In a 139th aspect in accordance with the preceding aspect, said step of displaying the virtual map is substantially contextual to the step of moving the mobile support (40).

In a 140th aspect in accordance with any one of the preceding aspects, said step of calculating, by means of the adjustment procedure (50), the correct position of the antenna module (10) comprises a step of executing an algorithm of the "Real Time Kinematic" RTK type, said RTK algorithm notably calculating the correct position of the antenna module (10) both as a function of the position signal of the antenna module (10), and as a function of the position signal of the mobile device (2), said antenna module (10) defining in particular a reference station of the RTK algorithm.

In a 141st aspect in accordance with any one of the preceding aspects, the installation method (400, 500) comprises the step of including, during the movement of said mobile support, the generation of a plurality of intermediate points configured to act as restoration points, following an event which has previously determined an interruption of the step of defining said virtual perimeter and/or of said one or more virtual boundary lines, said event being for example a detection of an obstacle or a detection of unsuitable terrain or an entry into a shadow area of a position signal.

In a 142nd aspect in accordance with any one of the preceding aspects, the installation method comprises transmitting the signal representative of the position signal of the antenna module (10), in particular transmitting said position signal, directly to the mobile device (2) or vice versa.

In a 143rd aspect in accordance with any one of the preceding aspects, the installation method (400, 500) comprises transmitting the signal representative of the position signal of the antenna module (10), in particular transmitting said position signal, to a remote server (91) by means of the transmitter (14) of the antenna module (10).

In a 144th aspect in accordance with the preceding aspect, the transmitter (14) of the antenna module (10) is configured to transmit the position signal of the antenna module (10) to a remote server (91) by means of an internet network, in particular said transmitter (14) of the antenna module (10) comprising an internet network access module, for example an LTE, 4G, 3G, 2G, 5G, UMTS module or a Wi-Fi module.

In a 145th aspect in accordance with any one of the preceding aspects, the installation method (400, 500) comprises transmitting the signal representative of the position signal of the mobile device (2), in particular transmitting said position signal, to said remote server (91) by means of the communication system (4), in particular in which the communication system (4) of the mobile device (2) is configured to transmit the signal of its position to the remote server (91) by means of an internet network, in particular said communication system (4) comprising an internet network access module, for example an LTE, 4G, 3G, 2G, 5G, UMTS module or a Wi-Fi module.

In a 146th aspect in accordance with any one of the preceding aspects, said charging station (20) comprises an auxiliary socket (27) configured to electrically connect to the antenna module (10) and power the antenna module (10), for example to charge the battery of the antenna module and/or to supply electrical power to the control unit (15) and/or to the transmitter (14) and/or to the satellite locator (12) of the antenna module (10).

In a 147th aspect in accordance with any one of the preceding aspects, the installation method (400, 500) comprises the step of connecting said auxiliary socket (27) to a power socket of the antenna module (10).

In a 148th aspect in accordance with any one of the preceding aspects, the auxiliary socket (27) of the charging station (20) is electrically powered by the power supply network by means of the connector of the charging station (20).

In a 149th aspect in accordance with any one of the preceding aspects, the installation method (400, 500) comprises a step of validating said virtual perimeter and/or said one or more virtual boundary lines.

In a 150th aspect in accordance with the preceding aspect, said validation step comprises a step of checking the consistency of said virtual perimeter and/or of said one or more virtual boundary lines, in particular aimed at ascertaining that the positions comprised in said virtual perimeter define a closed outline.

In a 151st aspect in accordance with any one of the two preceding aspects, said validation step comprises a step of reproducing said virtual perimeter and/or said one or more virtual boundary lines, in particular aimed at piloting said mobile device so as to autonomously travel said virtual perimeter and/or said one or more virtual boundary lines and consequently to provide evidence that said virtual perimeter and/or said one or more virtual boundary lines have been correctly received by said mobile device.

In a 152nd aspect in accordance with any one of the preceding three aspects, said validation step comprises a step of displaying said virtual perimeter and/or said one or more virtual boundary lines on an interface of a remote device, in particular aimed at allowing a manual correction of said virtual perimeter and/or said one or more virtual boundary lines by means of said interface.

In a 153rd aspect in accordance with any one of the three preceding aspects, the installation method (400, 500) further comprises a step of associating at least one piece of information with at least one section of said virtual perimeter and/or of said one or more virtual boundary lines.

In a 154th aspect in accordance with the preceding aspect, said information is related to a description of said section, in particular explanatory of the type of said section.

In a 155th aspect in accordance with any one of the preceding aspects, said piece of information is related to an identification of at least one element adjacent to said working area at said section.

In a 156th aspect in accordance with any one of the preceding aspects, said piece of information is related to an index representative of the criticality of said section, in particular related to the danger of a possible encroachment from said working area, at said section, by said mobile device.

In a 157th aspect in accordance with any one of the preceding aspects, said piece of information is related to an extension, at said section, of a region of said working area extending from said outline.

In a 158th aspect in accordance with any one of the preceding aspects, said piece of information is related to a tolerance threshold of an estimated uncertainty of the detected position of said mobile device applicable near said section.

In a 159th aspect in accordance with any one of the preceding aspects, for said intermediate points a first criterion and/or a second criterion and/or a third criterion are adopted, said first criterion being a criterion of substantial coincidence in the distance between consecutive intermediate points, said second criterion being a criterion of substantial coincidence in the travel time between consecutive intermediate points, said third criterion being a criterion of substantial coincidence between the position of said intermediate points and the position of notable points of said virtual perimeter and/or of said one or more virtual boundary lines.

In a 160th aspect in accordance with any one of the preceding aspects, the mobile device (2) comprises a rechargeable battery configured to power the satellite position locator, the communication system (4), the movement system and the on-board controller (5) of the mobile device (2).

In a 161st aspect in accordance with any one of the preceding aspects, the antenna module comprises a rechargeable battery electrically connected to the control unit (15).

In a 162nd aspect in accordance with any one of the preceding aspects, a processor, in the group among the on-board controller (5) of the mobile device (2), the control unit (15) of the antenna module (10) and an auxiliary control unit, is configured to execute a return procedure towards the charging station (20), said return procedure comprising the approach, and optionally also the physical connection, of the mobile device (2) to the charging station (20) to allow a charging of the on-board battery of the mobile device (2).

In a 163rd aspect in accordance with the preceding aspect, the position assumed by the mobile device (2) during said procedure of returning to the charging station (20) is obtained by means of the adjustment procedure (50).

In a 164th aspect in accordance with any one of the preceding aspects, a processor, in the group among the on-board controller (5) of the mobile device (2), the control unit (15) of the antenna module (10) and an auxiliary control unit, is configured for:

- detecting a charge value of the on-board battery of the mobile device (2);
- comparing said charge value of the on-board battery of the mobile device (2) with a preset threshold value,
- executing said procedure of returning to the charging station (20).

BRIEF DESCRIPTION OF THE DRAWINGS

Some embodiments and aspects of the invention will be described hereinafter with reference to the accompanying drawings, given merely for illustrative, non-limiting purposes in which:

FIGS. 14C to 14F show a detail of the mobile support referred to in FIG. 14, carrying an antenna module, the mobile support and/or the antenna including means for defining and/or simulating an encumbrance, comprising at least one sensor of the contactless type;

DETAILED DESCRIPTION

Mobile Device (2)

Figure 2:
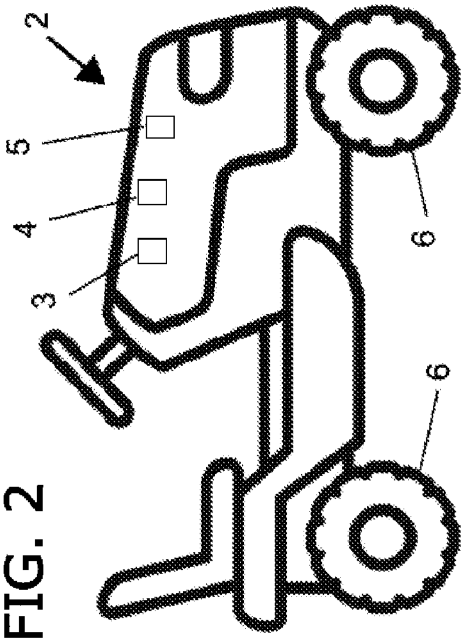
FIG. 2 is a perspective view of a manually-driven mobile device and comprising a driver's seat in accordance with the present invention.

The mobile device (2) can be a mobile device configured to move and execute maintenance operations within a working area of land, such as turfgrass, a garden, or agricultural land, having an extension between 10 and 20000 square metres, in particular between 500 and 10000 square metres: the maintenance operations can comprise, for example, cutting turfgrasses, soil aeration, or its tillage.

The mobile device (2) comprises the driving movement means, for example one or more traction wheels, adapted to determine the advancement of the mobile device (2) and is configured to move and drive autonomously within the working area (1) by using one or more sensors, so as to orient itself and avoid obstacles. For example, the self-driving mobile device (2) can comprise one or more proximity sensors and/or one or more position sensors configured to send signals to a controller configured to command the driving movement means to guide the mobile device (2) within the working area (1) to carry out the maintenance activities. The self-driving mobile device (2) can have a length between 50 cm and 150 cm and a width between 30 cm and 125 cm.

In the case in which the driving movement means are moved by one or more electric motors, the mobile device (2) can comprise a rechargeable on-board battery having a charging capacity between 2.5 Wh and 40 Wh. The battery can be configured to deliver a voltage preferably between 24 Volts for self-driving robots and 48 Volts for tractors. In more detail, the battery can be configured to deliver a current, during a standard use condition, between 2 Amps and 5 Amps for self-driving robots, and between 5 Amps and 60 Amps for tractors. The battery can be a rechargeable battery by means of a power outlet of a home network, for example a 110V, 200V or 380V power source.

The mobile device (2) can carry the on-board controller in which the latter is configured to execute one or more commands in accordance with the present invention.

The mobile device (2) of the present invention comprises least one work tool, configured to execute the maintenance operations in the working area (1): an electric motor, optionally the same motor as the movement means, is configured to move the work tool.

The work tool can comprise one or more rotating blades, soil tillage tools, soil drilling tools, seed sowing tools, vegetable, fruit or grain harvesting tools, soil fertilization tools, for example a fertilizer dispenser, or tools for dispensing agricultural chemicals. The mobile device (2) provided with the rotating blade can thus be a lawnmower. The on-board controller can be connected to the electric motor of the work tool and configured to command the activation thereof.

In an embodiment mobile device (2) comprises a single electric motor operatively connected to the work tool and to the movement means so as to make such movement means driving. Alternatively, the mobile device 2 can comprise an electric motor connected to the work tool, and a further electric motor, operatively connected to the driving movement means. In a further embodiment, the mobile device (2) is an electrically powered device, in which the movement means and the work tool are driven by one or more electric motors powered by an on-board battery. The work tool preferably comprises a cutting blade for cutting turfgrass, rotating about an axis: alternatively, the work tool can comprise an aerator configured to execute a plurality of holes in the ground.

The mobile device (2) of the present invention comprises a support frame carrying the movement means, whether driven or idle, one or more work tools configured to execute the maintenance operations within the working area (1) and optionally an operating body carrying and/or hosting the work tool and defining an actuation region of the mobile device configured to execute the maintenance operations. In detail, the movement means can comprise wheels, in particular two, three or four wheels, or tracks. The wheels can be arranged at the respective four vertices of the support frame, to define a rectangular or square polygonal shape.

The mobile device (2) has a front portion, a rear portion opposite to, and distanced from, the front portion, a left side interposed as a connection between the front portion and the rear portion of the mobile device (2), and a right side interposed as a connection between the front portion and the rear portion of the mobile device (2): the right side is opposite and distanced from the left side of the mobile device (2).

The words "right" and "left" are a convention which can be arbitrarily defined according to a front or rear view of the mobile device (2), as long as such a convention is maintained unchanged during the reading of such a disclosure, of the claims and of the attached aspects.

The left side and the right side can comprise the movement means, in particular wheels or movement tracks: for example, the left side and the right side of the mobile device (2) can each comprise two movement wheels placed at the front portion and the other at the rear portion. In other words, the mobile device (2) can have a front wheel axle placed at the front portion and comprising a left front wheel and a right front wheel, and a rear wheel axle placed at the rear portion and comprising a left rear wheel and a right rear wheel.

An envelope of the four wheels, in particular an envelope defined by the left and right front wheels and the left and right rear wheels, defines a peripheral shape of the mobile device (2). The mobile device (2) extends in length between the front portion and the rear portion, to define a longitudinal axis X of the mobile device (2): in particular, the longitudinal axis X of the mobile device (2) crosses the front portion and the rear portion substantially orthogonally. In more detail, the longitudinal axis X of the mobile device (2) can define an axis of symmetry between the left side and the right side of the mobile device (2) and pass through a central portion of the mobile device (2) itself. Similarly, a straight advancement of the mobile device (2) can be coincident with the longitudinal axis X of the mobile device (2). Further, the longitudinal axis X can be substantially orthogonal to the front and/or rear wheel axis of the mobile device (2) at least during a straight motion condition. Furthermore, the longitudinal axis X can be equidistant from the left and right wheels of the same axis: in such a case, the longitudinal axis defines a central longitudinal axis of the mobile device (2). In particular, the longitudinal axis X, in the present disclosure, is considered centrally placed to the mobile device (2).

The movement means define a support plane SP for the mobile device (2): in fact, such a support plane SP coincides with the ground during an operating condition of the mobile device (2). In more detail, the support plane is passing through the points of contact between the wheels of the mobile device (2) and the ground on which the mobile device (2) is arranged.

The movement means can further define a straight advancement of the mobile device (2) along a longitudinal advancement direction substantially coincident with the longitudinal axis X of the mobile device (2): in particular, the longitudinal advancement direction is substantially orthogonal to a rotation axis of the wheels of the mobile device (2). Such a longitudinal advancement direction is substantially parallel to the support plane SP: likewise the longitudinal axis X is parallel to the support plane SP.

The movement means of the mobile device (2) are preferably at least one front wheel (20) and one rear wheel (19). Such at least one rear wheel (19) and such at least one front wheel (20) can be idle wheels or drive wheels. Preferably the rear wheel is a rear drive wheel (6A; 6*b*), while the front wheel is a front idle wheel (6*c*; 6*d*).

The mobile device (2) can comprise a contactless-type sensor configured to detect the presence of an obstacle and/or to detect the distance between a possible obstacle and such a contactless-type sensor; this contactless-type sensor can alternatively comprise: an optical sensor or an array of optical sensors and/or a video camera and/or a radio frequency sensor or an array of radio frequency sensors and/or a time-of-flight sensor and/or an inductive sensor or a capacitive sensor and/or a magnetic sensor and/or an ultrasound sensor and/or a radar sensor and/or a lidar sensor.

The mobile device (2) can comprise an obstacle and/or impact sensor, said obstacle and/or impact sensor being of electronic or electromechanical type and being configured to detect a collision condition with an obstacle and/or proximity to an obstacle, for example by means of a switching of the state of an electrical contact integrated in said obstacle and/or impact sensor, in which the obstacle and/or impact sensor is in particular further configured to generate, and optionally transmit at least one electrical signal carrying at least one piece of information about the existence of said collision condition with an obstacle and/or about the existence of a condition of proximity to an obstacle.

The mobile device (2) also extends in height along a vertical axis Z orthogonal to the longitudinal axis X and to the support plane SP. In other words, the longitudinal axis X is orthogonal, when the mobile device (2) is resting on the ground on the movement means thereof, to the ground itself. The operating body can be movable in height along the vertical axis Z between a distal position and a near position with respect to the support plane SP: in particular, during an operating condition, the operating body can be movable in height along the vertical axis Z between a distal position and a near position with respect to the ground, to allow a variable cutting height. A variation along the vertical axis Z of the operating body determines a simultaneous variation in height of the work tool, and consequently a variation in the distance between the work tool and the ground and/or support plane. Similarly, the mobile device (2) extends in width along a transverse axis W between a left side, interposed as a connection between the front portion and the rear portion of the mobile device (2), and a right side, also interposed as a connection between the front portion and the rear portion of the mobile device (2) the right side is opposite and distanced with respect to said left side. In particular, the transverse axis W is orthogonal to the longitudinal axis X and to the vertical axis Z.

In other words, the longitudinal axis X, the transverse axis W and the vertical axis Z define a reference system of the mobile device (2). The origin of said reference system can be the mass or geometric centre of gravity of the mobile device (2).

Accessory (9)

The accessory (9) comprises various elements, including a gripping portion configured to allow the gripping of a user, a support portion (72) and a handlebar (75) interposed in connection between a gripping portion and the support portion (72).

The handlebar (75) can comprise:

A single rod of fixed dimensions;

A single telescopically extendable rod, in that it can comprise at least a first rod and a second rod, with one of the two rods received inside the other; optionally it can also comprise a third rod.

Preferably the handlebar (75) comprises two longitudinal rods parallel to each other, which can have a fixed length or alternatively a variable length; in the latter case the two longitudinal rods parallel to each other consist of a first rod, a second rod and an adjustment joint.

The first rod can extend between the support portion (72) and the second rod, while the second rod can extend between the first rod and the gripping portion: thereby the first rod and the second rod define in combination the longitudinal extension of the central body. It is known that alternatively the first rod can extend between the second rod and the gripping portion while the second rod can extend between the support portion (72) and the first rod. The first rod and the second rod can be telescopically received by each other such that one can disappear inside the other when the operator goes to adjust the minimum size.

The adjustment joint can be configured to allow an adjustment of the longitudinal extension of the central body, so that an operator can lengthen and shorten the accessory (9) according to his own height.

Between the handlebar (75) and the support portion (72) there can be an inclination adjustment joint, configured to allow a user to vary the orientation of said handlebar (75) with respect to the support portion (72), between at least a first and a second orientation. By means of the adjustment joint of the inclination the operator can vary the inclination both between preset positions, defined by special seats and/or clicks, or the position can be varied without assuming a previously predefined position.

The support portion (72) is preferably rectangular in shape, with chamfers/spokes in the corners; it is known that such a support portion (72) can also have a square or rounded shape. In such a support portion (72) an opening (79) is obtained which facilitates the user in the engagement/disengagement operations between the mobile device (2) and the accessory (9): in fact, the opening (79) allows the user not to crush his hand or fingers during the completion of said operations. Such an opening (79) is preferably located between the transmission shaft (73) and engagement means configured to establish a constraint condition. The engagement means configured to establish a constraint condition allow the mobile device (2) to be constrained to the accessory (9); the engagement means configured to establish a constraint condition can comprise at least one among a removable interlocking coupling, a magnetic coupling, a screw coupling, a quick-coupling/release system. Preferably, the engagement means configured to establish a constraint condition comprise a bulkhead (78) which extends vertically and away from said support portion (72) and is configured to be received by the mobile device (2), as the mobile device has an opening of similar size in its lower part.

The accessory (9) can further comprise an auxiliary support structure (18) arranged near the gripping portion of the accessory (9) and configured to carry and constrain a remote device (90), for example a smartphone or a tablet. The auxiliary support structure (18) can be constrained directly to the gripping portion of the accessory (9) or near the gripping portion: in particular the auxiliary support structure (18) is configured to support the remote device (90) and allow the operator to easily see what is shown by the remote device (90). The accessory (9) can comprise means for adjusting the orientation of said auxiliary support structure (18) with respect to said gripping portion: such adjustment means preferably comprise at least one joint. The remote device (90), when mounted on the auxiliary support structure (18), can face the operator.

The accessory (9) comprises movement means constrained to the support portion (72) of the accessory (9) and configured to contact the ground of the working area (1) during a working condition of the accessory (9). In particular, said movement means can comprise at least one movable wheel, preferably two movable wheels (71*a*, 71*b*) positioned at the support portion (72) of the accessory (9). Such movable wheels (71*a*, 71*b*) preferably have a diameter equal to or greater than the diameter of the at least one rear wheel (19) of said mobile device.

Such wheels (71*a*, 71*b*) are configured to allow a translation of the accessory (9) in the working area (1); moreover, such wheels (71*a*, 71*b*) are configured to allow the definition of an encumbrance.

Such wheels (71*a*, 71*b*) are configured to rotate both in the same rotation direction, thus allowing the backward movement or advancement of the accessory (9); moreover said wheels (71*a*, 71*b*) are configured to rotate in opposite rotation directions, thus allowing the rotation in place of the accessory (9).

The accessory (9) comprises a first wheel (71*a*) and a second wheel (71*b*) rotatably movable about a rotation axis (A) and axially spaced from each other. Such wheels are connected to each other by a transmission axis (73) which can have substantially constant size. Preferably the transmission axis (73) is of variable size, as such a transmission axis (73) comprises at least a first rod (73*a*), a second rod (73*b*) and a connection joint interposed between the first (10*a*) and the second rod (73*b*). The second rod (73*b*) extends telescopically between the first rod (73*a*) and the movement means and the connection joint is configured to allow an adjustment of the extension of the transmission axis (73) along the width of the accessory (9), so that the operator can simulate a different encumbrance in width.

The transmission axis (73) can vary its length at the same time both on the right and on the left side of the accessory (9); preferably said transmission axis (73) can vary its length independently between the right and the left side of the accessory (9). When the operator varies the length of the transmission axis (73), this variation can occur freely and/or following preset signs, indicative of at least one size of a mobile device (2), and/or for predefined clicks. The transmission axis (73) can comprise, at a lateral surface, a plurality of notches representative of an extension in width of the template: for example, the notches can represent a measure in width, for example in centimetres or inches, representative of the extension in width of the template. The length of the transmission axis (73) can vary between a first retracted position, in which the transmission axis (73) reduces its extension in width or in which it does not define a dimension in width, and an extended position, in which the transmission axis (73) defines the maximum width of the accessory (9). The connection joint can for example comprise interlocking means, magnetic means or other fixing means.

In particular, the movement means are configured to simulate at least one encumbrance in width of the mobile device (2) near or adjacent to a boundary of the working area (1), for example a wall, which the mobile device (2) cannot pass. Furthermore, the movement means are further configured to define an encumbrance in width of a cutting blade of the mobile device (2) near or adjacent to a boundary of the working area (1), for example a pavement, which the mobile device (2) cannot pass.

In the accessory (9) in question, an assembly is formed comprising at least the gripping portion, the support portion (72), the handlebar (75) and optionally the mobile device (2). This assembly can assume a substantially fixed position with respect to the width of the axis, placing itself in a substantially central position; this position is preferably assumed in a stable manner, for example by means of a stable and non-removable fixing. Preferably this assembly can vary its position within the space defined between the movement means, depending on the position preferred by the user; preferably this position is variable so that the movement means, notably the wheels (71*a*, 71*b*) define at least one encumbrance in width of the mobile device (2) or one encumbrance in width of a cutting blade of the mobile device (2). The operator, after having varied the position of the assembly with respect to the transmission axis (73) and/or with respect to the space defined between the movement means, can constrain the position of the assembly by known fixing means, such as interlocking means, magnetic means or other fixing means.

The accessory (9) can comprise a lateral template adjustable in extension along a width dimension of the accessory (9): the lateral template defines a maximum width of the accessory (9). The extension in width is defined parallel to the rotation axis of the wheels and in particular orthogonal to an advancement direction imposed by the operator to the accessory (9). The lateral template can comprise, at a lateral surface, a plurality of notches representative of an extension in width of the template: for example, the notches can represent a measure in width, for example in centimetres or inches, representative of the extension in width of the template. The lateral template can extend in width by a greater amount with respect to an extension in width of the movement means of the accessory (9): in particular the lateral template extends in width by a greater amount than the extension in width defined by the wheels of the accessory (9). In other words, the lateral template defines, at least when in an extended position, the maximum extension in width of the accessory (9).

A width adjustment of the lateral template allows to simulate the width of a mobile device (2), so that when the mobile device (2) is near and/or at a working perimeter, it does not go beyond the virtual perimeter and/or collide with objects outside the working area (1).

The lateral template of can be adapted to simulate an encumbrance in width of the mobile device (2) adjacent to a boundary of the working area (1), for example a wall, not passable by the mobile device (2). The lateral template of can also be adapted to simulate an encumbrance in width of a cutting blade of the mobile device (2) adjacent to a boundary of the working area (1), for example a pavement, passable by the mobile device (2). The lateral template of is preferably applied to the support portion (72). The lateral template of comprises a bar and a case configured to slidably receive the bar. The lateral template can further comprise an organ, for example a screw, for adjusting the position of the bar relative to the case. The bar of the lateral template is movable between a retracted position, in which the lateral template reduces its extension in width or in which it does not define the maximum size in width of the accessory (9), and an extended position, in which the lateral template defines the maximum width of the accessory (9).

Alternatively, the accessory (9) comprises a first template and a second template which protrude respectively from a left side and a right side of the accessory (9).

The encumbrance in width defined by at least one wheel and/or by at least one template is adapted to simulate an encumbrance in width of the mobile device (2) adjacent to a boundary of the working area (1), for example a wall, not passable by the mobile device (2). The lateral template of can also be adapted to simulate an encumbrance in width of a cutting blade of the mobile device (2) adjacent to a boundary of the working area (1), for example a pavement, passable by the mobile device (2).

Optionally in which said at least one encumbrance is an encumbrance, in particular an encumbrance in width, greater than the encumbrance of said mobile device (2) or greater than the encumbrance of said at least one payload of said mobile device (2) and/or Optionally in which said at least one encumbrance is an encumbrance, which can comprise or not comprise an increased encumbrance is adapted to act as a safety encumbrance in the context of a subsequent navigation of said mobile device (2), notably near a boundary section of said working area (1), such as a boundary section formed by a wall or a hedge or a tree trunk, not passable by said mobile device (2) and potentially harmful to said mobile device (2) in the event of a collision and/or rubbing, and/or such as a boundary section separating said working area (1) from a road or a pool, whereby a possible encroachment of said mobile device (1) would result in the occurrence of a situation of potential danger to people and/or such as a boundary section at which said mobile device (2) is expected to carry out, notably in a subsequent operating step, at least one manoeuvre of the type including an abrupt change in its advancement direction.

The accessory (9) can comprise a contactless-type sensor configured to detect the presence of an obstacle and/or to detect the distance between a possible obstacle and such a contactless-type sensor; this contactless-type sensor can alternatively comprise: an optical sensor or an array of optical sensors and/or a video camera and/or a radio frequency sensor or an array of radio frequency sensors and/or a time-of-flight sensor and/or an inductive sensor or a capacitive sensor and/or a magnetic sensor and/or an ultrasound sensor and/or a radar sensor and/or a lidar sensor.

The accessory (9) can comprise an obstacle and/or impact sensor, said obstacle and/or impact sensor being of electronic or electromechanical type and being configured to detect a collision condition with an obstacle and/or proximity to an obstacle, for example by means of a switching of the state of an electrical contact integrated in said obstacle and/or impact sensor, in which the obstacle and/or impact sensor is in particular further configured to generate, and optionally transmit at least one electrical signal carrying at least one piece of information about the existence of said collision condition with an obstacle and/or about the existence of a condition of proximity to an obstacle.

The accessory (9) is a completely distinct device from the mobile device (2) described above. In particular, the accessory (9) does not comprise a tool configured to carry out land maintenance operations: for example, the accessory (9) does not comprise a cutting blade operatively configured to cut the turfgrass. The accessory (9) extends between an end portion of the support portion (72) and a respective end portion of the gripping portion for a length between 50 cm and 200 cm, in particular between 50 cm and 170 cm. The accessory (9), in particular excluding the mobile device (2), has a weight between 0.5 kg and 8 kg, in particular between 0.6 kg and 7 kg.

Installation Method (300) by Means of the Accessory (9)

The installation method (300) can be executed by using the accessory (9) described above. The installation method (300) is aimed at defining the boundaries of the working area (1) within which a self-driving mobile device (2) is configured to operate to execute the land maintenance operations.

The installation method (300) comprises a step in which the accessory (9) is arranged, a mobile device (2) is arranged and the mobile device (1) is constrained to said mobile device (2) by means of the constraint system (7).

The installation method (300) comprises a step in which a force is applied to the gripping portion so as to allow lifting at least one rear wheel (19) of the mobile device from the ground, so that at least one front wheel (20) of the mobile device (2) is in contact with the ground. Preferably, both rear wheels of the mobile device (2), which are usually the drive wheels, are lifted from the ground. Such at least one rear wheel and such at least one front wheel can be idle wheels or drive wheels. Preferably the rear wheel is a rear drive wheel (6A; 6*b*), while the front wheel is a front idle wheel (6*c*; 6*d*).

The installation method (300) comprises a step in which the accessory (9) is moved along a perimeter of the working area (1) and/or one or more boundary lines delimiting the working area (1) and/or at one or more obstacles in the working area (1). The installation method (300) further comprises a step in which a virtual perimeter representative of the perimeter and/or one or more virtual boundary lines representative of one or more boundary lines and/or one or more virtual obstacles representative of one or more obstacles is defined according to at least one position detected by the mobile device (2) during movement. It should be noted that the virtual perimeter and/or virtual boundary lines can comprise geographical coordinates.

The movement of the accessory (9) can be determined by an operator who can push or pull the accessory (9).

During the movement of the accessory (9), the installation method (300) can further and optionally comprise the steps of sending the perimeter and/or one or more virtual boundary lines to a remote device (90), for example a smartphone, a tablet or a computer and the steps of displaying, by means of a virtual map, the virtual perimeter and/or one or more virtual boundary lines of the working area (1), for example on a screen of a remote device (90), in particular in which the step of displaying the virtual map is substantially contextual to the step of moving the mobile device (2) along a perimeter of the working area (1) and/or one or more boundary lines delimiting the working area (1) and/or at one or more obstacles of the working area (1).

Maintenance Method (400) by Means of the Accessory (9)

The maintenance method (400) can be executed by using the above-described accessory (9), in combination with the mobile device (2). The maintenance method (400) is aimed at executing the land maintenance operations by means of the assembly comprising the accessory (9) and the mobile device (2).

The maintenance method (400) comprises a step in which the accessory (9) is arranged, a mobile device (2) is arranged and the mobile device (1) is constrained to said mobile device (2) by means of the constraint system (7).

The maintenance method (400) comprises a step in which a force is applied to the gripping portion so as to allow lifting at least one rear wheel (19) of the mobile device from the ground, so that at least one front wheel (20) of the mobile device (2) is in contact with the ground. Preferably, both rear wheels of the mobile device (2), which are usually the drive wheels, are lifted from the ground. Preferably, said maintenance method (400) does not include lifting the front wheels (20). Such at least one rear wheel and such at least one front wheel can be idle wheels or drive wheels. Preferably the rear wheel is a rear drive wheel (6A; 6*b*), while the front wheel is a front idle wheel (6*c*; 6*d*).

The maintenance method (400) comprises a step in which the accessory (9) is moved along a perimeter of the working area (1) and/or inside the working area (1) and/or outside the working area (1), so that the mobile device (2) can execute operations for the maintenance and care of the turfgrass. 5

Assembly

This patent aims to also describe an assembly comprising at least one accessory (9) as described above and a mobile device (2), in particular a robot for cutting grass, provided with at least one rear wheel and at least one front wheel. Such at least one rear wheel and such at least one front wheel can be idle wheels or drive wheels. Preferably the rear wheel is a rear drive wheel (6A; 6*b*), while the front wheel is a front idle wheel (6*c*; 6*d*).

Definitions and Conventions

It should be noted that in the present detailed disclosure, corresponding parts illustrated in the various figures are indicated with the same numerical references. The figures could illustrate the object of the invention through non-scale depictions; therefore, the parts and components illustrated in the figures related to the object of the invention could exclusively relate to schematic depictions.

Control Unit

The control unit can be a single unit or be formed by a plurality of different control units depending on the design choices and operational needs.

The term control unit means an electronic type component which can comprise at least one of: a digital CPU, an analogue type circuit, or a combination of one or more digital processors with one or more analogue type circuits. The control unit can be "configured" or "programmed" to execute out certain steps: in practice, this can be accomplished by any means which allow the control unit to be configured or programmed. For example, in the case of a control unit comprising one or more CPUs and one or more memories, one or more programs can be stored in appropriate memory banks connected to the CPU(s); the program(s) contains instructions which, when executed by the CPU(s), program or configure the control unit to execute the operations described in relation to the control unit. Alternatively, if the control unit is or comprises analogue circuitry, then the circuitry of the control unit can be designed to include circuitry configured, in use, to process electrical signals so as to execute the steps related to the control unit.

Obstacle

The term obstacle refers to any body or element capable of limiting, reducing or obstructing the path of the mobile device within the working area. The obstacle can be a hedge, a flowerbed, the peripheral boundary of the working area, an inner boundary of the working area, a boulder, a tree, a plant or the like. Such an obstacle can further comprise a safety limit, for example if the obstacle is defined by a ditch, a gully or a step. In other words, the obstacle defines a portion of the working area which the mobile device must not reach.

GNSS

The Global Navigation Satellite System (GNSS) is a geo-radiolocation and land, sea or air navigation system which uses a network of orbiting satellites. Such a satellite system provides a geo-spatial positioning service with global coverage which allows small, special electronic receivers to determine their longitude, latitude and altitude geographical coordinates at any point on the Earth's surface or in the atmosphere.

DETAILED DESCRIPTION

Mobile Device 2

The present disclosure relates to a mobile device 2 configured to move and execute maintenance operations within a working area 1 of land, such as turfgrass, a garden, or agricultural land, having an extension between 10 and 20,000 square metres, in particular between 500 and 10,000 square metres: the maintenance operations can comprise, for example, cutting turfgrass, soil aeration, soil tillage, planting seeds or harvesting what was sown in a plantation or the like. In particular, the mobile device 2 can be, for example, a lawnmower as shown in the accompanying drawings. Alternatively, the mobile device 2 can be a motor hoe, a tiller, an aerator or the like.

The mobile device 2 can be a manually-driven device or a self-driving device.

If it is manually driven, the mobile device 2 is driven by a user: in this case the mobile device 2 can comprise driving movement means 6, for example one or more traction wheels, adapted to determine the advancement of the mobile device 2: in such a case the mobile device 2 can be a tractor, for example of the type shown in FIG. 2, comprising a driving station for accommodating the user on board, the latter adapted to drive the tractor within the working area 1.

Alternatively, the mobile device 2 can be manually driven and configured to be pushed by the user (embodiment not shown in the accompanying drawings). In such a case the mobile device 2 can comprise a drive handle to allow the operator to move and guide the mobile device 2 within the working area 1. It should be noted that the mobile device 2 must have dimensions and mass consistent with the need, of the user, to have to push it within the working area 1.

The driving movement means 6 as previously described can comprise one or more electric motors operatively connected to an on-board controller 5 and to at least one drive wheel of the mobile device 2 to determine the advancement movement thereof. The electric motor of the driving movement means 6 preferably has a nominal power between 1000

W and 2000 W, in particular between 1300 W and 1500 W in the case of a mobile device 2 pushed by the operator, or between 1.5 KW and 10 KW in the case of a tractor with driver's seat for an operator.

If the mobile device 2 is a tractor, the electric motor of the driving movement means 6 can have a maximum power between 10 KW and 200 kW.

Alternatively the mobile device 2, for example of the type shown in FIG. 2, can comprise an internal combustion engine, for example an Otto or Diesel cycle engine, operatively connected to the driving movement means 6 to determine the movement of the mobile device 2. The internal combustion engine can have a maximum power between 3 KW and 200 kW.

The manually-driven mobile device 2 comprising an on-board driving station, for example the tractor, preferably has a width between 65 cm and 200 cm. Alternatively, the tractor can reach dimensions in length up to 6 metres: in this case the engine is preferably an internal combustion engine.

Figure 1:
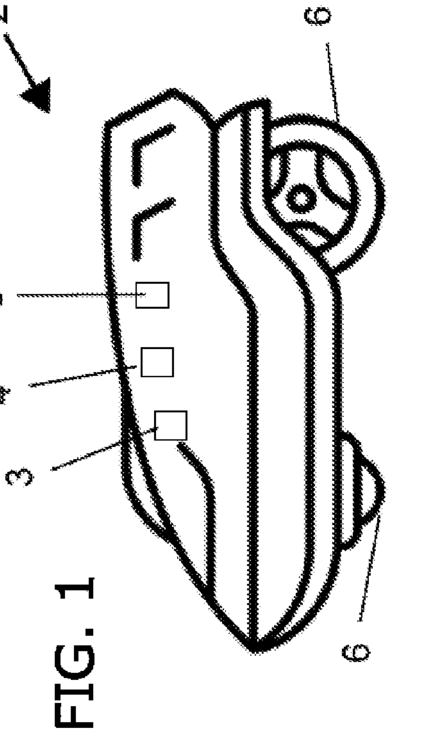
FIG. 1 is a perspective view of a self-driving mobile device in accordance with the present invention.

If the mobile device 2 is self-driving, schematically shown in FIG. 1, the mobile device 2 comprises the driving movement means 6 described previously and is further configured to move and drive autonomously within the working area 1 by using one or more sensors, so as to orient itself and to avoid the obstacles 8*b*, as per the prior art. For example, the self-driving mobile device 2 can comprise one or more proximity sensors and/or one or more position sensors configured to send signals to a controller configured to command the driving movement means 6 to guide the mobile device 2 within the working area 1 to carry out the maintenance activities. The self-driving mobile device 2 can have a length between 50 cm and 150 cm a width between 30 cm and 125 cm.

In the case in which the driving movement means are moved by one or more electric motors, the mobile device 2 can comprise a rechargeable on-board battery having a charging capacity between 2.5 Wh and 40 Wh. The battery can be configured to deliver a voltage preferably between 24 Volts for self-driving robots and 48 Volts for tractors. In more detail, the battery can be configured to deliver a current, during a standard use condition, between 2 Amps and 5 Amps for self-driving robots, and between 5 Amps and 60 Amps for tractors. The battery can be a rechargeable battery by means of a power outlet of a home network, for example a 110V, 200V or 380V power source.

The mobile device 2 can carry the on-board controller 5 in which the latter is configured to execute one or more commands in accordance with the present invention.

The mobile device 2 of the present invention, whether manually driven or self-driving, comprises at least one work tool 7, configured to execute the maintenance operations in the working area 1: an electric motor or combustion engine, optionally the same motor as the movement means 6, is configured to move the work tool 7. The work tool can comprise one or more rotating blades, soil tillage tools, soil drilling tools, seed sowing tools, vegetable, fruit or grain harvesting tools, soil fertilization tools, for example a fertilizer dispenser, or tools for dispensing agricultural chemicals. The mobile device 2 provided with the rotating blade can thus be a lawnmower. The on-board controller 5 can be connected to the electric motor of the work tool 7 and configured to command the activation thereof.

Similarly, if the mobile device 2 is a lawnmower, the operating body is a cutting plate defining a protective volume carrying the cutting blade. In particular, the cutting plate has a bell-like shape in which the internal volume faces the ground in an operating condition.

In an embodiment, the mobile device 2 comprises a single electric motor or combustion engine, operatively connected to the work tool 7 and to the movement means 6 so as to make such movement means 6 driving. Alternatively, the mobile device 2 can comprise an electric motor or combustion engine, connected to the work tool 7, and a further electric motor or combustion engine, operatively connected to the driving movement means 6.

In a further embodiment, the mobile device 2 is an electrically powered device, in which the movement means 6 and the work tool 7 are driven by one or more electric motors powered by an on-board battery.

The work tool 7 preferably comprises a cutting blade for cutting turfgrass, rotating about an axis A: alternatively, the work tool 7 can comprise an aerator configured to execute a plurality of holes in the ground, or a tiller or a motor hoe.

It should thus be noted that the present invention does not relate to a single type of mobile device 2, but relates to a variety of devices in the field of gardening and land maintenance, such as lawnmowers, aerators and motor hoes, and tractors.

The mobile device 2 of the present invention comprises a support frame carrying the movement means 6, whether driven or idle, one or more work tools 7 configured to execute the maintenance operations within the working area 1 and optionally an operating body carrying and/or hosting the work tool 7 and defining an actuation region of the mobile device 2 configured to execute the maintenance operations.

In detail, the movement means 6 can comprise wheels, in particular two, three or four wheels, or tracks. The wheels can be arranged at the respective four vertices of the support frame 2, to define a rectangular or square polygonal shape.

The mobile device 2 has a front portion, a rear portion opposite to, and distanced from, the front portion, a left side interposed as a connection between the front portion and the rear portion of the mobile device 2, and a right side interposed as a connection between the front portion and the rear portion of the mobile device 2: the right side is opposite and distanced from the left side of the mobile device 2.

The words "right" and "left" are a convention which can be arbitrarily defined according to a front or rear view of the mobile device 2, as long as such a convention is maintained unchanged during the reading of such a description, of the claims and of the attached aspects.

The left side and the right side can comprise the movement means 6, in particular wheels or movement tracks: for example, the left side and the right side of the mobile device 2 can each comprise two movement wheels placed at the front portion and the other at the rear portion. In other words, the mobile device 2 can have a front wheel axle placed at the front portion and comprising a left front wheel and a right front wheel, and a rear wheel axle placed at the rear portion and comprising a left rear wheel and a right rear wheel.

An envelope of the four wheels, in particular an envelope defined by the left and right front wheels and the left and right rear wheels, defines a peripheral shape 7 of the mobile device 2.

The mobile device 2 extends in length between the front portion and the rear portion, to define a longitudinal axis X of the mobile device 2: in particular, the longitudinal axis X of the mobile device 2 crosses the front portion and the rear portion substantially orthogonally. In more detail, the longitudinal axis X of the mobile device 2 can define an axis of symmetry between the left side and the right side of the mobile device 2 and pass through a central portion of the mobile device 2 itself. Similarly, a straight advancement of the mobile device 2 can be coincident with the longitudinal axis X of the mobile device 2. Further, the longitudinal axis X can be substantially orthogonal to the front and/or rear wheel axis of the mobile device 2 at least during a straight motion condition. Furthermore, the longitudinal axis X can be equidistant from the left and right wheels of the same axis: in such a case, the longitudinal axis defines a central longitudinal axis of the mobile device 2. In particular, the longitudinal axis X, in the present disclosure, is considered centrally placed to the mobile device 2.

The movement means 6 define a support plane SP for the mobile device 2: in fact, such a support plane SP coincides with the ground during an operating condition of the mobile device 2. In more detail, the support plane is passing through the points of contact between the wheels of the mobile device 2 and the ground on which the mobile device 2 is arranged.

If the mobile device 2 is a lawnmower and comprises a rotating blade, said rotating blade of the work tool 7 is movable about a rotation axis A which is transverse or substantially orthogonal to the support plane SP.

The movement means 6 can further define a straight advancement of the mobile device 2 along a longitudinal advancement direction substantially coincident with the longitudinal axis X of the mobile device 2: in particular, the longitudinal advancement direction is substantially orthogonal to a rotation axis of the wheels of the mobile device 2. Such a longitudinal advancement direction is substantially parallel to the support plane SP: likewise the longitudinal axis X is parallel to the support plane SP.

The mobile device 2 also extends in height along a vertical axis Z orthogonal to the longitudinal axis X and to the support plane SP. In other words, the longitudinal axis X is orthogonal, when the mobile device 2 is resting on the ground on the movement means 6 thereof, to the ground itself. The operating body can be movable in height along the vertical axis Z between a distal position and a near position with respect to the support plane SP: in particular, during an operating condition, the operating body can be movable in height along the vertical axis Z between a distal position and a near position with respect to the ground, to allow a variable cutting height. A variation along the vertical axis Z of the operating body determines a simultaneous variation in height of the work tool 7, and consequently a variation in the distance between the work tool 7 and the ground and/or support plane.

Similarly, the mobile device 2 extends in width along a transverse axis W between a left side, interposed as a connection between the front portion and the rear portion of the mobile device 2, and a right side, also interposed as a connection between the front portion and the rear portion of the mobile device 2: the right side is opposite and distanced with respect to said left side. In particular, the transverse axis W is orthogonal to the longitudinal axis X and to the vertical axis Z.

In other words, the longitudinal axis X, the transverse axis W and the vertical axis Z define a reference system of the mobile device 2. The origin of said reference system can be the mass or geometric centre of gravity of the mobile device 2.

In accordance with such a reference system, the rotation axis A of the rotating blade is substantially parallel or coincident with the vertical axis Z of the mobile device 2. The axis of the front wheels and/or rear wheels is parallel to the transverse axis W and optionally substantially parallel to the support plane SP.

The mobile device 2, in the case of a manually-driven mobile device 2, can comprise a drive handle substantially constrained to the rear portion of the mobile device 2 and configured to allow an operator to drive and optionally move, for example push, the mobile device 2 within the working area 1. The drive handle can be made of metal material, for example steel, iron or aluminium, or plastic or composite material. The drive handle preferably extends along an inclined direction transverse to the operating body, in particular transverse to the support plane SP.

If electrically powered by means of one or more rechargeable on-board batteries, the mobile device 2 comprises a member of a releasable-type connection system, intended to ensure that the one or more rechargeable on-board batteries are recharged by an external power supply source, in particular by a charging station for the mobile device 2. Such a member of a connection system is configured to removably connect with the electric power source and can be a charging socket or a charging head.

In an embodiment of the present invention, to be understood as an example given herein solely by way of non-limiting explanation, the mobile device 2 implements the teachings of patent application EP4009482A1 in the name of the same Applicant and comprises a charging socket provided with deformable electrical contacts housed inside a cavity. Advantageously, such a cavity is delimited by converging walls, so as to facilitate the centring of the charging head of the charging station intended to achieve a coupling with the charging socket.

Antenna Module 10

The present invention comprises an antenna module 10 comprising a geolocator. The antenna module 10 is shown in an embodiment thereof in FIGS. 5, 6, and 6A.

The antenna module 10 of the present invention comprises a casing 11 defining a containment volume. The casing 11 can be made of a plastic, a metal or a composite material. The casing 11 extends in length, width and height, in which such length is preferably between 80 mm and 200 mm, said width is preferably between 80 mm and 200 mm, and said height is preferably between 40 and 80 mm. The containment volume has a volume between 0.5 and 2 litres.

It should be noted that the antenna module 10 is a portable device, for example a portable device which can be conveniently carried by hand by a user: in this regard, the antenna module 10 preferably has a weight between 50 g and 1000 g, in particular between 100 g and 700 g, more in particular less than 500 g, more in particular less than 300 g.

The casing 11 preferably has a substantially rectangular or square shape, alternatively it can have a circular or egg shape.

The casing 11 can be made in two pieces, for example by an upper shell 11*a* and a lower shell 11*b* which, when constrained to each other, define the containment volume 13: the upper shell 11*a* and the lower shell 11*b* can be constrained to each other by removable coupling means, for example screws, or they can be welded or glued to each other.

The casing 11 can be waterproof so as to prevent water and/or moisture and/or dust from penetrating inside the containment volume 13. In particular the casing 11 can comprise a gasket, for example a gasket made of polymeric material, for example silicone or rubber, interposed between the first shell 11*a* and the second shell 11*b* so as to isolate the containment volume 13 from the external environment and prevent the entrance of water, moisture or dust.

The antenna module 10 further comprises a satellite position locator 12 housed in the containment volume 13 and configured to emit a position signal representative of the position of the antenna module 10. In particular, the satellite locator can provide a geolocation of the antenna module 10, for example in terms of geographical coordinates.

The satellite locator is of the GNSS Global Navigation Satellite System type and has a maximum spatial resolution, in terms of positioning accuracy, between 1 cm and 100 cm, more in particular between 5 cm and 50 cm. The term "spatial resolution" refers to the ability to distinguish the position within the aforesaid spatial intervals. It should be noted that the satellite locator of the antenna module 10 has greater accuracy in terms of positioning accuracy with respect to the common GNSS locators present in smartphones.

The antenna module 10 further comprises at least one control unit 15 housed in the containment volume 13 and operatively connected to the satellite locator: the control unit 15 is configured at least to receive the position signal from the satellite locator of the antenna module 10, and to generate at least one piece of information related to the position of the antenna module 10 based on the position signal. The position information of the antenna module 10 can be expressed in terms of geographical coordinates in real time, e.g., with a sampling rate between 1 Hz and 1000 Hz.

The antenna module 10 can further comprise a transmitter 14 housed in said containment volume and configured to transmit information remotely through a communication network. The communication network can be a local area network or an internet network or remote server 91. Alternatively, the transmitter 14 can be a Bluetooth or Wi-Fi transmitter 14, or a radio transmitter 14. In other words, the transmitter 14 can comprise any system belonging to the state of the art configured to transmit remotely, preferably wirelessly, at least the position information processed by the control unit 15.

The control unit 15 of the mobile device 2 can thus be configured to command the transmitter 14 to remotely transmit the at least one piece of information related to the position of the antenna module 10. The information can be transmitted to a remote device 90, e.g., a smartphone, a tablet, a computer, or to a remote server 91 by means of, for example, connection to an internet or Bluetooth network.

Further the antenna module 10 can comprise a battery configured to electrically power the control unit 15, the satellite locator 12 and optionally, if present, the transmitter 14.

The battery is preferably of the rechargeable type by means of a physical charging connector: alternatively, the battery can be recharged by means of an induction system.

Figure 6A:
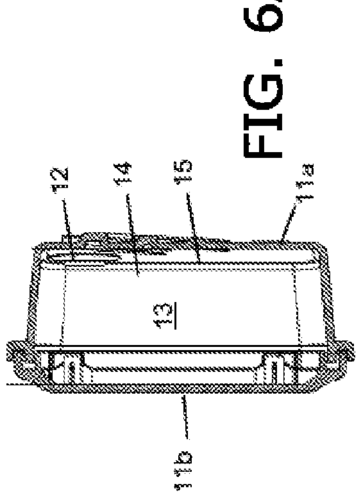
FIG. 6A is a view in section A-A of the antenna module depicted in FIG. 6.
Figure 6:
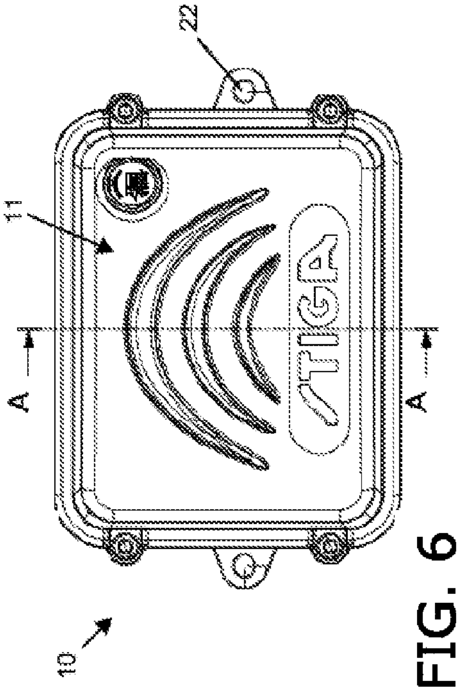
FIGS. 5 and 6 show side and top views, respectively, of the antenna module in accordance with the present invention.
Figure 5:
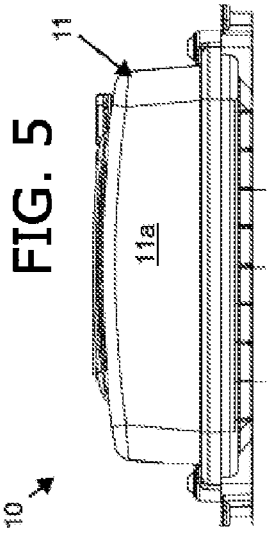

Further features of the antenna module 10 are clearly depicted in FIGS. 5, 6 and 6A or can be directly deduced from FIGS. 5, 6 and 6A.

Figure 14:
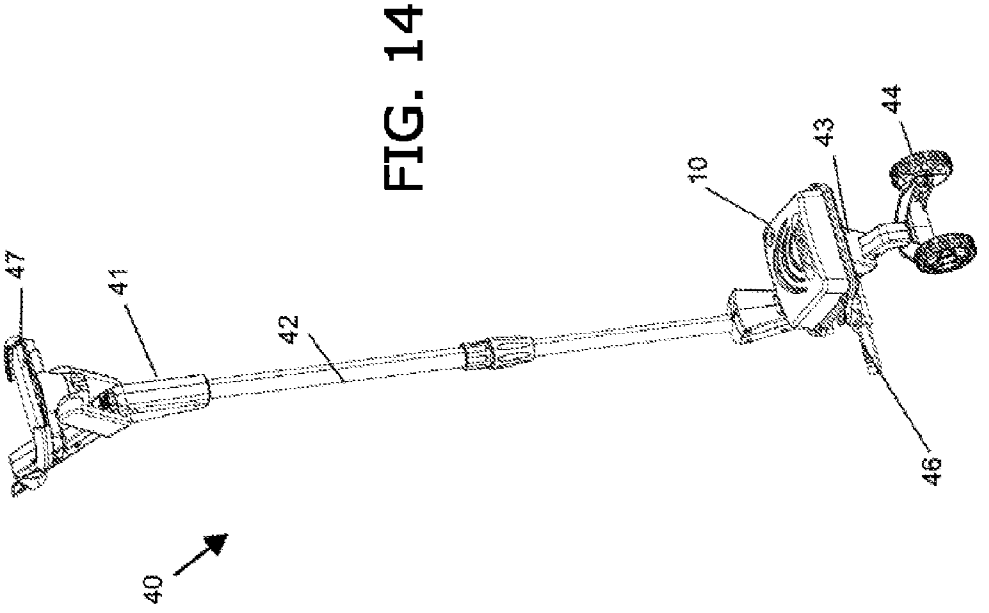
FIG. 14 is a perspective view of a mobile support carrying the antenna module and comprising an auxiliary support structure for constraining a remote device, for example a smartphone.
Figure 13:
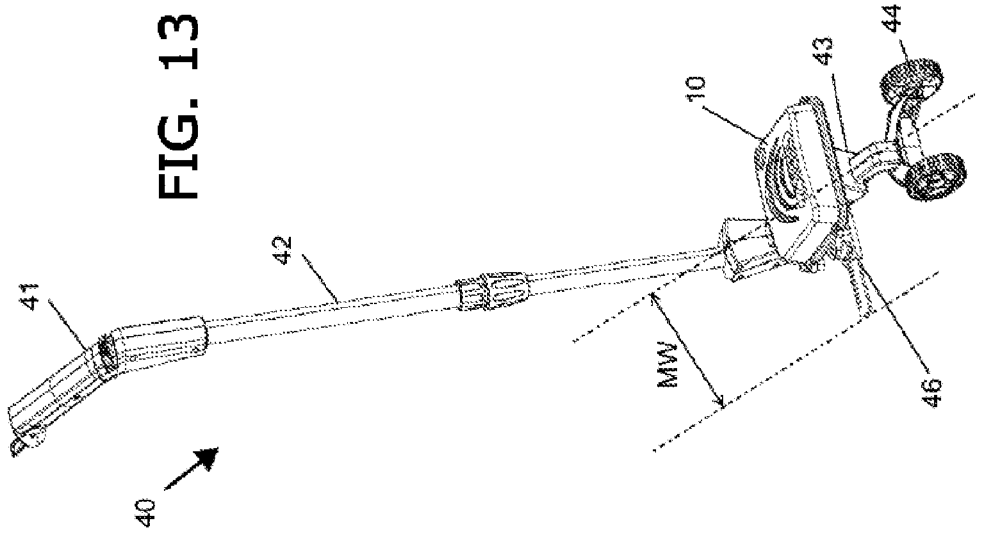
FIG. 13 is a perspective view of a mobile support carrying the antenna module and comprising a lateral template.

In an embodiment, the antenna module 10 comprises a power connector, suitable for selectively establishing an electrical connection between the antenna module 10 and an external device with respect to the antenna module 10, in particular so as to allow such an external device to receive electrical power from the on-board battery of the antenna module 10. The power connector can be implemented as a connector integrated with the charging connector, or it can be implemented as a connector separate from the charging connector. Specifying that such an embodiment of the antenna module 10 has inventive contents per se, such an embodiment will be further discussed in the following of the present disclosure, in relation to further contents of the present invention and with particular reference to FIGS. 14B to 14D.

In a further embodiment (which itself also has inventive contents and which, being mutually non-exclusive with the previous embodiment, is therefore combinable with the previous embodiment), the antenna module 10 comprises at least one contactless-type sensor, configured to detect the presence of a possible obstacle and/or to detect the distance between a possible obstacle and said contactless-type sensor and/or to discriminate a condition of the presence of at least one obstacle within at least one detection volume from a condition of absence of obstacles within the detection volume. The at least one contactless-type sensor can comprise an optical sensor and/or an optical sensor array and/or a video camera and/or a radio frequency sensor and/or a radio frequency sensor array and/or a time-of-flight sensor and/or an inductive sensor and/or a capacitive sensor and/or a magnetic sensor and/or an ultrasonic sensor and/or a radar sensor and/or a lidar sensor. The at least one contactless-type sensor can define and/or simulate one or more dimensions and therefore can operate as a virtual template. The at least one contactless-type sensor can be applied on an exposed surface of the casing 11 of the antenna module 10, the application to the surface of the antenna module 10 advantageously ensuring the at least one contactless-type sensor arranges a suitable detection angle.

Specifying that such a further embodiment of the antenna module 10 also has inventive contents per se, such further embodiment will be further discussed in the following of the present disclosure, in relation to further contents of the present invention and with particular reference to FIGS. 14E and 14F, in which an antenna module 10 comprising at least one contactless-type sensor notably configured to detect the presence of an obstacle and/or to detect the distance between a possible obstacle and said contactless-type sensor is applied to a mobile support 40, in particular to a mobile support 40 usable for installing a mobile device 20 in a working area 1. Assembly 100 and charging station 20

The present invention can comprise an assembly 100 comprising the antenna module 10 described above, and a charging station 20 configured to electrically connect to the mobile device 2 and charge the on-board battery of the mobile device 2. The charging station can in turn be powered by a domestic electric network, for example a 110V, 220V or 380V electric network, through a supply cable. The charging station 20 can deliver an electric current between 2 A and 20 A. In particular, the charging station 20 is configured to allow a complete charge of the battery of the mobile device 2.

The charging station 20, shown in a non-limiting embodiment thereof in FIGS. 3, 4, 15 and 16, comprises at least one charging system configured to charge the battery of the mobile device 2.

Such a charging system can be an induction charging system, in which the mobile device 2 and the charging station 20 are electrically connected wirelessly.

Figure 3:
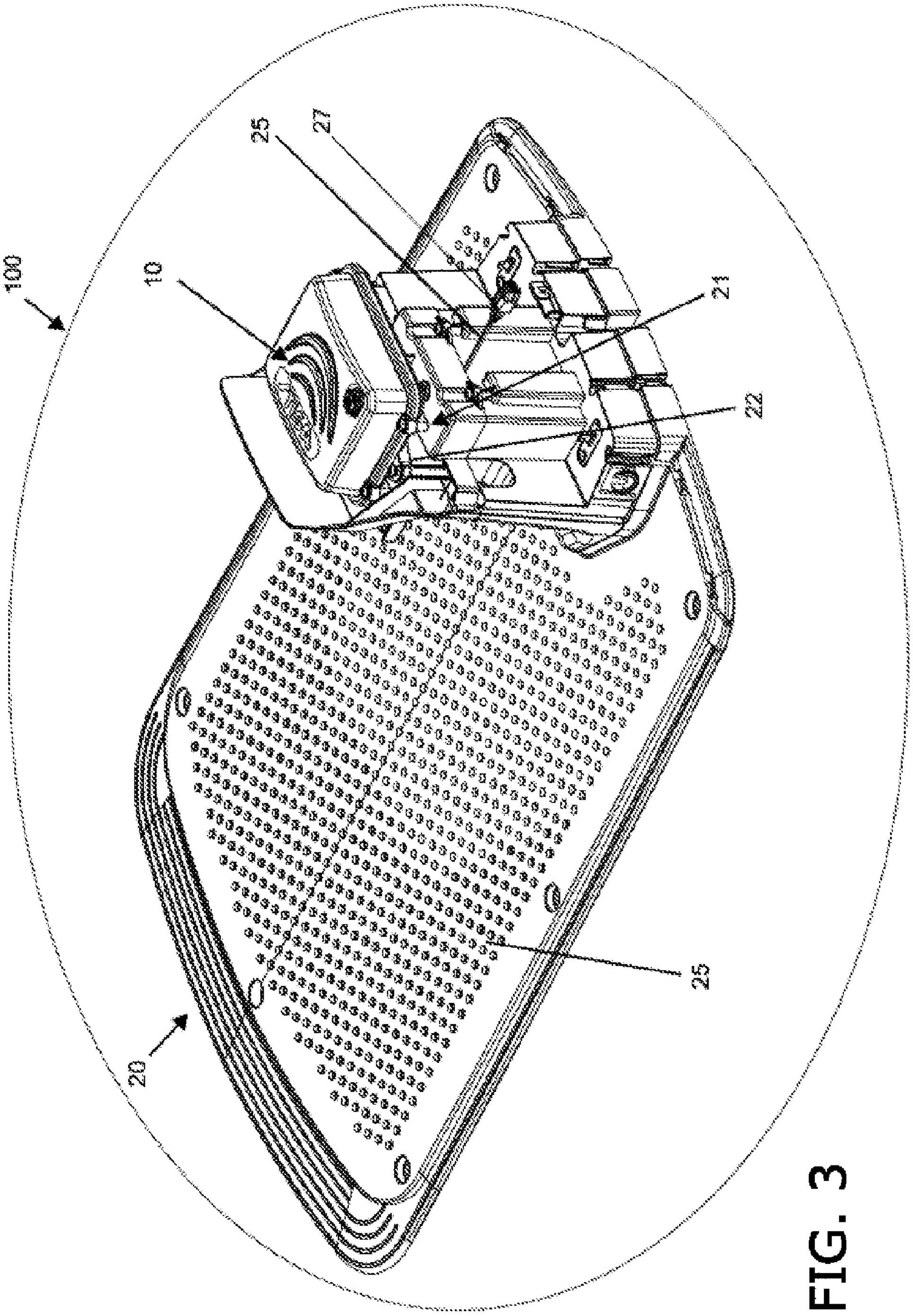
FIG. 3 is a perspective view of a charging station carrying an antenna module in accordance with the present invention.
Figure 4:
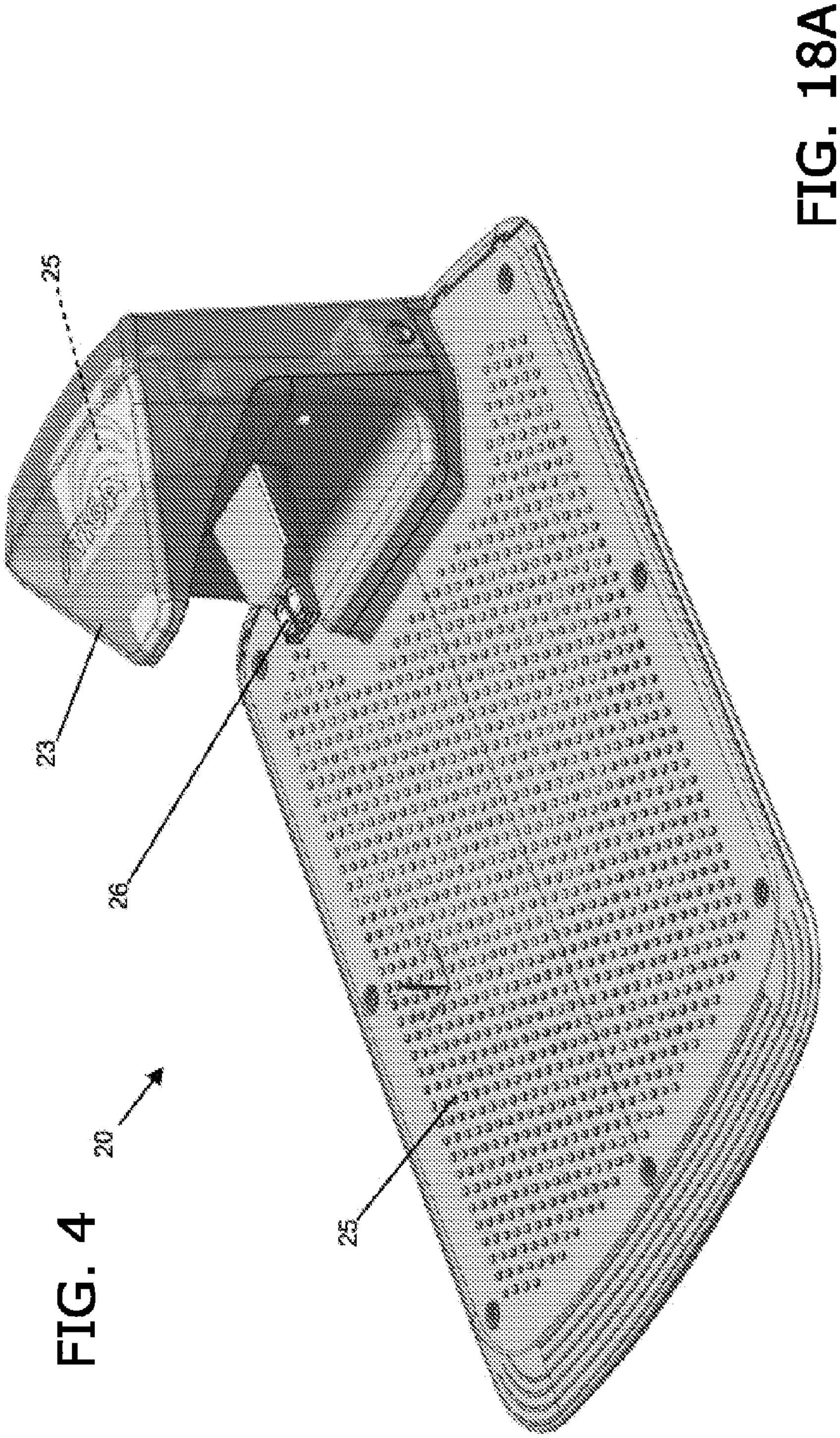
FIG. 4 is a further perspective view of a charging station carrying an antenna module in accordance with the present invention.

Alternatively or in combination with the wireless charging system, the charging system 26 comprises a charging socket for the physical connection between the mobile device 2 and the charging station 20, as shown in FIGS. 3 and 4. Preferably, such a charging socket can be arranged so that the mobile device 2 can connect autonomously when arranged at the charging station 20: for example the mobile device 2, in the event in which it detects a battery charge value lower than a predetermined threshold, can be programmed to return towards the charging station 20 and autonomously connect to the charging socket 26 to allow charging of the on-board battery of the mobile device. The charging station 20 can comprise a substantially flat charging base 25 configured to supportingly receive the mobile device 2 at least during a charging condition of the mobile device 2. The charging base 25 can extend on a surface substantially equal to or similar to an extension of the mobile device 2.

In the event of an induction charging station 20, an inductor can be placed on the charging base 25, or alternatively inside the charging base 25.

As previously mentioned in the description section of the mobile device 2, the latter can be a self-driving mobile device 2. The self-driving system is configured to control the movement means of the mobile device 2 to guide the device within the working area 1: the self-driving system can further be configured to guide the mobile device 2 also towards and closer to the charging station 20, for example in the event in which the on-board controller 5 of the mobile device 2 detects a battery charge level lower than a predetermined threshold. In particular, the self-driving system can be configured to approach the charging station 20 and allow an electric connection between the charging station 20 and the mobile device 2.

The charging station 20 can comprise a proximity guide system, in particular distinct from the self-driving system used during a standard working condition, configured to guide the mobile device 2 towards the charging station 20. The proximity guide system comprises at least one guide wire arranged inside the charging base 25 or extending away from the base of the charging station 20, for example for a distance with respect to the charging station 20 of less than 2 metres, in particular less than 1 metre, in particular less than 50 cm. The mobile device 2 is thus configured, when near the guide wire, to detect said guide wire and to follow said guide wire approaching the base of the charging station 20: in such a case the self-driving system is configured to follow the guide wire until the charging station 20 is reached.

In an embodiment, the guide wire is a wire not travelled by current, and therefore not connected to a source of electric current. In other words, the guide wire can be a passive wire, preferably made of conductive material, for example copper, steel or aluminium or an alloy thereof, or of magnetic material. In such a case, the guide wire can extend away from the base of the charging station 20, for example for a distance with respect to the charging station 20 of less than 2 metres, in particular less than 1 metre, in particular less than 50 cm.

Alternatively, the guide wire can be electrically powered to determine a magnetic field, and in which the mobile device 2 can be configured to detect said magnetic field. The guide wire can extend along a peripheral portion of the base of the charging station 20, or centrally to the charging base 25. Optionally, the guide wire can extend along a left peripheral portion and a right peripheral portion of the base of the charging station 20. Alternatively the guide wire can extend along an outer perimeter of the base of the charging station 20 to define a ring, in which such a ring is configured to transit an electrical current in a clockwise or counter-clockwise direction.

The charging station 20 can comprise a seat 21 configured to house the antenna module 10. A coupling system 22 is configured to constrain the casing 11 of the antenna module 10 to the seat 21: the coupling system 22 comprises at least one among a removable interlocking coupling, a screw coupling, a magnetic coupling, a quick-coupling/release system 22.

The seat 21 is preferably raised with respect to the base of the charging station 20, so as to distance the antenna module 10 from the ground: for example the seat 21 can be raised in height with respect to the ground by a height between 1 cm and 30 cm. In greater detail, the base of the charging station 20 extends along a plane substantially coinciding with the surface of the ground when the charging station 20 is placed on the ground: the distance between the seat 21 and the surface of the base 25 is between 1 cm and 30 cm.

The antenna module 10, when constrained to the seat 21 of the charging station 20, can be electrically connected to the charging station 20, in which the charging station 20 electrically powers the antenna module 10. In this regard, the connector of the antenna module 10 can be configured to electrically connect to an auxiliary socket 27 of the charging station 20: the auxiliary socket 27 is thus configured to electrically connect and power the antenna module 10, for example to recharge the battery of the antenna module and/or to power the control unit 15, the transmitter 14 and the satellite locator 12 of the antenna module 10.

In other words, the charging station 20, powered through a cable connected to the home network, can in turn charge the mobile device 2 during a charging condition thereof, and also the antenna module 10. For example, the antenna module 10 can be electrically connected to the charging station 20 by an electrical cable 27*a*, or by an induction system configured to power the antenna module 10.

The antenna module 10 can be immovably constrained to the support seat 21 of the charging station 20. Alternatively, the antenna module 10 can be removably constrained to the support seat 21 of the charging station 20.

The charging station 20 can comprise a cover 23, shown in FIG. 4, arranged to close the seat 21 and configured to protect the antenna module 10 from atmospheric agents, dust, water, humidity. The cover 23 can be made of plastic or metallic material and can define, in combination with an outline of the seat 21 of the charging station 20, a sealed coupling, for example fluid tight.

The cover 23 is movable to allow the installation and removal of the antenna module 10 from the seat 21. In particular, the cover 23 is movable between a use position, in which the cover 23 prevents access to the seat 21, and a service position, in which the cover 23 allows access to the seat 21. The cover 23, when arranged in the service position, is configured to allow the insertion of the antenna module 10 and/or the extraction of the antenna module 10 from the seat 21.

The cover 23 is constrained to the charging station 20 by means of releasable hinges or hooks so as to enable the position of the cover 23 to be switched from the use position to the service position and vice versa. In other words, the cover 23 is configured to move from the use position (shown in FIG. 4) to the service position and vice versa easily and quickly to facilitate the movement of the antenna module 10 for an operator.

The cover 23, in combination with the seat 21, defines an internal compartment configured to house the antenna module 10. The antenna module 10 is preferably entirely inserted in the internal compartment of the charging station 20, so that the cover effectively protects the antenna module 10.

An assembly 100 comprising the charging station 20 and the antenna module 10 can then be articulated according to:

- a first arrangement in which the antenna module 10 is constrained to the charging station 20 and located in the seat 21, and
- a second arrangement in which the antenna module 10 is separated from the charging station 20 and can be located remotely from the charging station 20, for example on an external installation 31 or on a mobile support 40, of the type described below, configured to define the virtual perimeter of the working area 1 within which the mobile device 2 is adapted to execute land maintenance operations.

Further features of the charging station 20 are clearly depicted in FIGS. 3 and 4 or can be directly deduced from FIGS. 3 and 4.

The charging station 20 comprises a member of a releasable-type connection system, in particular a member complementary to the member forming part of the mobile device 2 so as to be able to establish a removable-type connection between the two members, said member being intended to ensure that the electrical power delivered by the charging station 20 reaches the mobile device 2.

In an embodiment of the present invention, the charging station 20, especially with regard to aspects related to the connection thereof to the mobile device 2, implements the teachings referred to in patent application EP4009482A1 on behalf of the same Applicant. In particular, the charging station 20 comprises a power supply head provided with electrical contacts, configured to removably couple with, and at least partially enter into, the charging socket of the mobile device 2 so as to cause a deformation of the electrical contacts of the charging socket, the electrical contacts of the charging station 20 being preferably provided with one or more convex portions so as to ensure a more stable electrical continuity. Such an embodiment is to be understood as an example given herein by way of non-limiting explanation, in which the charging head can also be associated with the mobile device 2 and the charging socket can instead be associated with the charging station 20.

Fixing Bracket 30 for the Antenna Module 10

Figure 7:
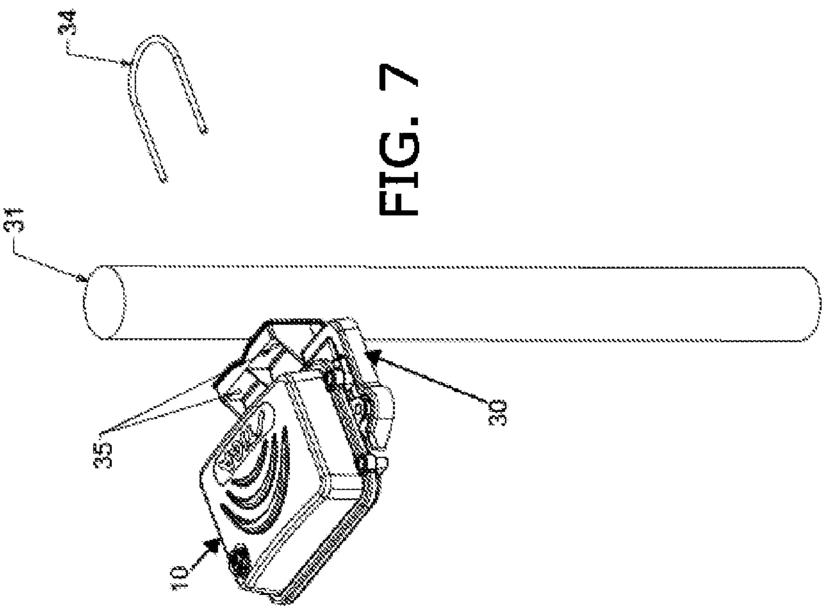
FIG. 7 is a perspective view of an antenna module constrained to an external installation, in particular to a pole.

A fixing bracket 30 can be provided for constraining the antenna module 10 to an external installation 31, as shown in FIG. 7, when in the second arrangement and then removed from the charging station 20. The external installation 31 can be a tree trunk, a pole, a pipe or similar structures arranged outdoors. In particular the external installation 31 can be chosen so as to improve the satellite connection of the detector of the antenna module 10: for example the external installation 31 can be in an open area, free of elements which can shield or limit the satellite connection between the detector 12 of the antenna module 10 and the satellites.

The fixing bracket 30 comprises a support portion 33 configured to be constrained to the casing 11 of the antenna module 10 and an anchoring portion 32 configured to be constrained to the external installation 31. The support portion 33 and the anchoring portion 32 can be made of plastic or metal material. The support portion can further comprise a pair of arms connectable to opposite sides of the casing 11 of the antenna module 10, for example by means of screws and/or mechanical couplings.

The anchoring portion 32 can comprise an abutment plate 32*a*, connectable to the wall, for example by means of screws: a fixing ring 34, shown in FIG. 7, can be configured to engage to the abutment plate 32*a* so as to lock the fixing bracket 30 to a pole or tree trunk 31.

Figure 9:
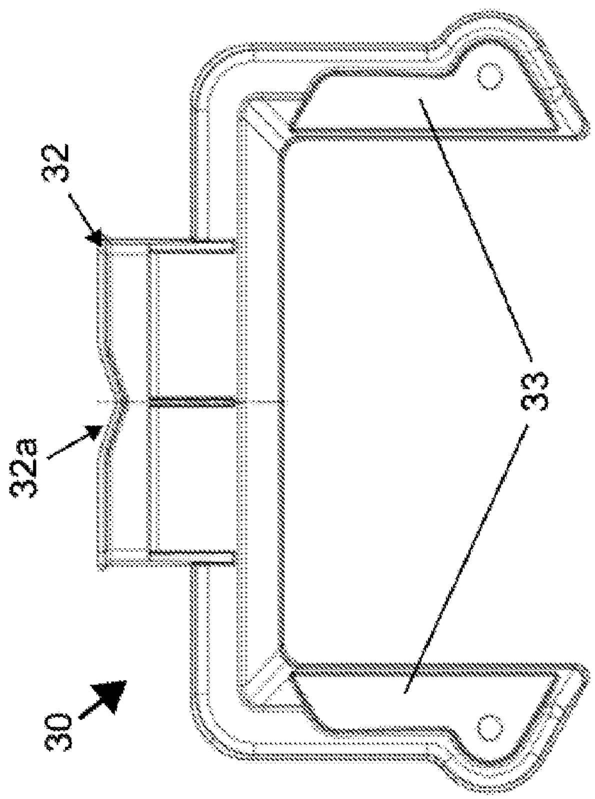
FIGS. 9 and 10 are perspective views of the fixing bracket for constraining the antenna module to an external installation.
Figure 10:
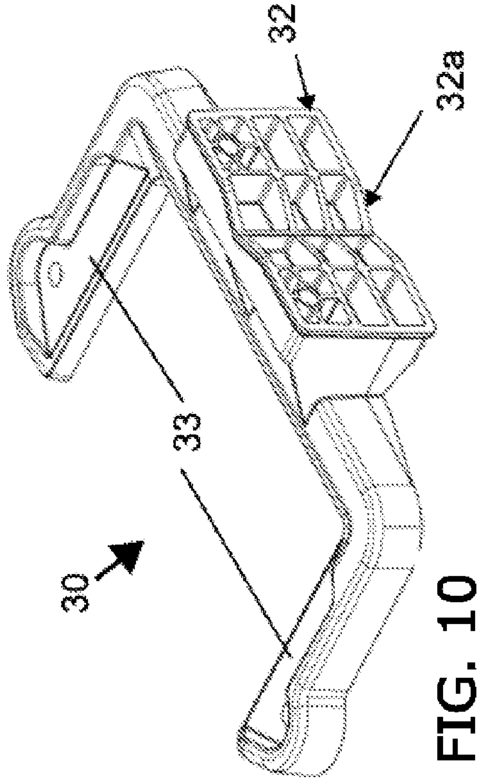
Figure 8:
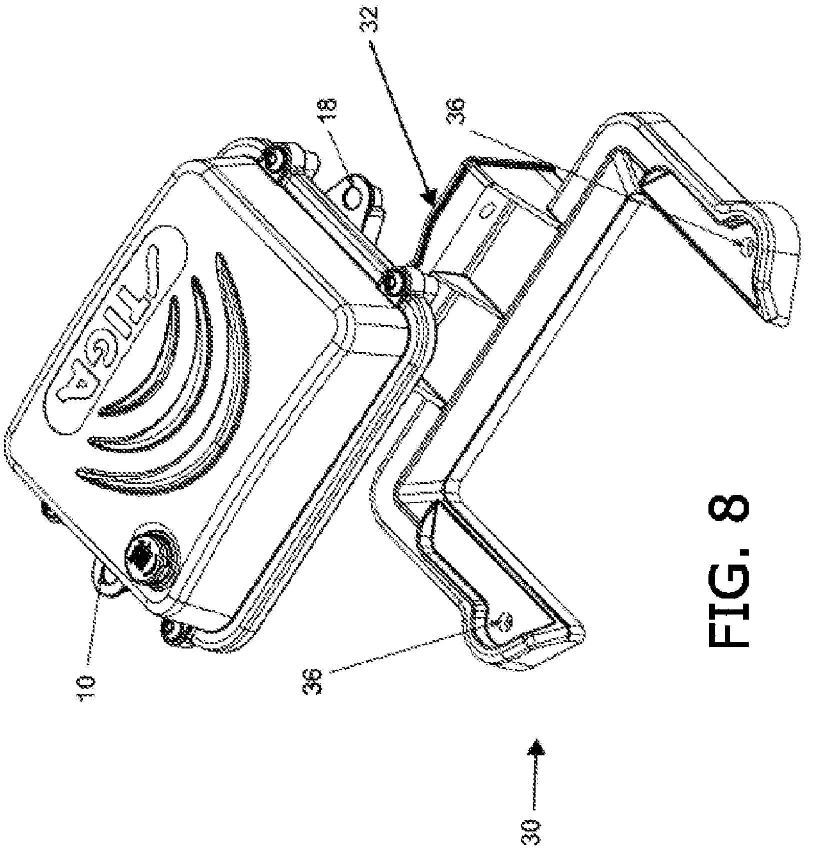
FIG. 8 is a perspective view of the antenna module and a respective fixing bracket for constraining the antenna module to an external installation.

Further features of the fixing bracket 30 (in particular the features of the fixing bracket 30 which allow the use thereof, possibly in combination with the fixing ring 34, separately from the cover 23 and from the further components of the charging station 20 and/or which allow an installation thereof in a remote position with respect to the charging station 20) are clearly depicted in FIGS. 8, 9 and 10 or directly deducible from FIGS. 8, 9 and 10. In order to allow the power supply of the antenna module 10 when in a remote position with respect to the charging station 20, an electric cable is advantageously brought up to the external installation 31 and connected to the physical charging connector of the antenna module 10.

It should be noted that the fixing bracket 30 described herein and depicted in the figures annexed to the present disclosure has per se features worthy of being recognized as inventive. It should also be noted that the fixing bracket 30 can be used for constraining to an external installation, in addition to an antenna module 10, also further removable elements, in particular further removable elements of a charging station 20 for a mobile device 2.

Regarding the use of the fixing bracket 30 (and possibly also of the fixing ring 34) in combination with the antenna module 10, it is evident that the fixing bracket 30 ensures a high flexibility in the installation of the antenna module 10, whereby such an antenna module 10, in addition to being arranged at a considerably higher height with respect to the height of the same antenna module 10 when housed in the special seat 21 of the charging station 20, it can also be ideally positioned in any point of a working area 1.

Thereby, recalling that the antenna module 10 can be intended to act as a fixed reference station for a navigation of a mobile device 2 in the working area 1 according to an algorithm of the RTK type, on the one hand the obvious advantage of being able to place the antenna module 10 at a point of the working area 1 generally characterized by an optimal reception of the position signal, in particular of the GNSS signal, and on the other hand the obvious advantage of being able to place the charging station 20 at the point of the working area 1 deemed most suitable is obtained, such a location not being prevented by considerations related to the robustness of the position signal in such a point. In fact, by virtue of the remote installation of the antenna module 10, made possible by the fixing bracket 30, the positioning of the charging station 20 in the working area 1 can ideally disregard the positioning of the antenna module 10.

Figure 7A:
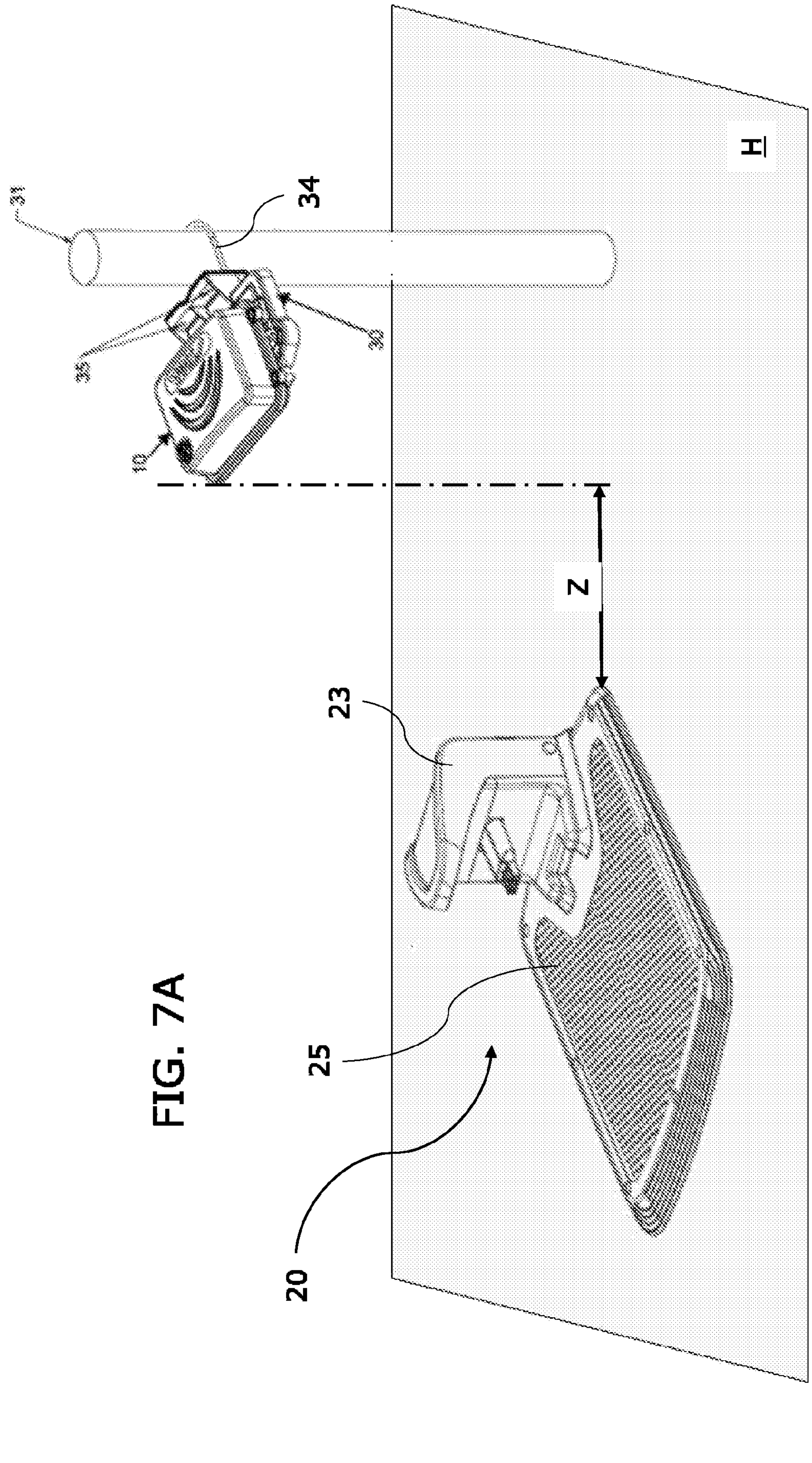
FIG. 7A shows an assembly comprising a charging station and the respective antenna module, the latter being constrained to an external installation by means of a fixing bracket.
Figure 12:
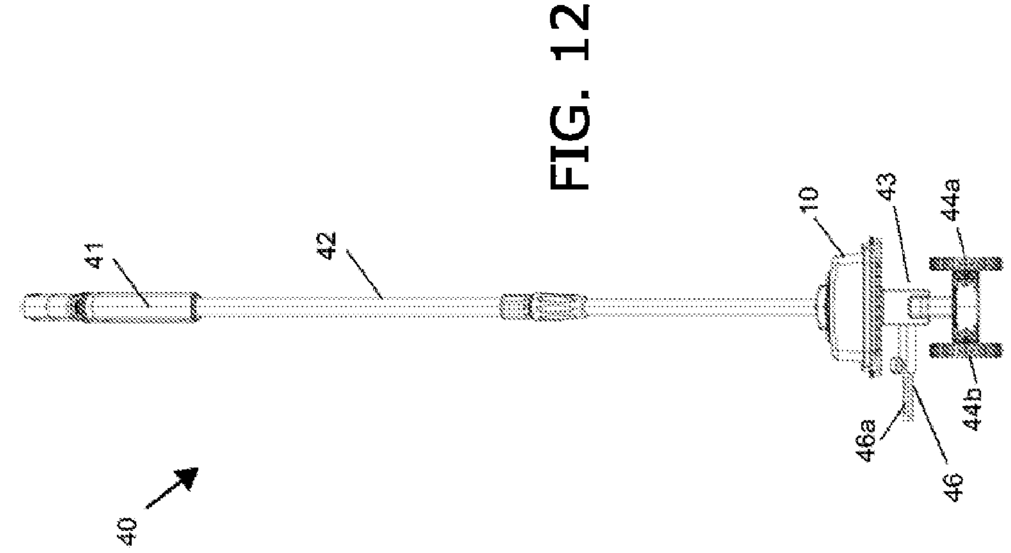
FIG. 12 is a front view of a mobile support carrying the antenna module.
Figure 11:
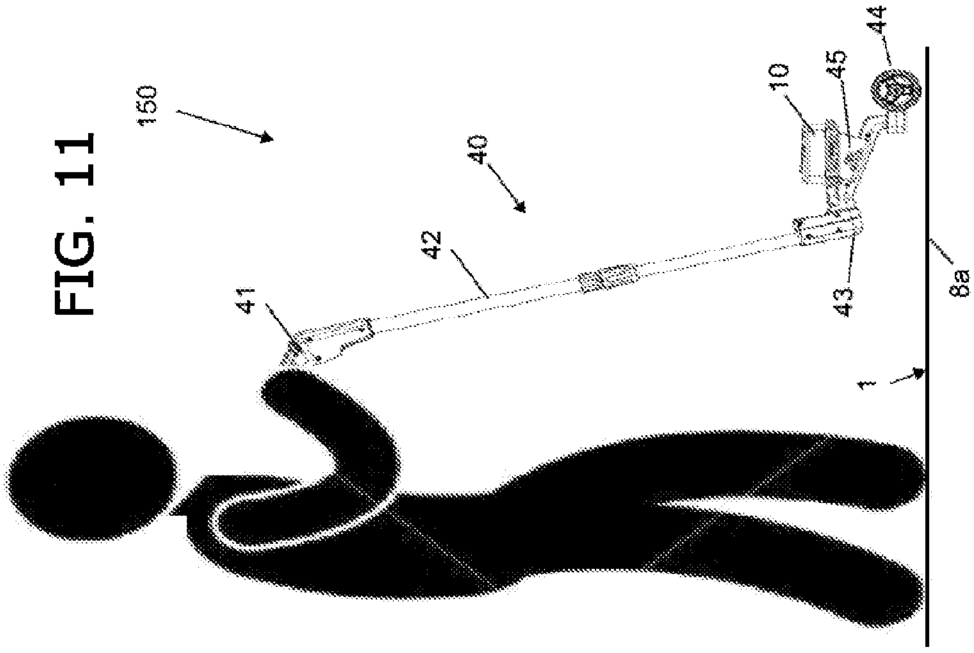
FIG. 11 is a schematic view of an operator carrying the mobile support, and the antenna module constrained thereto, along a perimeter of the working area during an installation procedure or method.

Such advantages are effectively depicted in FIG. 7A, which shows the antenna module 10 (possibly previously removed from the charging station 20) constrained to an external installation, by means of a fixing member such as in particular the fixing bracket 30. In FIG. 7*a*, the plane H represents a projection of the working area 1 on a horizontal plane, in particular on a horizontal plane at the height at which the charging station is located.

In FIG. 7A, it can be appreciated that the geographical coordinates of the points of the antenna module 10 all differ from the geographical coordinates of the points of the charging station 20. In other words, there is no point of the antenna module 10 which shares the same geographical coordinates with any point of the charging station. Still in FIG. 7A, it can be seen that the points of the antenna module 10 and of the charging station 20 closest to each other are separated, on the horizontal plane H, by a non-zero distance H, such a distance H being preferably greater than one metre, more preferably greater than three metres, even more preferably greater than five metres. In FIG. 7A, it can lastly be appreciated that there is no contact between the antenna module 10 and the charging station 20.

The features listed above, which ensure maximum flexibility in the relative arrangement between antenna module 10 and charging station 20, are clearly distinctive features of the present invention, given that the known technical solutions envisage, at most, an almost-null displacement of the antenna module between two distinct installation platforms obtained in the charging station.

Location System 200

The present disclosure also relates to a location system 200 adapted to increase the accuracy in estimating the positioning of the mobile device 2 during a use condition thereof.

The system comprises the above-described antenna module 10, charging station 20 and mobile device 2.

In particular, the mobile device 2 is a self-driving device and comprises movement means to determine the motion thereof.

The mobile device 2 comprises its own satellite position locator 3 configured to emit a position signal representative of the position of the mobile device 2, in particular of the geolocation, in the form of geographical coordinates.

The mobile device 2 further comprises a remote communication system 4, comprising in particular a receiver or a transceiver 14, and an on-board controller 5 operatively connected to the satellite locator 3 of the mobile device 2 and to the communication system 4.

The location system 200 thus comprises at least one processor, chosen among the on-board controller 5 of the mobile device 2, the control unit 15 of the antenna module 10 and an auxiliary control unit, configured to execute an adjustment procedure 50 of the position of the mobile device 2. The adjustment procedure 50 comprises the step of calculating a correct or adjusted position of the mobile device 2 as a function of a position signal of the antenna module 10, and a position signal of the mobile device 2.

In particular, the adjustment procedure 50 comprises a step of executing an algorithm of the "Real Time Kinematic" RTK type, known in the state of the art and to the person skilled in the art: the RTK algorithm calculates the position of the mobile device 2 as a function of the position signal of the antenna module 10 and the position signal of the mobile device 2.

In accordance with the RTK algorithm, the position of the antenna module 10 must be kept fixed, de facto defining a reference station of the RTK algorithm. In accordance with the present invention, the antenna module 10 is placed at the seat 21 of the charging station 20 during a working condition of the mobile device 2.

The on-board controller 5 of the mobile device 2 is operatively connected to the movement means and is configured to autonomously guide the mobile device 2 as a function of the correct position of the mobile device 2 during driving: the correct position of the mobile device 2 assumed during driving is calculated by means of the adjustment procedure 50.

Using the information derived from the fixed antenna module 10, and from the satellite locator of the mobile device 2, the RTK algorithm allows to increase the accuracy of the estimation of the position of the mobile device 2, for example during an operating condition of the mobile device 2, for example while the mobile device 2 executes maintenance operations within the working area 1.

The fact that the antenna module 10 is carried directly by the charging station 20 allows to keep the antenna module 10 constantly powered through the auxiliary socket 27, and to keep it protected within the internal compartment defined by the cover 23. It should also be noted that the charging station 20 is commonly maintained outdoors, and thus in a position commensurate with the need of the antenna module 10 to effectively connect to the satellites.

It should be specified that the navigation of the mobile device 2 by means of the RTK algorithm described herein, whereby the accuracy and/or precision of the position signal of the mobile device 2 is obtained referring to a fixed station represented by the antenna module 10, is also effective in the event of installation of the antenna module 10 remotely with respect to the charging station 20 (for example, in the event of fixing the antenna module 10 to the external installation 31). In such a case, in fact, since the antenna module 10 and the charging station 20 are both in a fixed position, the positions of the antenna module 10 and the charging station 20 differ from each other by a known offset (which can be expressed in terms of geographical coordinates and which can be quantified during installation).

The use of the RTK algorithm for the navigation of the mobile device 2 in the working area allows a centimetre precision in the detection of the position of the mobile device 2, in accordance with the regulations in force in particular for robot lawnmowers, so that it is no longer necessary to install the traditional perimeter wires to prevent unwanted encroachments from the working area 1. Installation procedure 60

The present disclosure further relates to an installation procedure 60 of the mobile device 2 within a working area 1: the installation procedure 60 can be executed by the on-board controller 5 of the mobile device 2, by the control unit 15 of the antenna module 10 or by an auxiliary control unit.

The installation procedure 60 comprises the steps of:

- moving the mobile device 2 along a perimeter **8*a* of the working area 1 and/or along one or more boundary lines delimiting the working area 1 and/or at one or more obstacles 8*b* in the working area 1**;
- defining a virtual perimeter representative of said perimeter **8*a* and/or one or more virtual boundary lines representative of said one or more boundary lines and/or one or more virtual obstacles 8*b* representative of said one or more obstacles 8*b***.

The installation procedure 60 can be executed according to the correct position of the mobile device 2 progressively assumed during its movement along the perimeter **8*a* of the working area 1: in other words the installation procedure 60 comprises the step of executing, during the movement of the mobile device 2, the adjustment procedure 50**, and, as a function of the correct position of the mobile device, defining the virtual perimeter.

The virtual perimeter, virtual boundary lines and virtual obstacles **8*b*** can comprise geographical coordinates.

The installation procedure 60 is preferably chronologically before a self-driving condition of the mobile device 2: in other words, the installation procedure 60 allows to define the boundaries within which the self-driving mobile device 2 must to operate during an operating condition thereof, to execute the land maintenance operations.

The installation procedure 60 of the mobile device 2 can further comprise the steps of establishing a connection condition of the mobile device 2 with the charging station 20, and determining the position of the charging station 20 as coincident with the correct position of the mobile device 2 in the connection condition with the charging station 20.

The installation procedure 60 of the mobile device 2 can further comprise a step of including a plurality of intermediate points along the perimeter **8*a* of the working area 1 and/or along the boundary lines delimiting the working area 1**. The intermediate points are configured to act as restoration points following an event which has previously caused an interruption in the installation step, such as a detection of an obstacle or a detection of unsuitable terrain or an entry into a shadow area of a position signal.

A processor, for example the on-board controller 5 of the mobile device 2 or the control unit 15 of the antenna module 10 or an auxiliary control unit, is configured to execute a mapping procedure of the working area 1, comprising the steps of:

obtaining a first region and at least one further region within the working area 1 and assigning to the first region and to the further region different tolerance thresholds relative to the uncertainty in the detected or estimated position of the mobile device 2.

Figure 16:
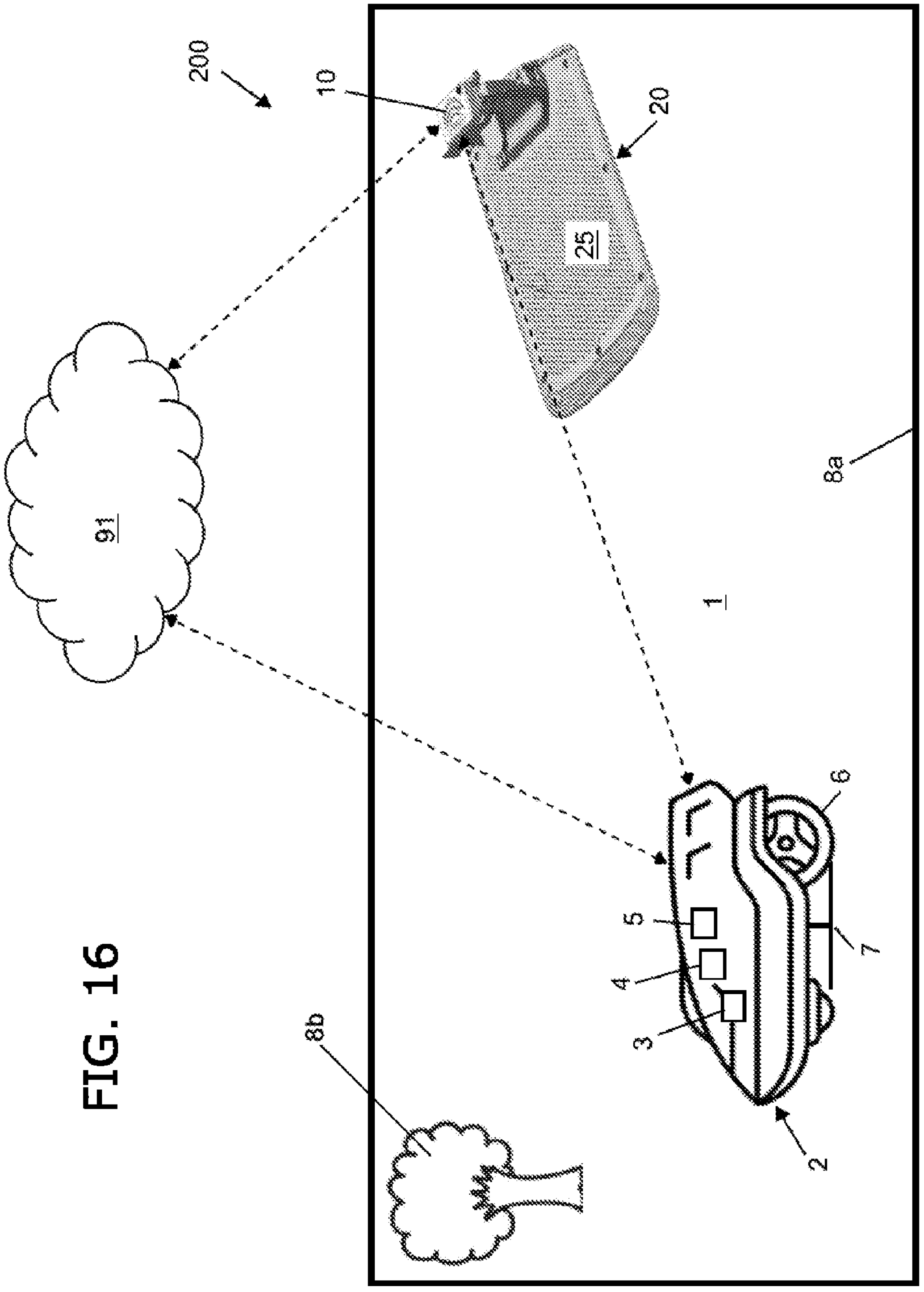
FIG. 16 is a schematic view of an assembly comprising a mobile device, a charging station and an antenna module in accordance with the present invention during a self-driving condition of the mobile device or during an installation procedure.
Figure 16A:
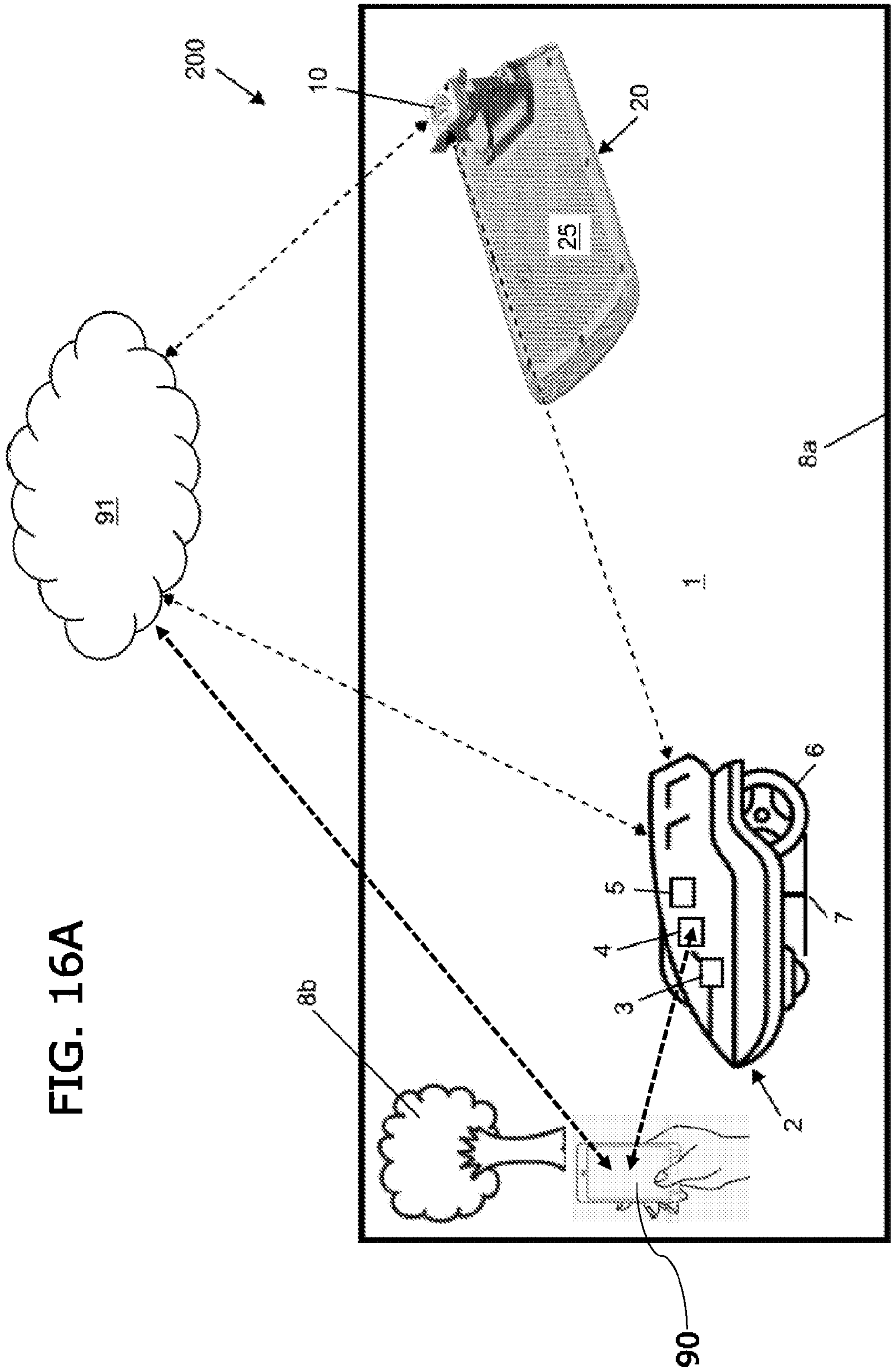
FIG. 16A is a further schematic view of an assembly according to the present invention, according to an alternative embodiment of an installation method according to the present invention.
Figure 19:
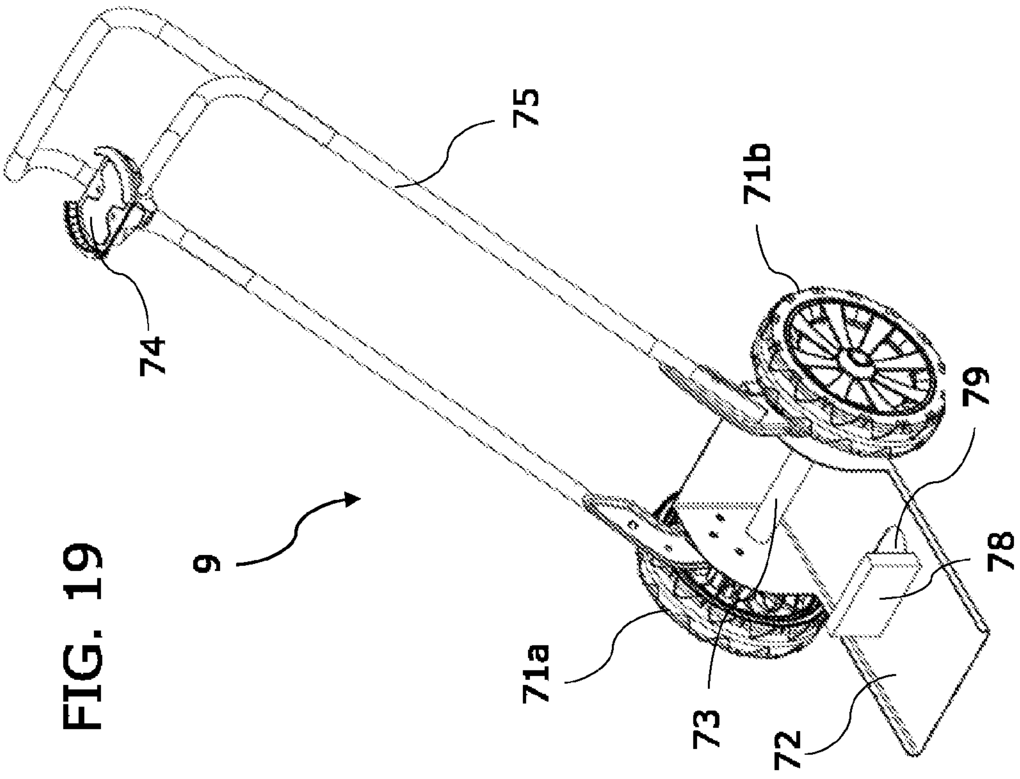
FIG. 19 is a perspective view of a mobile support adapted to constrain and carry a mobile device, according to the present invention.
Figure 20:
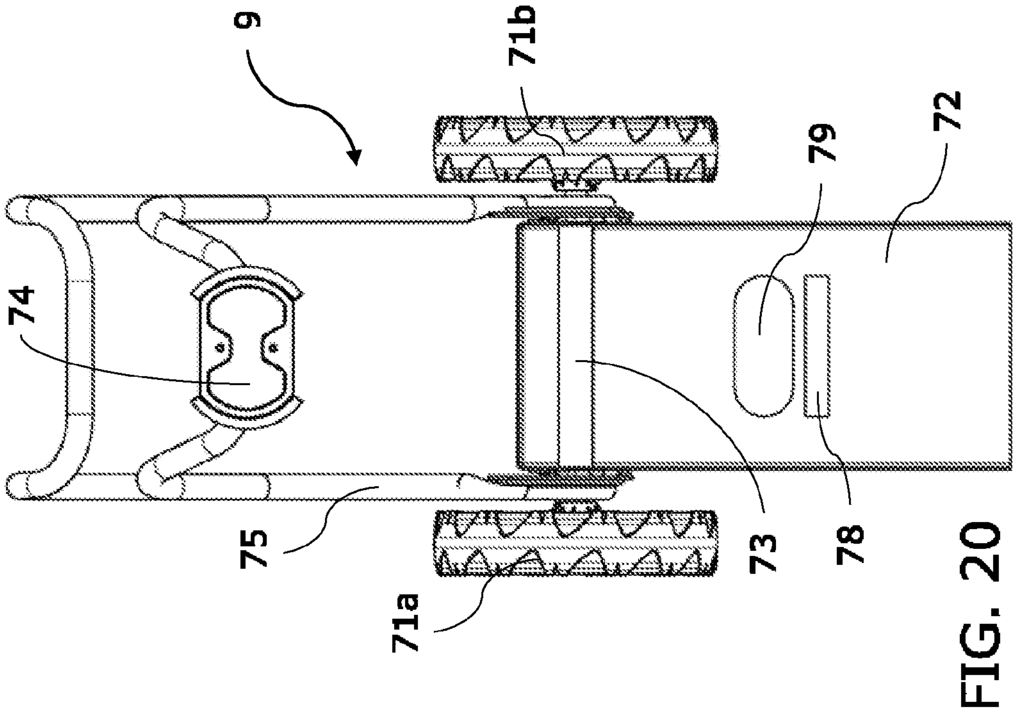
FIG. 20 is a top view of a mobile support adapted to constrain and carry a mobile device, according to the present invention.
Figure 22:
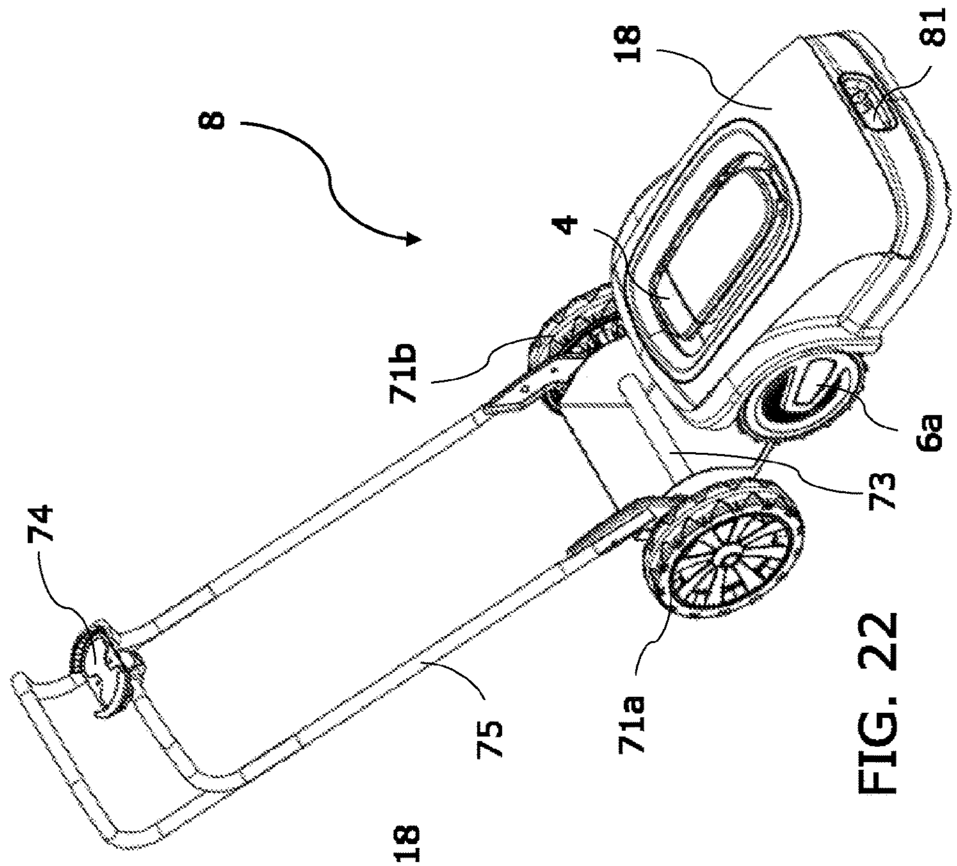
FIG. 22 is a perspective view of a system comprising at least one mobile support and a mobile device according to the present invention.
Figure 21:
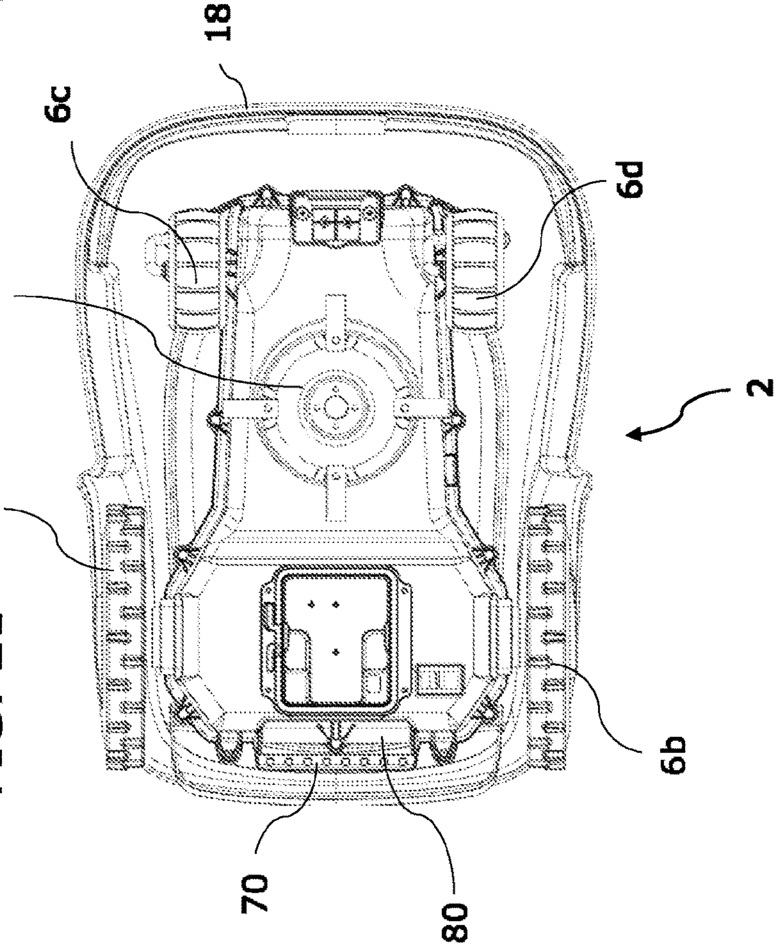
FIG. 21 is a bottom view of a mobile device according to the present invention.
Figure 23:
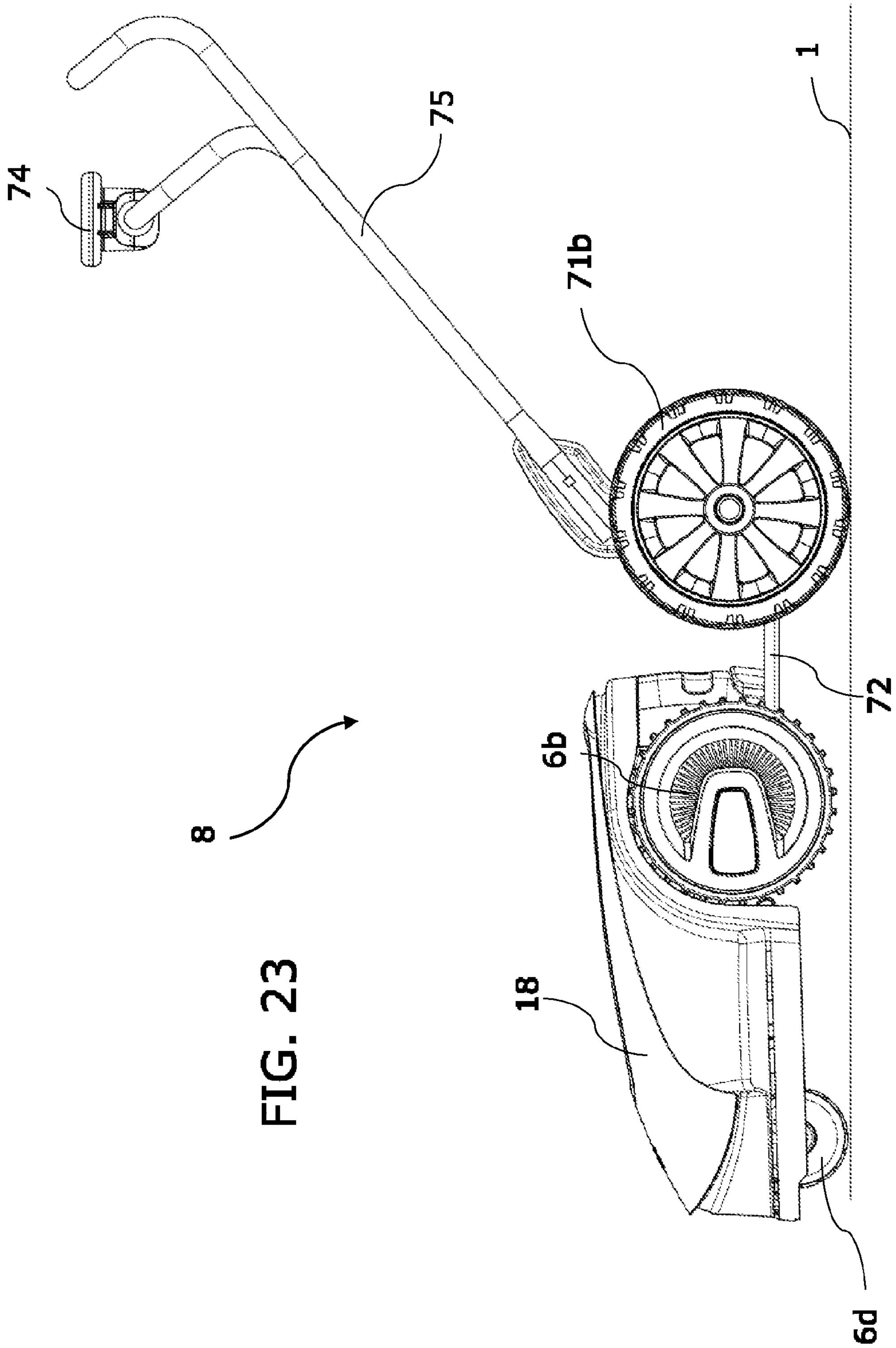
FIG. 23 is a side view of a system comprising at least one mobile support and a mobile device according to the present invention.
Figure 24:
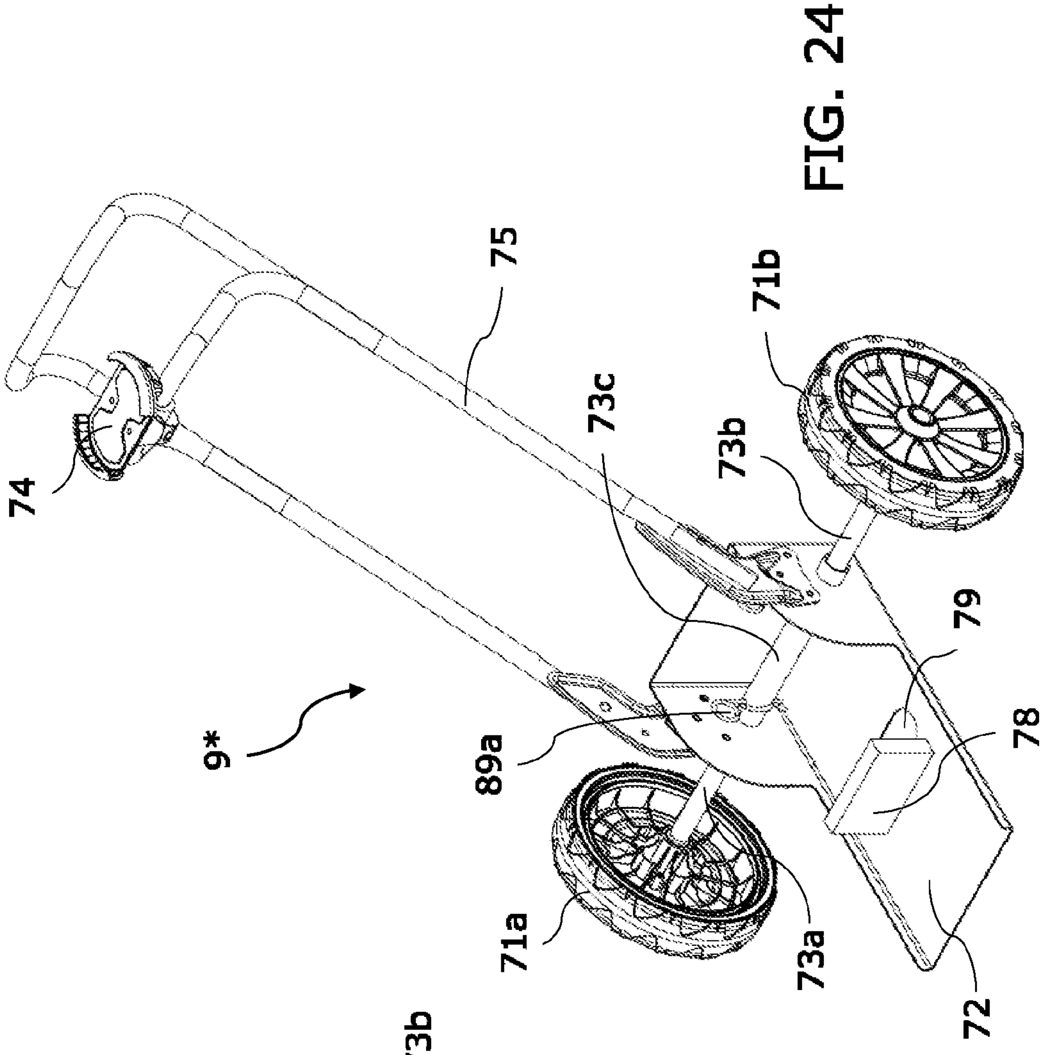
FIG. 24 is a perspective view of a mobile support adapted to constrain and carry a mobile device, with the wheels extendable according to the width of the mobile support, according to the present invention.
Figure 24A:
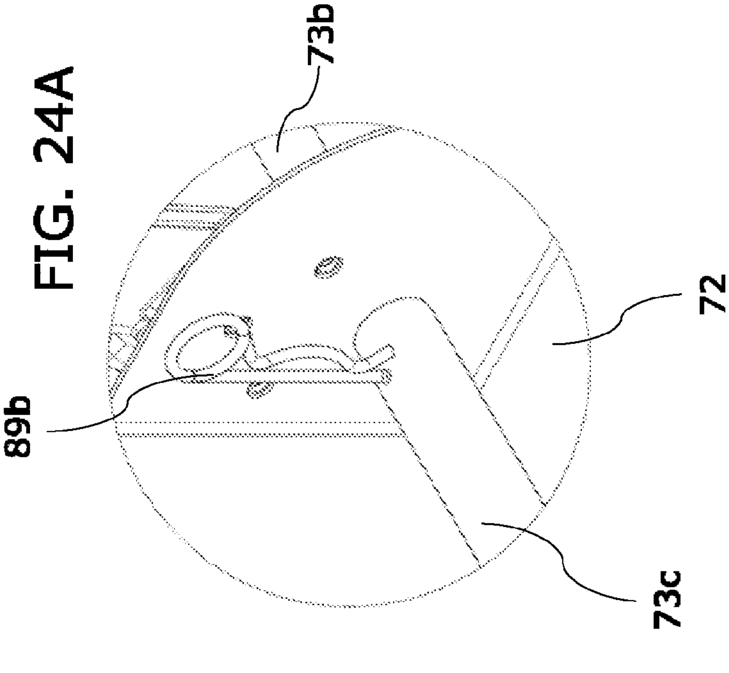
FIG. 24A is a detail view of a means for fixing the width of the extendable wheels, according to the present invention.
Figure 25:
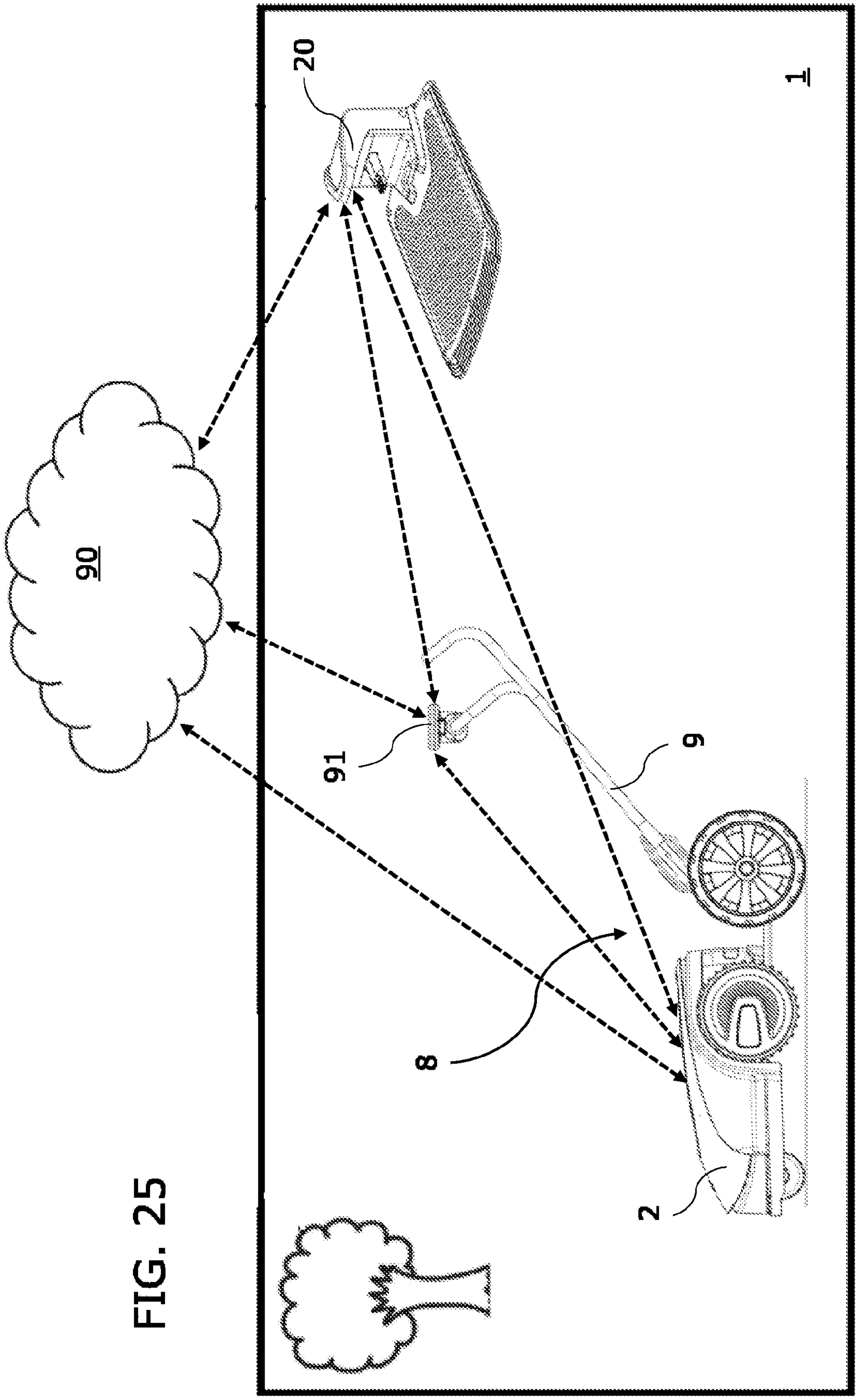
FIG. 25 is a view of the assembly consisting of mobile support and mobile device, a charging station, a server communicating with at least one mobile device, a remote device, and a charging station.

The installation procedure 60 is schematically depicted in FIG. 16A, in which the antenna module 10 is shown remaining in a fixed position which, by way of example, coincides with the position of the charging station 20 (for the sake of completeness, it should be underlined that the antenna module 10 could alternatively be positioned at an external installation 31), while the mobile device 2 (with its own satellite locator 3) is moved for example along the perimeter of the working area 1.

For the purpose of moving the mobile device 2 according to the procedure 60, the teachings referred to in patent EP3760022B1 in the name of the same Applicant can be advantageously adopted, including, in particular, the technique of tracking an operator by means of a vision system associated with the mobile device 2.

Still in FIG. 16A, it can be appreciated that the position signal of the mobile device 2 can be transmitted to a remote server 91 by means of a communication network, for example the internet network, the communication system 4 of the mobile device 2 comprising an internet network access module, for example an LTE, 4G, 3G, 2G, 5G, UMTS module or a Wi-Fi module.

Similarly, the position signal of the antenna module 10 can be transmitted to the remote server 91 by means of the same communication network, i.e., preferably the internet network, the antenna module 10 also being provided with an internet network access module, for example an LTE, 4G, 3G, 2G, 5G, UMTS module or a Wi-Fi module.

Through the respective operating connections with the remote server, the antenna module 10 can transmit its position signal to the mobile device 2, in particular during the installation procedure. In addition to or as an alternative to the operating connections to the remote server 91 depicted, a direct operating connection between the mobile device 2 and the antenna module 10 is further depicted in FIG. 16A, so that the antenna module 10 can transmit its position signal directly to the mobile device 2.

Advantageously, as still depicted in FIG. 16A, the installation procedure 60 makes use of a remote device 90, for example a smartphone, a tablet or a computer, in operating connection, by means of the communication network, or preferably the internet network, with the remote server 91. Consequently, during the installation procedure 60, receiving the virtual perimeter and/or the virtual boundary lines and/or the virtual obstacles of the working area 1 from the remote server 91, the remote device 90 can display, in particular on its own screen, a virtual map of the working area 1. The operator is thus provided with an immediate feedback regarding the virtual working area being defined, such a virtual working area being able to be validated or modified by the operator, possibly repeating at least part of the installation procedure 60.

FIG. 16A also depicts an operating connection between the remote device 90 and the mobile device 2. Thereby, the mobile device 2 can directly transmit the relative geographical coordinates of its position to the remote device 90 and the remote device 90 can define the virtual map of the working area 1 based on of such geographical coordinates.

Further, the remote device 90 can impart commands to the mobile device 2 during the installation procedure 60 (e.g., commands guiding the advancement of the mobile device 2 along the perimeter of the working area 1).

The installation procedure 60 allows to define the virtual map of the working area 1 with the geographical coordinates of the perimeter which acts as a boundary for the working area 1, of the obstacles present within the working area 1 and of the notable points within the working area 1 (in particular the geographical coordinates of the charging station 20). Advantageously, the representative geographical coordinates of the working area 1, at the end of the installation procedure 60, are stored in a non-volatile memory of the mobile device 2, so that the mobile device 2 can make use of such geographical coordinates for the purposes of navigation in the working area 1, during the subsequent maintenance operations.

Lastly, it should be underlined how in the event of a large working area to the point of requiring the use of a fleet with two or more mobile devices for the purposes of the maintenance thereof, the installation procedure 60 can be repeated for each of the mobile devices of the fleet, so as to install each mobile device in its own area of competence.

Assembly Process 300 of the Assembly 100

The present disclosure further relates to an assembly process 300 of an antenna module 10. The assembly process 300 comprises arranging an antenna module 10 of the type previously described. In particular, the antenna module 10 object of the assembly process 300 comprises a casing 11 defining a containment volume, and a satellite position locator 12 housed in the containment volume and configured to emit a position signal representative of the position of the antenna module 10.

The antenna module 10 can further comprise a transmitter 14 housed in said containment volume and configured to transmit information remotely through a communication network.

A control unit 15 is housed in the containment volume and operatively connected to the satellite locator 12 and optionally to the transmitter 14: the control unit 15 is thus configured at least to receive the position signal from the antenna module 10, and to generate at least one piece of information related to the position of the antenna module 10 based on said position signal.

The control unit 15 can be configured to control the transmitter 14 to remotely transmit the information related to the position of the antenna module 10.

The assembly process 300 further includes arranging a charging station 20 of the type as previously described and configured to electrically charge the battery of a mobile device 2 adapted to execute land maintenance operations. In particular, the charging station 20 comprises at least one connector configured to establish a connection between said charging station 20 and a power supply network, at least one charging system configured to charge a battery of the mobile device 2, and a seat 21 configured to house the antenna module 10.

The assembly process 300 thus comprises arranging the antenna module 10 in the seat 21 of the charging station 20, as shown in FIG. 3.

Optionally the assembly process 300 comprises removing the cover 23 from the charging station 20, i.e., arranging the cover 23 in its service position, to allow the antenna module 10 to be arranged in the seat 21. The assembly process can further comprise the step of closing the cover 23, i.e., arranging the cover 23 in the use position, following the insertion of the antenna module 10 in the seat 21.

The assembly process 300 can further comprise a step of constraining the antenna module 10 to the seat 21 of the charging station 20.

The assembly process 300 can comprise a step of electrically connecting the antenna module 10 to the charging station 20 by means of the auxiliary socket 27, so as to power and/or charge the antenna module 10 by means of the charging station 20.

Self-Driving

The present disclosure also relates to an operating process of the mobile device 2 comprising the steps of arranging the charging station 20, arranging the antenna module 10 in the seat 21 of the charging station 20, and arranging a self-driving mobile device 2 comprising the satellite locator 3, the communication system 4, and the on-board controller 5 operatively connected to the satellite locator 3 and to the communication system 4.

The operating process comprises a self-driving step of the mobile device 2, in which the on-board controller 5 controls the movement means to determine the movement and guidance of the mobile device 2 within the working area 1 as a function of the correct position assumed, during its movement, by the mobile device 2.

Preferably, the operating process comprises executing the adjustment procedure 50, described above, to estimate the correct position of the mobile device 2 during its movement and to command the movement means 6 of the mobile device 2. In other words, the self-driving step of the mobile device 2 is executed as a function of the correct position of the mobile device obtained by means of the adjustment procedure 50.

It should be noted that during the self-driving step of the mobile device 2, the antenna module 10 is located in the seat 21 of the charging station 20 and maintained in a fixed position, or it can be constrained to the external installation 31.

During the self-driving, the operating process can comprise the step of transmitting the signal representative of the position signal of the antenna module 10, in particular transmitting said position signal, directly to the mobile device 2.

Alternatively the operating process can comprise transmitting the signal representative of the position signal of the antenna module 10, in particular transmitting the position signal, to a remote server 91 by means of the transmitter 14 of the antenna module 10: in particular the transmitter 14 of the antenna module 10 can be configured to transmit the position signal of the antenna module 10 to a remote server 91 by means of internet network. The transmitter 14 of the antenna module 10 preferably comprises an internet network access module, for example an LTE, 4G, 3G, 2G, 5G, UMTS module, or a Wi-Fi module.

The operating process can further comprise the step of transmitting the signal representative of the position signal of the mobile device 2, in particular transmitting the position signal, to the remote server 91 by means of the communication system 4. In particular, the communication system 4 of the mobile device 2 is configured to transmit the signal of its position to the remote server 91 by means of an internet network, in particular said communication system 4 comprising an internet network access module, for example an LTE, 4G, 3G, 2G, 5G, UMTS module or a Wi-Fi module.

The self-driving operating process is schematically shown in FIG. 16, in which the mobile device 2 moves within the working area 1 to execute the land maintenance operations, and in which the antenna module is fixed and constrained to the seat 21 of the charging station 20: the correct position of the mobile device is determined by means of the adjustment procedure 50 as a function of the position signal of the antenna module 10 and the position signal of the antenna module 10, in particular by executing an RTK algorithm of the type previously described.

Mobile Support 40

The present disclosure further relates to a mobile support 40, shown in FIGS. 11-15, adapted to allow an operator to define the limits of the working area 1 within which the mobile device 2 is configured to operate.

The mobile support 40 comprises a gripping portion 41 configured to allow the gripping of an operator, a bottom portion 43, and a handlebar (75) of elongated shape, interposed in connection between the gripping portion 41 and the bottom portion 43.

The handlebar (75) can comprise a first rod **42*a*, a second rod 42*b*, and a connection joint 42*c* between the first rod and the second rod. The first rod 42*a* can extend between the bottom portion 43 and the second rod 42*b*, while the second rod 42*b* can extend between the first rod 42*a* and the gripping portion 41: thereby the first rod and the second rod define in combination the longitudinal extension of the handlebar (75). The connection joint can be configured to allow an adjustment of the longitudinal extension of the handlebar (75), so that an operator can lengthen and shorten the mobile support according to his own height. The connection joint 42*c*** can be configured to allow an adjustment of the inclination of the second rod with respect to the first second rod, so as to facilitate the operator's guiding the mobile support.

The support further comprises movement means 44 constrained to the bottom portion 43 of the mobile support 40 and configured to contact with the ground of the working area 1 during a working condition of the mobile support 40. In other words, the movement means 44 are configured to support the mobile support 40 with respect to the ground. In particular, the movement means 44 can comprise one or more wheels movable by rotation, for example one or more idle wheels placed at the bottom portion 43 of the mobile support 40. The mobile support 40 can comprise a first wheel **44*a* and a second wheel 44*b* movable by rotation about a rotation axis A and axially spaced from each other: in particular the first wheel and the second wheel can be aligned along the same rotation axis A. The distance interposed between the first wheel and the second wheel can be between 10 and 40 cm. In an embodiment, the mobile support 40 comprises at most two wheels: consequently, the mobile support 40 does not have a stable equilibrium position but requires an operator to grip the gripping portion 41 to keep the mobile support in balance. During an operating condition, the mobile support 40 rests on the ground on the movement means and is supported in height by an operator through the handle: in particular the operator grips the mobile support 40 at the gripping portion 41**.

The mobile support 40 comprises at least one constraining portion 45, preferably arranged at the bottom portion 43 of the mobile support 40, configured to carry an antenna module 10 in accordance with the above description. In summary, the antenna module 10 can comprise the casing 11 defining the containment volume, the satellite position locator housed in the containment volume, and the control unit 15 housed in the containment volume and operatively connected to the satellite locator. The control unit 15 is configured at least to receive the position signal from the satellite detector, and generate at least one piece of information related to the position of the antenna module 10 based on the position signal. The antenna module 10 can also comprise a transmitter 14 configured to remotely transmit, preferably wirelessly, the information related to the position of the antenna module 10: the control unit 15 of the antenna module 10 is thus configured to command the transmitter 14 to remotely transmit the information related to the position of the antenna module 10.

The constraining portion 45 comprises a coupling system adapted to be constrained to the antenna module 10: the coupling system comprises at least one among a removable interlocking coupling, a screw coupling, a magnetic coupling, a quick-coupling/release system.

The constraining portion 45 is arranged, during an operating condition of the mobile support 40, at a distance from the ground less than 40 cm, in particular less than 30 cm, in particular less than 25 cm. In particular, with a radius R of the at least one wheel of the mobile support 40 defined, and a magnitude Dr defined as the distance interposed between the constraining portion 45 and the rotation axis A of the wheels, the following formula applies:

$$D_r+R<50 \text{ cm, in particular } D_r+R<30 \text{ cm.}$$

An embodiment includes a kit comprising the mobile support 40 and the antenna module 10. In such a case, the antenna module 10 is arranged, during said operating condition of the mobile support 40, at a distance from the ground of less than 40 cm, in particular less than 30 cm, in particular less than 25 cm: this operating condition comprises a movement of the mobile support 40 by the operator, who grips the mobile support 40 at the gripping portion 41.

The mobile support 40 can comprise a lateral template 46 adjustable in extension along a width dimension of the mobile support 40: the lateral template 46 defines a maximum width of the mobile support 40. The extension in width is defined parallel to the rotation axis of the wheels and in particular orthogonal to an advancement direction imposed by the operator to the mobile support 40.

The lateral template 46 can comprise, at a lateral surface, a plurality of notches 46*a* representative of an extension in width of the template: for example, the notches can represent a measure in width, for example in centimetres or inches, representative of the extension in width of the template.

The lateral template 46 can extend in width by a greater amount with respect to an extension in width of the movement means of the mobile support 40: in particular the lateral template 46 extends in width by a greater amount than the extension in width defined by the wheels of the mobile support 40. In other words, the lateral template 46 defines, at least when in an extended position, the maximum extension in width of the mobile support 40.

A width adjustment of the lateral template 46 allows to simulate the actual width of a mobile device 2, so that the latter, especially when it is located at the perimeter 8*a* of the working area 1 or in a place near an obstacle, does not exceed the virtual perimeter defined during the execution of the installation method 400. The template 46 can be adapted to simulate an encumbrance in width of the mobile device 2 adjacent to a boundary of the working area 1, for example a wall, not passable by the mobile device 2. The template 46 can also be adapted to simulate an encumbrance in width of a cutting blade of the mobile device 2 adjacent to a boundary of the working area 1, for example a pavement, passable by the mobile device 2. The template is preferably applied to the bottom portion 43.

The template 46 comprises a bar and a case configured to slidably receive the bar. The template can further comprise an organ, for example a screw, for adjusting the position of the bar relative to the case.

The bar of the lateral template 46 is movable between a retracted position, in which the lateral template 46 reduces its extension in width or in which it does not define the maximum size in width of the mobile support 40, and an extended position, in which the lateral template 46 defines the maximum width of the mobile support 40.

The template 46 can be rotatably applied with respect to the mobile support 40: in particular the template 46 can be rotatably applied to the bottom portion 43, so that it can selectively protrude from a left side or from a right side of the mobile support 40.

Alternatively, the mobile support 40 comprises a first template and a second template (embodiment not shown in the accompanying drawings) protruding respectively from a left side and a right side of the mobile support 40.

The lateral template 46 can have a stroke between 5 cm and 40 cm. The maximum size MW measured between a longitudinal axis LA of the mobile support 40 and an end portion of the lateral template 46, is between 10 and 80 cm, more in particular between 10 and 50 cm.

The longitudinal axis LA of the mobile support 40 can be defined as an axis orthogonal to the rotation axis of the wheels, substantially parallel to the ground and preferably aligned with the extension in length of the handlebar (75) of the mobile support 40. If the mobile support 40 comprises the first wheel and the second wheel 44*a*, 44*b*, the longitudinal axis LA is equidistant from the first wheel and from the second wheel.

The mobile support 40 can further comprise an auxiliary support structure 47 arranged near the gripping portion 41 of the mobile support 40 and configured to carry and constrain a remote device 90, for example a smartphone or a tablet. The auxiliary support structure 47 can be constrained directly to the gripping portion 41 of the mobile support 40 or near the gripping portion 41: in particular the auxiliary support structure 47 is configured to support the remote device 90 and allow the operator to easily see what is shown by the remote device 90.

The mobile support 40 can comprise means for adjusting the orientation of said auxiliary support structure 47 with respect to said gripping portion 41: such adjustment means preferably comprise at least one joint.

The remote device 90, when mounted on the auxiliary support structure, can face the operator.

It should be noted that the mobile support 40 is a completely distinct device from the mobile device 2 described above. In particular, the mobile support 40 does not comprise a tool configured to carry out land maintenance operations: for example, the mobile support 40 does not comprise a cutting blade operatively configured to cut the turfgrass. Similarly, the mobile support 40 preferably does not comprise driving movement means, and has very small dimensions and weight with respect to the mobile device 2. In particular, the mobile support 40 extends between an end portion of the bottom portion 43 and a respective end portion of the gripping portion 41 for a length between 50 cm and 200 cm, in particular between 50 cm and 170 cm. The mobile support 40, in particular excluding the antenna module 10, has a weight between 0.5 kg and 4 kg, in particular between 0.6 kg and 3 kg, in particular less than 2 kg.

The mobile support can comprise a joint, for example a first joint, operating between the handlebar (75) and the bottom portion 43 and configured to allow an operator to vary the orientation of the handlebar (75) with respect to the bottom portion 43. In particular, the orientation of the handlebar (75) with respect to the bottom portion 43 can vary between a first orientation, in which the handlebar (75) and the bottom portion 43 are aligned with each other along the advancement direction of the mobile support 40, and a second orientation in which the handlebar (75) is inclined to the left or to the right of the bottom portion 43.

The first joint is configured to allow a smoother conduction of the mobile support 40 at external encumbrances arranged at a distance with respect to the ground and/or at steep portions of land.

The mobile support 40 can comprise, in addition or alternatively to the first joint, a joint, for example a second joint, operating between the bottom portion 43 and the movement means 44. The second joint is configured to allow a user to rotate the movement means 44 with respect to an axis orthogonal to the ground, in particular so as to allow a deviation of the advancement direction of said mobile support 40 with respect to a straight direction.

According to an embodiment, the mobile support 40 is configured to allow a sliding in the axial direction of the movement means 44 (in particular of a wheel axle arranged as a connection between the first wheel 44*a* and the second wheel 44*b*) with respect to at least one portion of the mobile support 40, preferably with respect to the constraining portion 45 and/or with respect to the gripping portion 41. In particular, the wheel axle acts as a guide element, while at least one device (for example a slide or a sliding ring or cylinder) capable of moving along the wheel axle according to a predefined excursion is applied to the bottom portion 43, in particular to the constraining portion 45. Therefore, if there is a translational degree of freedom between the movement means 44 and the at least one portion of the mobile support 40, it is possible to vary the axial position of the at least one portion of the mobile support 40, or of the position of the constraining portion 45 and/or of the gripping portion 41, so that such an at least one portion of the mobile support 40 can be led by the operator from a reference position, in which it is substantially equidistant from the first wheel 44*a* and the second wheel 44*b*, to a notably discrete number of positions in which the distance between such a portion of the mobile support 40 and the first wheel 44*a* is instead less than the distance between such a portion of the mobile support 40 and the second wheel 44*b* and/or to a notably discrete number of positions in which the distance between such a portion of the mobile support 40 and the first wheel 44*a* is instead greater than the distance between such a portion of the mobile support 40 and the second wheel 44*b*. At least one fixing device (for example a pin or a bolt or a clip) is then associated with the means which allow the relative sliding in the axial direction between the movement means 44 and the at least one portion of the mobile support 40, so as to lock the at least one portion of the mobile support 40 (in particular the constraining portion 45 and/or the gripping portion 41 in the desired position).

The mobile support 40 according to the present invention is typically not provided with its own propulsion means, thus it is typically manually moved by the operator, by pushing or by dragging. The advancement of the mobile support 40 can be determined by means of the rotation of a pair of wheels, i.e., of a first wheel 44*a* and a second wheel 44*b*. The wheels are typically applied to the bottom portion 43 of the mobile support 40 which, for such a purpose, can comprise a fork 53 at its lower end, the fork 53 being constrained to the pins of the wheels.

Advantageously, the fork 53 is configured to ensure a minimum distance between the first wheel 44*a* and the second wheel 44*b* between 150 mm and 400 mm.

With regard to the handlebar (75), i.e., the portion of the mobile support 40 interposed between the gripping portion 41 and the bottom portion 43, the figures from 11 to 14 show a configuration with a single longitudinal element, the handlebar (75) in particular comprising a first rod 42*a* and a second rod 42*b*, with a connection joint 42*c* interposed between the two rods. According to an alternative configuration to that depicted in FIGS. 11 to 14, the handlebar (75) instead has a configuration with two longitudinal elements ideally parallel to each other and at least one connecting element extending between the longitudinal elements and which is ideally orthogonal to the latter. At least part of the connecting element can form the gripping portion 41 of the mobile support 40.

In a possible embodiment of the present invention, the gripping portion 41 can comprise, in addition to the handle which allows the operator to grasp the mobile support 40 and to exert the pushing action or the dragging action by which the mobile support 40 is moved, as well as an interface device, in particular comprising selection devices (such as press buttons, touch keys, knobs and the like) and display devices, the latter comprising at least one screen (having in particular the ability to display a virtual working area for a mobile device).

In an advantageous embodiment of the present invention (alternative to the previous embodiment), the gripping portion 41, or alternatively any other portion of the mobile support 40, comprises an auxiliary support structure 47 capable of constraining a remote device 90, for example a smartphone, to the mobile support 40, so that said remote device 90 can inter alia function, with its own selection and display means, as an interface device associated with the mobile support 40. The auxiliary support structure 47 can be an element integrated in the architecture of the mobile support 40, or represent an accessory device which the operator can apply to the mobile support 40 and position according to his preferences. By way of non-limiting example, the device described in U.S. Pat. No. 9,969,450B1 is mentioned herein as an example of an accessory device suitable to serve as an auxiliary support structure 47 when applied to a mobile support 40.

In its most essential embodiments, the mobile support 40 does not require power supply. In fact, the antenna module 10 and the remote device 90, carried respectively by the constraining portion 45 and by the auxiliary support structure 47, have their own on-board batteries.

However, the mobile support 40 lends itself to more advanced embodiments. In particular, the mobile support 40 can comprise its own control unit and its own interface means. Additionally or alternatively, the mobile support 40 can comprise its own integrated sensors. For example, the mobile support 40 can comprise a sensor device adapted to detect the advancement speed of the mobile support 40, such as a speedometer, and a sensor device adapted to detect the advancement direction of the mobile support 40. Further, the mobile support 40 can comprise one or more sensor devices aimed at detecting the state of health and/or the state of hydration of the grass in the working area, for example spectral sensors which allow to determine such a state of health by calculating indices such as the NDVI index, the NDRE index and the WBI index. Above all, the mobile support 40 can comprise one or more sensor devices which will be described in detail below with particular reference to FIGS. 14B, 14C and 14D and which can be advantageously employed as means for defining or simulating at least one encumbrance.

The aforementioned more advanced embodiments of the mobile support 40 typically require power supply. To such an end, the mobile support 40 can comprise at least one of its own on-board batteries of the rechargeable type. Alternatively, the mobile support 40 can comprise a power connector configured to allow the mobile support 40 to receive electrical power from a device carried by the mobile support 40, such a device being in particular the antenna module 10, in such a case the mobile support 40 being electrically powered by the on-board battery of the antenna module 10.

Mobile Support with Means for Defining or Simulating an Encumbrance

Among the peculiar features of the mobile support 60 according to the present invention, particular attention must be paid to the feature according to which the mobile support 60 is associated with means for defining and/or simulating at least one encumbrance, by means of which the mobile support 60 can be made capable of defining and/or simulating an encumbrance related to the encumbrance of a device other than the mobile support 60 and/or related to the encumbrance of a specific payload belonging to a device distinct from the mobile support 60. As the mobile support 60 is mainly intended to be used as part of an installation procedure for a device in a working area 1, the means for defining and/or simulating at least one encumbrance are configured to make the mobile support 60 capable of defining and/or simulating at least one encumbrance related to the encumbrance of the device to be installed and/or related to the encumbrance of a specific payload of the device to be installed. As the mobile support 60 is in particular intended for a use thereof within a procedure of installing a mobile device 2 as described above, the at least one encumbrance defined and/or simulated by the means for defining and/or simulating at least one encumbrance according to the present invention can therefore be an encumbrance related to the encumbrance of the mobile device 2 and/or related to the encumbrance of a payload of the mobile device 2. In the specific case of using the mobile support 60 as part of a procedure for installing a robot lawnmower, the at least one encumbrance defined and/or simulated by the means for defining and/or simulating at least one encumbrance according to the present invention can be an encumbrance related to the encumbrance of the robot lawnmower and/or the encumbrance of the cutting blade of the robot lawnmower (where, if more than one cutting blades are installed in the robot lawnmower, the encumbrance to be defined and/or simulated is related to the overall encumbrance of the cutting blades).

In the most essential embodiments of the present invention, the defined and/or simulated encumbrances are encumbrances in the width dimension only, where the width dimension is the dimension extending in the direction transverse to the advancement direction of the mobile device 2. In more advanced embodiments of the present invention, the defined and/or simulated encumbrances are encumbrances in the width dimension and in at least one further dimension, in particular in the length dimension, where the length dimension is the dimension extending in the advancement direction of the mobile device 2. In the most highly evolved embodiments of the present invention, the defined and/or simulated encumbrances are three-dimensional encumbrances.

It should be noted that, for the purposes of the present invention, the wording "related to" refers to an encumbrance which has any relation to the encumbrance of the mobile device 2, in particular of the robot lawnmower, to be defined and/or simulated. Therefore, only in a particular case, the at least one encumbrance defined and/or simulated by the means for defining and/or simulating at least one encumbrance applied to the mobile support 6 according to the present invention coincides with the encumbrance of the mobile device 2 and/or with the encumbrance of the payload of the mobile device 2, in particular of the cutting blade. In addition or alternatively, the at least one encumbrance defined and/or simulated by the means for defining and/or simulating at least one encumbrance applied to the mobile support 6 according to the present invention differs from the encumbrance of the mobile device 2 and/or from the encumbrance of the payload of the mobile device 2, in particular of the cutting blade, and can preferably exceed with respect to the encumbrance of the mobile device 2 and/or with respect to the encumbrance of the payload of the mobile device 2, in particular of the cutting blade, an increase notably included as a safety device.

In an advantageous embodiment of the present invention, the means for defining and/or simulating at least one encumbrance of the mobile support 60 are configured to define and/or simulate two or more encumbrances related to the encumbrance of the mobile device 2 and/or related to the encumbrance of at least one payload of the mobile device 2, in particular to the encumbrance of the cutting blade of the mobile device 2, where a first among the defined and/or simulated encumbrances coincides with the encumbrance of the mobile device 2 and/or with the encumbrance of at least one payload of the mobile device 2, in particular of the cutting blade of the mobile device 2 and where one or more further among the defined and/or simulated encumbrances are increased encumbrances with respect to the encumbrance of the mobile device 2 and/or the encumbrance of at least one payload of the mobile device 2, in particular of the cutting blade of the mobile device 2.

It is therefore the object of the present invention a mobile support 40, to which are associated means for defining and/or simulating at least one encumbrance configured to define and/or simulate a plurality of encumbrances (in width and possibly also in the other dimensions) related to the encumbrance of the mobile device 2 and/or related to the encumbrance of at least one payload of the mobile device 2, in particular to the encumbrance of the cutting blade of the mobile device 2.

Advantageously, the dimensions of such a plurality comprise a nominal encumbrance and one or more increased encumbrances (for example an increased encumbrance or two increased encumbrances or three increased encumbrances), where the increased encumbrances can be intended to define and/or simulate the encumbrance of the mobile device 2 at sections of the boundary of the working area 1 which are considered sensitive. For example, a section of the boundary of the working area 1, for example a section including a sharp edge, can be considered sensitive, for which the mobile device 2 is required to execute a manoeuvre involving an abrupt change in the advancement direction. In fact, in such a case, it is appropriate to contemplate a greater distance between the mobile device 2 and the boundary with respect to that corresponding to the width extension of the mobile device 2, in order to allow the mobile device 2 to have the necessary space to safely execute the manoeuvre required by the geometry of the adjacent section of the boundary of the working area 1. Furthermore, the boundary sections of the working area 1 which are not passable by the mobile device 2 and which are potentially harmful to the mobile device 2 in the event of a collision and/or rubbing (for example boundary sections formed by walls or hedges or tree trunks) and/or the boundary sections for which a possible encroachment of the mobile device 1 would result in the onset of a situation of potential danger to people (for example boundary sections arranged to separate the working area 1 from a road or a swimming pool) can be considered sensitive.

In an embodiment of the means for defining and/or simulating at least one encumbrance according to the present invention, the nominal encumbrance and the at least one increased encumbrance are set by the operator independently of each other.

In an alternative embodiment of the means for defining and/or simulating at least one encumbrance according to the present invention, the operator is required to set the nominal encumbrance only, after which the at least one increased encumbrance is automatically calculated from said nominal encumbrance. For example, the at least one increased encumbrance is obtained by multiplying at least one dimension of said nominal encumbrance by a safety coefficient having a value greater than 1, where the safety coefficient can be a fixed-value coefficient or a coefficient with a value that can be modulated. For example, the value of the safety coefficient can be modulated as a function of the estimated criticality of the boundary sections of the working area 1 and assume increasing values as the estimated criticality increases.

The provision of a mobile support 40 comprising means for defining and/or simulating at least one encumbrance related to the encumbrance of a mobile device 2 and/or related to the encumbrance of at least one payload of a mobile device 2 (for example to the encumbrance of at least one cutting blade of a mobile device 2) provides obvious advantages when installing said mobile device 2. In fact, said mobile support 40, having a gripping portion 41, is considerably more practical and easier to move with respect to the mobile device 2 to be installed. Furthermore, the means for defining and/or simulating at least one encumbrance related to the encumbrance of a mobile device 2 make the mobile support 40 capable of faithfully reproducing not only the encumbrance of the mobile device 2, but also (in the embodiments which include defining and/or simulating a nominal encumbrance and at least one increased encumbrance) of reproducing, simultaneously or successively, a plurality of encumbrances related to the mobile device 2, such as:

- an encumbrance corresponding to the encumbrance of the payload of the mobile device 2 (to be considered, for example, for the outline sections of the working area 1 which are passable by the mobile device 2 and are not considered critical);
- an encumbrance corresponding to the encumbrance of the mobile device 2 (to be considered for example for the outline sections of the working area 1 which are not passable by the mobile device 2 and/or for the outline sections of the working area 1 which are considered to be of limited criticality);
- one or more increased encumbrances with respect to the encumbrance of the mobile device 2 (to be considered for example for the outline sections of the working area 1 which are considered to be highly critical).

The provision of a mobile support 40 with associated means for defining and/or simulating at least one encumbrance related to the encumbrance of a mobile device 2 and/or related to the encumbrance of at least one payload of a mobile device 2 (for example to the encumbrance of at least one cutting blade of a mobile device 2) is clearly an invention in consideration of the state of the art, since none of the accessory devices known to date which can be employed within the scope of a procedure for installing a mobile device 2 contemplates or suggests the provision of similar or analogous means.

Embodiments of the Means for Defining or Simulating an Encumbrance

In accordance with the present invention, multiple embodiments of means for defining and/or simulating at least one encumbrance applied to a mobile support 40 are contemplated, each of which is itself envisaged as an invention in light of the state of the art.

It should be noted that the means for defining and/or simulating at least one encumbrance can be applied directly to the mobile support 40 or can be integrated in a device which can be constrained to the mobile support 40 so as to be carried by the mobile device 40, such an accessory device being in particular an antenna module 10.

It should be further specified that certain embodiments of the means for defining and/or simulating at least one encumbrance can require power supply. In such a case, the mobile support 40 can comprise at least one on-board battery, notably of the rechargeable type, and/or a power connector through which to receive electrical power from a device carried by the mobile support 40, in particular by the antenna module 10.

A first embodiment of the means for defining and/or simulating at least one encumbrance is shown in FIGS. 12, 13, 14 and 14A and has already been described previously. In such a first embodiment, the mobile support 40 comprises at least one template 46 adjustable in extension along a width dimension of the mobile support 40 and/or configured to simulate at least one width dimension of the mobile device 2 and/or of a payload of the mobile device 2, in particular a cutting blade.

The template 46 is preferably applied to the bottom portion 43 of the mobile support 40. As can be appreciated especially in FIG. 14A, the template 46 can be associated with the constraining portion 45.

The template 46 comprises a bar, a case 46*c* configured to slidably house the bar, and an organ for adjusting the position of the bar relative to the case 46*c*, for example an adjustment screw 46*b*. In the example of FIG. 14A, the template 46 is of the manually adjustable type and the bar advantageously comprises a graduated scale 46*a* configured to provide a visual indication about the extent of the encumbrance in width simulated by the template 46.

Alternatively, the template can be of the self-adjusting type and the mobile support 40 comprises an actuator (such as an electric motor) having an effect on the bar, so as to arrange it in accordance with the encumbrance in width to be simulated.

As shown for example in FIG. 14A, the template 46 protrudes from one side of the mobile support 40. In order to allow the template 46 to protrude from both sides of the mobile support 40, so as to be able to notably reproduce the overall encumbrance in width of the mobile device 2 in a symmetrical manner, the template 46 can be rotatably applied to the mobile support 40, so as to be able to selectively protrude from a left side or from a right side of the mobile support 40. Alternatively, the mobile support 40 can comprise a first template and a second template protruding respectively from a left side and from a right side of the mobile support 40, the first template and the second template being preferably mirrored to each other and being able to contemplate dedicated actuation means or shared actuation means.

Figure 14B:
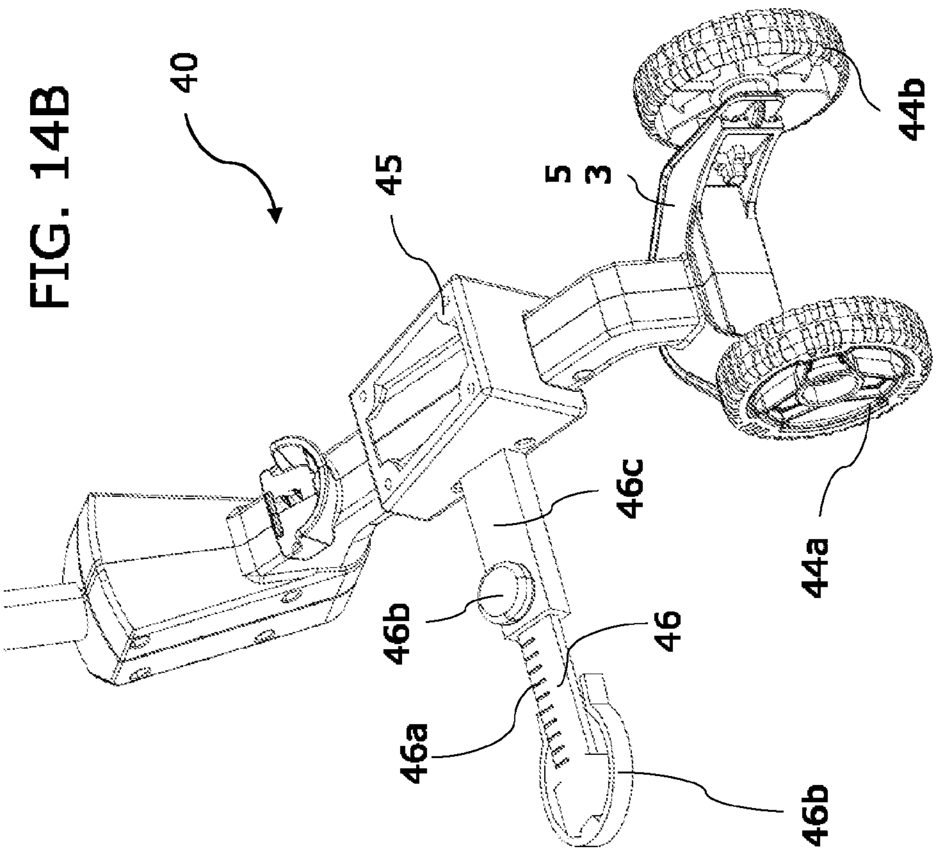
FIG. 14B shows a detail of the mobile support referred to in FIG. 14, including a template according to an embodiment alternative to that shown in FIG. 14A.
Figure 14A:
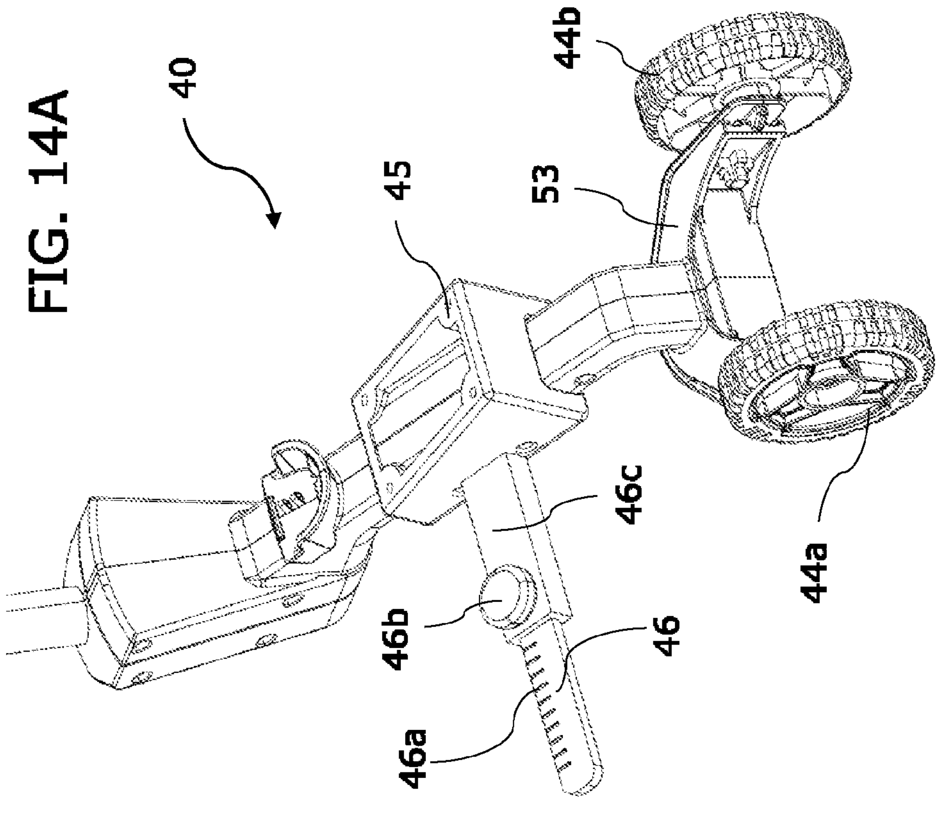
FIG. 14A is a detail view of the mobile support referred to in FIG. 14, the antenna module having been removed, in order to make a template applied to the mobile support more visible.

A second embodiment of the means for defining and/or simulating at least one encumbrance is shown in FIG. 14B and is distinguished from the first embodiment by the feature according to which the mobile support 40 comprises at least one obstacle and/or impact sensor 46*b*, configured to detect a collision condition with an obstacle and/or a condition of proximity to an obstacle. Preferably, the obstacle and/or impact sensor 46*b* is applied to the template 46, in particular being arranged at an end portion of the template 46.

The obstacle and/or impact sensor 46*b* can be of an electronic or electromechanical type. For example, the obstacle and/or impact sensor 46*b* can comprise an electrical contact, such that a collision with an obstacle results in a switching of the state of such an electrical contact.

The obstacle and/or impact sensor 46*b* can be configured to generate, and optionally transmit to at least one control unit, at least one electrical signal conveying at least one piece of information about the existence of a collision condition with an obstacle and/or about the existence of a condition of proximity to an obstacle. The obstacle and/or impact sensor 46*b* can be connected to the control unit in wired mode or wireless mode using connectivity technologies such as Bluetooth technology or Wi-Fi technology. The control unit, once the electrical signal has been received from the obstacle and/or impact sensor 46*b*, can manage the information conveyed by such an electrical signal, being able to generate an alert signal.

The electrical signal generated and transmitted by the obstacle and/or impact sensor 46*b* to convey at least one piece of information about the existence of a collision condition with an obstacle and/or about the existence of a condition of proximity to an obstacle can reach the remote server 91. Based on the electrical signal from the obstacle and/or impact sensor 46*b*, the remote server 91 can generate an alert signal, which can then be transmitted to the remote device 90 so as to make such an alert signal explicit to the operator. Alternatively, the electrical signal generated and transmitted by the obstacle and/or impact sensor 46*b* for conveying at least one piece of information about the existence of a collision condition with an obstacle and/or about the existence of a proximity condition to an obstacle can directly reach the remote device 90 (e.g., smartphone or tablet), which can then make an alert signal explicit to the operator.

A third embodiment and a fourth embodiment of the means for defining and/or simulating at least one encumbrance are shown respectively in FIG. 14C and in FIG. 14D and are both distinguished from the first embodiment and the second embodiment by the feature according to which the mobile support 40 comprises at least one contactless-type sensor, configured to detect the presence of an obstacle and/or to detect the distance between a possible obstacle and such a contactless-type sensor. Such a contactless-type sensor is advantageously suitable to act as a virtual template, being able to define and/or simulate an encumbrance (in particular at least one encumbrance in width) without the use of physical elements protruding towards the outside from the mobile support 40.

The third embodiment referred to in FIG. 14C and the fourth embodiment referred to in FIG. 14D are distinguished from each other by the different contactless-type sensors installed on board the mobile support 40, a difference in the number of sensors on board the mobile support 40 also deriving from the difference between the installed sensors.

In particular, the third embodiment of FIG. 14C includes a single contactless-type with a detection angle greater than 180°, preferably greater than 270°, more preferably ideally 360°, such a sensor being a radar sensor 28. Alternatively, the contactless-type sensor with a detection angle greater than 180°, preferably greater than 270°, more preferably ideally 360°, used in the context of the third embodiment referred to in FIG. 14C can be a lidar sensor, or an array of optical sensors or an array of radio frequency sensors. The contactless-type sensor with a detection angle greater than 180°, preferably greater than 270°, more preferably 360°, is advantageously installed on board the mobile support 40 in a central position in relation to the width of the mobile support 40, preferably in a position such that the sensor intersects the plane of symmetry of the mobile support 40.

The fourth embodiment referred to in FIG. 14D includes a plurality of contactless-type sensors with a detection angle between 120° and 180°, in particular at least a first sensor installed at a right side face of the mobile support 40 and a second sensor installed at a left side face of the mobile support 40, the first sensor and the second sensor being preferably arranged mirrored to each other with respect to the plane of symmetry of the mobile support 40. Advantageously, the plurality of contactless-type sensors with a detection angle between 120° and 180° further comprises a third sensor installed at a front face of the mobile support 40, preferably in a position such that the third sensor is equidistant from the first sensor and the second sensor and/or in a position where the third sensor intersects the plane of symmetry of the mobile support 40. The first contactless-type sensor with a detection angle between 120° and 180°, the second contactless-type sensor with a detection angle between 120° and 180° and possibly the third contactless-type sensor with a detection angle between 120° and 180° can be a first optical sensor 29*a*, a second optical sensor 29*b* and a third optical sensor 29*c*, respectively. Alternatively, the contactless-type sensors with a detection angle between 120° and 180° can comprise at least one video camera and/or at least one radio frequency sensor and/or at least one time-of-flight sensor and/or at least one inductive sensor and/or at least one capacitive sensor and/or at least one magnetic sensor and/or at least one ultrasonic sensor.

The contactless-type sensor of the third embodiment in FIG. 14C and each of the contactless-type sensors of the fourth embodiment in FIG. 14D can, by way of example, be mounted on a support block 35 provided at a transition region between the handlebar (75) and the bottom portion 43 of the mobile support 40.

The contactless-type sensor referred to in the third embodiment in FIG. 14C and each of the contactless-type sensors referred to in the fourth embodiment in FIG. 14D are capable of recognizing a condition of presence of at least one obstacle within at least one detection volume corresponding to at least one predefined encumbrance and a condition of absence of obstacles within said detection volume. Advantageously, the contactless-type sensor referred to in the third embodiment in FIG. 14C and each of the contactless-type sensors referred to in the fourth embodiment in FIG. 14D are capable of generating, and optionally transmitting to at least one control unit, at least one electrical signal conveying at least one piece of information about the existence of a condition of presence of at least one obstacle or about the existence of a condition of absence of obstacles.

The electrical signal generated and transmitted by the contactless-type sensor referred to in the third embodiment in FIG. 14C and the electrical signals generated and transmitted by the contactless-type sensors referred to in the fourth embodiment in FIG. 14D for conveying at least one piece of information about the existence of a condition of presence of at least one obstacle or about the existence of a condition of absence of obstacles can reach the remote server 91. The remote server 91 can then generate an alert report and transmit such an alert report to the remote device 90, so that such an alert report can ultimately be made explicit to the operator. Alternatively, the electrical signal generated and transmitted by the contactless-type sensor referred to in the third embodiment in FIG. 14C and the electrical signals generated and transmitted by the contactless-type sensors referred to in the fourth embodiment in FIG. 14D for conveying at least one piece of information about the existence of a condition of presence of at least one obstacle or about the existence of a condition of absence of obstacles can directly reach the remote device 90 (for example, smartphone or tablet), which can then make an alert signal explicit to the operator.

The use of at least one contactless-type sensor configured to detect the presence of an obstacle and/or to detect the distance between a possible obstacle and such contactless-type sensor of the contactless type (in particular the use of the contactless-type sensor referred to in the third embodiment in FIG. 14C, as well as the use of the contactless-type sensors referred to in the fourth embodiment in FIG. 14D) is markedly advantageous for the purpose of executing an installation procedure of the mobile device 2 by means of the mobile support 40. In particular, following an alert signal based on the electrical signal generated by the at least one electrical contactless-type sensor during the mapping of the working area 1, corrective actions can also be automatically taken in defining the virtual perimeter of the working area 1.

Figure 14F:
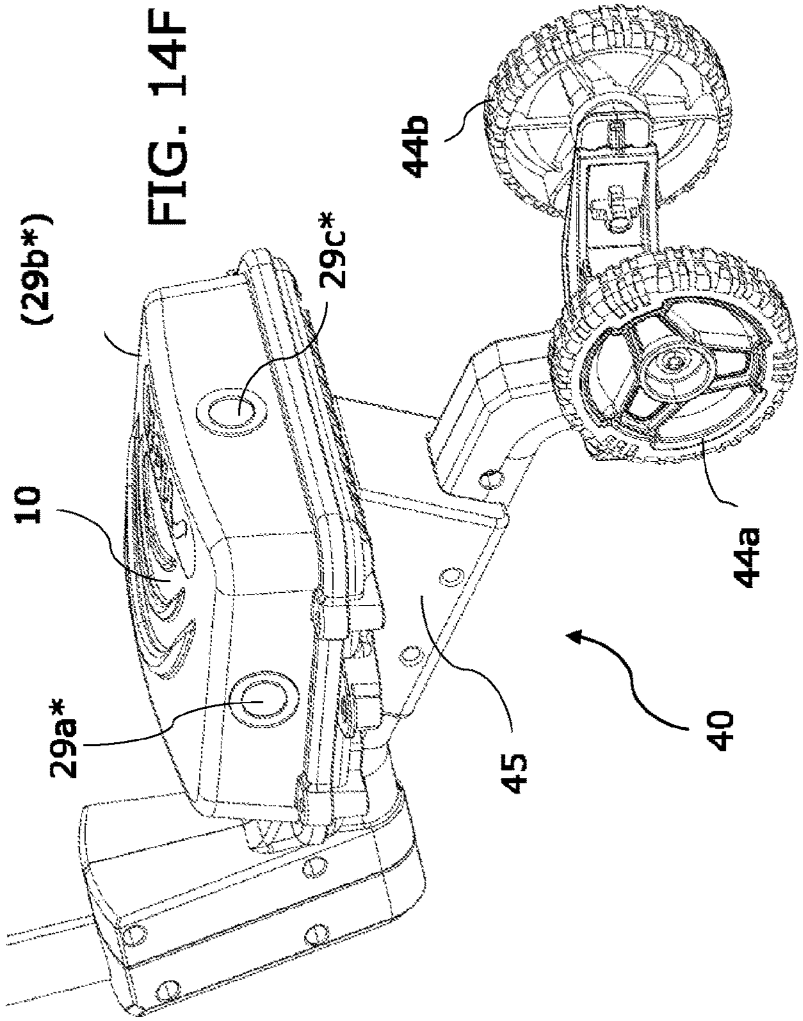
Figure 14E:
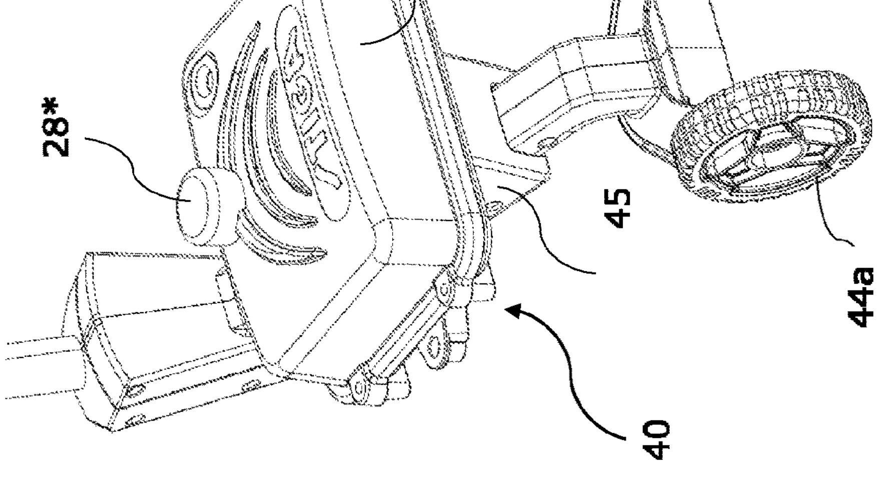

FIG. 14E and FIG. 14F respectively represent a variant of the third embodiment of FIG. 14C and the fourth embodiment of FIG. 14D. Such variants are distinguished by the fact that the at least one contactless-type sensor is installed on board the antenna module 10 and therefore indirectly installed on board the mobile support 40, once the antenna module 10 is fixed to the constraining portion 45 of the mobile support 40.

In particular, in the variant referred to in FIG. 14E, the antenna module 10 comprises a radar sensor 28*, which can alternatively comprise a lidar sensor or an array of optical sensors or an array of radio frequency sensors, while in the variant referred to in FIG. 14F, the antenna module 10 comprises a first optical sensor 29*a, a second optical sensor 29*b and a third optical sensor 29*c**, which can alternatively comprise at least one video camera and/or at least one radio frequency sensor and/or at least one time-of-flight sensor and/or at least one inductive sensor and/or at least one capacitive sensor and/or at least one magnetic sensor and/or at least one ultrasonic sensor.

With respect to the embodiments of FIGS. 14C and 14D, the variants of FIGS. 14E and 14F have the advantage of not requiring electrical power for the mobile support 40, since the on-board battery of the antenna module 10 can be used for powering the at least one contactless-type sensor (as well as for transmitting the generated signals of the at least one contactless-type sensor, the transmitter on-board the antenna module 10 can be used).

Figure 14G:
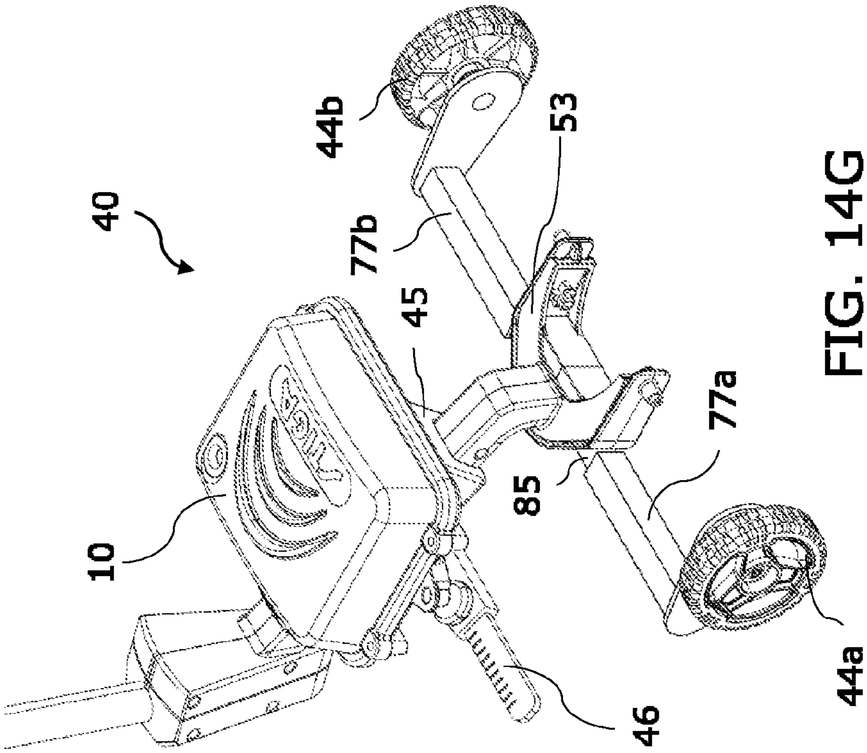
FIG. 14G shows a detail of the mobile support referred to in FIG. 14, carrying an antenna module, the mobile support including a system for adjusting the distance between a first wheel and a second wheel of the mobile support.

A fifth embodiment of the means for defining and/or simulating at least one encumbrance is shown in FIG. 14G and is distinguished from the first embodiment by the feature according to which the mobile support 40 comprises a system for adjusting the distance between the first wheel 44*a* and the second wheel 44*b*, in particular the distance measured in the axial direction between the first wheel 44*a* and the second wheel 44*b*. With regard to the fifth embodiment, it should be noted that, although in FIG. 14G the adjustment system of the distance between the first wheel 44*a* and the second wheel 44*b* is depicted in combination with a template 46 according to the first embodiment, the adjustment system of the distance between the first wheel 44*a* and the second wheel 44*b* referred to in the fifth embodiment completely dispenses with a concomitant use of the template 46, whereby the presence, in the fifth embodiment, of the template 46 referred to in FIG. 14G must be considered as a completely optional feature.

Advantageously, the fifth embodiment includes a separation of the wheels with respect to the fork 53, such a separation being able to be operated separately for the first wheel 44*a* and for the second wheel 44*b*, or being able to be operated simultaneously for the first wheel 44*a* and for the second wheel 44*b*, by means of a mechanism capable of associating the separation of the first wheel 44*a* with the separation of the second wheel 44*b*. In fact, the distance adjustment system according to the fifth embodiment can be configured to allow adjustments of the position, in particular of the axial position, of the first wheel 44*a* and of the position, in particular of the axial position, of the second wheel 44*b* independent of each other or can be configured to allow adjustments of the position, in particular of the axial position, of the first wheel 44*a* and of the position, in particular of the axial position, of the second wheel 44*b*, equivalent or corresponding to each other.

The adjustment system of the distance between the first wheel 44*a* and the second wheel 44*b* is configured so that there is a degree of freedom (notably a translational degree of freedom) between the first wheel 44*a* and the second wheel 44*b*, preferably a translational degree of freedom along a direction substantially orthogonal to the advancement direction of the mobile support 40. In FIG. 14G, the adjustment system of the distance between the first wheel 44*a* and the second wheel 44*b* is shown to be configured so that there is a translational degree of freedom along a direction substantially parallel to that identified by the rotation axis A of the wheels. However, according to embodiments of the distance adjustment system different from that shown in FIG. 14G, the translational degree of freedom can be along the rotation axis A of the wheels.

The distance adjustment system shown in FIG. 14G comprises, by way of example, a first element 77*a* constrained to the first wheel 44*a* and a second element 77*b* constrained to the second wheel 44*b*, the first element 77*a* and the second element 77*b* both being in telescopic coupling with an intermediate element 85. However, according to embodiments of the distance adjustment system which are different from that shown in FIG. 14G, the first element 77*a* can be in telescopic coupling directly with the second element 77*b*, thus without the provision of any intermediate element.

Advantageously, the distance adjustment system in accordance with the fifth embodiment comprises at least one fixing device, in particular a first fixing device applicable to the first element 77*a* and a second fixing device applicable to the first element 77*b* (such fixing devices not being shown in FIG. 14G).

Once the first wheel 44*a* and the second wheel 44*b* are positioned at the desired relative distance, by translating the first element 77*a* away from the second element 77*b* or towards the second element 77*b*, the operator positions the at least one fixing device so as to suppress the translational degree of freedom between the first element 77*a* and the second element 77*b*, so as to make the distance between the first wheel 44*a* and the second wheel 44*b* stable and no longer variable.

In a first embodiment, the distance adjustment system is configured to allow to set the distance of the first wheel **44*a* and the second wheel 44*b* according to fixed and/or predefined distance values. For example, referring to the depiction in FIG. 14G, the first element 77*a*, the second element 77*b* and the intermediate element 85 include a series of advantageously equispaced holes and the suppression of the translational degree of freedom between the first element 77*a* and the second element 77*b* occurs by inserting a first fixing device and a second fixing device in the form of both a pin or dowel in the holes of the first element 77*a* and the second element 77*b*** corresponding to the desired distance.

In a second embodiment, the distance adjustment system is configured to allow to set the distance of the first wheel **44*a* and the second wheel 44*b* to continuously between a minimum distance value and a maximum distance value. For example, referring to the depiction in FIG. 14G, the suppression of the translational degree of freedom between the first element 77*a* and the second element 77*b* occurs by applying a first fixing device and a second fixing device in the form of both a clip to the first element 77*a* and the second element 77*b*, so as to locally tighten the first element 77*a* and the second element 77*b* against the intermediate element 85**.

A variant of the fifth embodiment can be developed from the previously described embodiment, in which the mobile support 40 is configured to allow a relative sliding between at least a portion of the mobile support 40 (in particular the gripping portion 41 and/or the constraining portion 45) and a wheel axle arranged as a connection between the first wheel **44*a* and the second wheel 44*b***.

The wheel axle acting as a guide element can be configured as an extendable axle, the length of which can be adjusted by the operator (continuously or in discrete increments and/or decrements) between a minimum length and a maximum length. In particular, the extendable axle can be obtained by means of two or more rods connected to each other in telescopic coupling (for example three rods connected to each other in telescopic coupling), such rods connected to each other in telescopic coupling comprising a first rod constrained to the first wheel **44*a* and a second rod constrained to the second wheel 44*b***, in combination with at least one fixing device (for example a pin or a dowel or a clip), having the function of inhibiting the translational degree of freedom between the first rod and the second rod and thus locking the extendable wheel axle at the desired length.

Such a variant of the fifth embodiment has the peculiarity of providing the operator with means for defining and/or simulating at least one encumbrance which make it possible to also reproduce encumbrances having asymmetric geometry.

Assembly Arrangements

The present invention further relates to an assembly comprising an accessory device, a charging station 20 and an antenna module 10 and which can be articulated at least according to a main operating arrangement, in which the antenna module 10 is associated with the charging station 20, and according to a main installation arrangement, in which the antenna module 10 is associated with the accessory device.

The accessory device is configured to execute at least one installation operation of at least one mobile device 2 adapted to execute land maintenance operations, notably of a self-driving robot lawnmower. In a preferred embodiment of the assembly, the accessory device is a mobile support 40 as described above, i.e., a mobile support 40 comprising at least one gripping portion 41 configured to allow an operator to grip and/or push or drag the mobile support 40, movement means 44 (in particular one or more idle wheels movable by rotation) configured to allow an advancement of the mobile support 40 by pushing or dragging, maintaining contact with the ground, and at least one constraining portion 45 configured to carry the antenna module 10 in the main installation arrangement. It should be noted that all the features of the mobile support 40 set forth in the present disclosure and/or depicted in the figures accompanying the present disclosure are to be understood as applicable to the assembly according to the invention.

The charging station 20 is configured to electrically charge at least one mobile device 2 adapted to execute land maintenance operations, notably of a self-driving robot lawnmower. In a preferred embodiment of the assembly, the charging station 20 exhibits the features described above, i.e., it comprises at least one seat 21 configured to house the antenna module 10 in the main operating arrangement of the assembly, the charging station 20 also further comprising a charging system 26 configured to charge at least one on-board battery of at least one mobile device 2. It should be noted that all the features of the charging station 20 set forth in the present disclosure and/or depicted in the figures accompanying the present disclosure are to be understood as applicable to the assembly according to the invention.

The antenna module 10 is of a removable type. In a preferred embodiment of the assembly, the antenna module 10 exhibits the features described above, i.e., it comprises at least one casing 11 defining a containment volume and a satellite locator 12 housed in the containment volume and configured to generate and/or emit a position signal representative of the position (notably in the form of geographical coordinates) of the antenna module 10. It should be noted that all the features of the antenna module 10 set forth in the present disclosure and/or depicted in the figures accompanying the present disclosure are to be understood as applicable to the assembly according to the invention.

In a preferred embodiment of the assembly, means are contemplated for defining and/or simulating at least one encumbrance, in particular configured to define and/or simulate at least one encumbrance related to the encumbrance of at least one mobile device 2 and/or related to the encumbrance of at least one payload (in particular a cutting blade) of at least one mobile device 2. The means for defining and/or simulating at least one encumbrance are associated with the accessory device, i.e., the mobile support 40. Alternatively, the means for defining and/or simulating at least one encumbrance are associated with the antenna module 10, so that, in the main installation arrangement of the assembly, the antenna module 10 being constrained to the accessory device, the means for defining and/or simulating at least one encumbrance are applied (albeit notably indirectly) to the accessory device. It should be noted that all the features of the means for defining and simulating at least one encumbrance set forth in the present disclosure and/or depicted in the figures accompanying the present disclosure are to be understood as applicable to the assembly according to the invention.

Advantageously, the assembly according to the present invention further comprises at least one mobile device 2 adapted to execute land maintenance operations, notably of a self-driving robot lawnmower. The at least one mobile device 2 comprises a position locator, in particular a satellite locator adapted to detect the position of the mobile device 2 in the form of geographical coordinates, at least one payload such as a cutting blade and at least one rechargeable on-board battery. It should be noted that all the features of the mobile device 2 set forth in the present disclosure and/or depicted in the figures accompanying the present disclosure are to be understood as applicable to the assembly according to the invention.

In an embodiment, the assembly according to the present invention comprises a plurality of mobile devices adapted to execute land maintenance operations, notably a plurality of self-driving robot lawnmowers, to compose a fleet, each of the mobile devices of the fleet comprising a respective position locator, in particular a respective satellite locator adapted to detect the position of the mobile device 2 in the form of geographical coordinates, at least one respective payload such as a cutting blade and at least one respective on-board battery of the rechargeable type. Advantageously, the assembly according to the present invention comprises a connection system configured to allow to establish an electrical contact condition between the charging station 20 and the mobile device 2, the electrical contact condition being a condition in which a transfer of electric energy from the charging system 26 of the charging station 20 to the at least one on-board battery of the mobile device 2 is allowed. The connection system comprises a first member and a second member, both members being notably of the releasable type. The first member of the connection system belongs to the mobile device 2, while the second member of the connection system belongs to the charging station 20. In the embodiment of the assembly with a plurality of mobile devices composing a fleet, the connection system is configured to allow an electrical contact condition to be established between the charging station 20 and, in succession, the mobile devices of the fleet, each of the mobile devices of the fleet comprising for such a purpose a respective first member of a connection system.

Advantageously, the assembly according to the present invention further comprises at least one remote device 90 (for example a smartphone, a tablet or a computer), comprising selection means and/or display means, where in particular the display means can comprise at least one screen adapted to display a virtual map of a working area 1 of at least one mobile device 2. In such a case, in a preferred embodiment, the accessory device, i.e., the mobile support 40 comprises, notably near the gripping portion 41, an auxiliary support structure 47 which can be advantageously used, in the main installation arrangement, the remote device 90 to the accessory device, said auxiliary support structure being configured to establish a releasable-type constraint between the accessory device and the remote device 90.

Advantageously, the assembly according to the present invention further comprises a remote infrastructure, such as a remote server 91 or a cloud, the remote infrastructure having computing capacity and being operatively connected, by means of at least one communication network, to a control unit of the antenna module 10 and/or to a control unit of the charging station 20 and/or to a control unit of the accessory device, in particular of the mobile support 40, and/or to a control unit of the at least one mobile device 2 (specifying in this regard that, where the assembly comprises a plurality of mobile devices composing a fleet, the remote infrastructure can be operatively connected to the control unit of each of the mobile devices of the fleet) and/or to a control unit of the remote device 90. Advantageously, the assembly according to the present invention can also be articulated according to an auxiliary operating arrangement and/or according to an auxiliary installation arrangement.

The auxiliary operating arrangement envisages that the antenna module 10 is constrained to an external installation 31 with respect to the charging station 20, by means of a fixing element. In a preferred embodiment of the assembly, the fixing element is a fixing bracket 30 configured as described above, i.e., a fixing bracket 30 comprising a support portion configured to be constrained to the casing 11 of the antenna module 10 and an anchoring portion 32 configured to be constrained to the external installation 31, possibly with the aid of at least one fixing ring. It should be noted that all the features of the fixing bracket 30 set forth in the present disclosure and/or depicted in the figures accompanying the present disclosure are to be understood as applicable to the assembly according to the invention.

The auxiliary installation arrangement instead envisages that the at least one mobile device 2 is constrained to a further accessory device so as to be pulled by said further accessory device. Advantageously, the further accessory device is a further mobile support comprising at least one gripping portion, movement means and at least one constraining portion. The at least one gripping portion of the further mobile support is configured to allow an operator to push or drag the further mobile support. The movement means of the further mobile support (which can comprise one or more idle wheels movable by rotation) are configured to allow the further mobile support to advance while remaining in contact with the ground, the advancement of the further mobile support being notably an advancement by pushing or dragging. The at least one constraining portion of the further mobile support is configured to pull the further at least one mobile device. Advantageously, the further mobile support also comprises an auxiliary support structure configured to constrain the remote device 90 to the further mobile support.

Installation Procedure 61

The present disclosure further relates to an installation procedure 61: the installation procedure 61 can be executed by the on-board controller 5 of the mobile device 2, by the control unit 15 of the antenna module 10 or by an auxiliary control unit. Preferably, the installation procedure 61 is executed by the control unit 15 of the antenna module.

The installation procedure 61 comprises moving the mobile support 40, carrying the antenna module 10, along a perimeter 8*a* of the working area 1 and/or along one or more boundary lines delimiting the working area 1 and/or at one or more obstacles 8*b* in the working area 1. During the movement of the mobile support 40, the antenna module 10 is configured to generate the information related to its position by means of the satellite detector 12.

The installation procedure 61 further comprises defining, as a function of the position assumed by the antenna module during said movement, a virtual perimeter representative of said perimeter 8*a* and/or one or more virtual boundary lines representative of said one or more boundary lines and/or one or more virtual obstacles representative of said one or more obstacles 8*b*.

Figure 15:
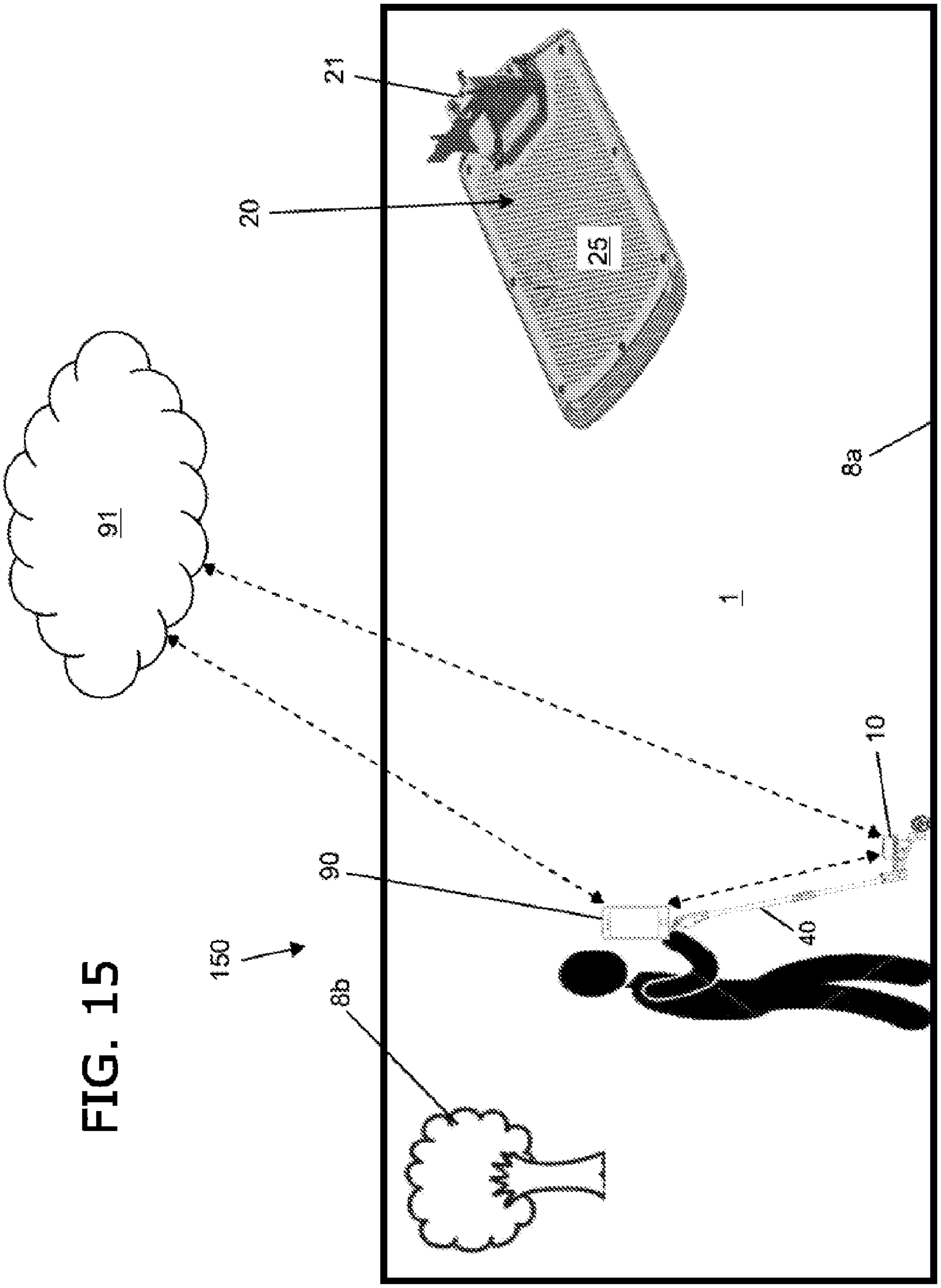
FIG. 15 is a schematic view of an assembly comprising an operator carrying the mobile support and the antenna module during an installation procedure or method.

The installation procedure 61 by means of the mobile support 40 is schematically shown in FIG. 15: the operator moves the mobile support 40, carrying the antenna module 10, along the perimeter 8*b* of the working area 1. The position information of the antenna module is transmitted to the remote server 91 and/or to the remote device 90. The remote device 90 is then configured to show the virtual perimeter 8*b* to the operator during the installation procedure itself.

It should be noted that during the position procedure, the charging station 20 does not carry the antenna module 10: in fact, the antenna module has been removed from the charging station 20 to mount it on the mobile support for executing the installation procedure. In particular, during the installation procedure 61, the antenna module is configured in the second arrangement.

In an embodiment, the installation procedure 61 includes detecting the position of the antenna module 10 only by means of the detector 12 of the antenna module itself.

In an alternative embodiment, the installation procedure 61 comprises executing the adjustment procedure 50 to obtain greater accuracy in defining the virtual perimeter. In such an embodiment, the installation procedure 61 can comprise arranging the mobile device 2 comprising the satellite locator 3, the remote communication system 4, for example a receiver or a transceiver 4, and the on-board controller 5. The installation procedure 61 thus comprises keeping the mobile device 2 in a fixed position, defining the reference station of the adjustment procedure 50, and moving the mobile support 40, carrying the antenna module 10, along the perimeter 8*a* of the working area 1 and/or along the boundary lines delimiting the working area 1 and/or at one or more obstacles 8*b* in the working area 1. The installation procedure 61 thus comprises defining the virtual perimeter and/or the virtual boundary lines and/or the virtual obstacles as a function:

- of the position assumed by the antenna module 10, detected by the satellite locator 12, during the movement of the mobile support 40, and
- of the position, in particular of the fixed position, of the mobile device 2 detected by the satellite locator 3.

The installation procedure 61 can comprise executing the adjustment procedure 50 by means of the RTK algorithm to accurately estimate the position assumed by the antenna module 10 when mounted on the mobile support 40 and moved in the working area.

Installation Method 500 by Means of the Mobile Support 40

Figure 18A:
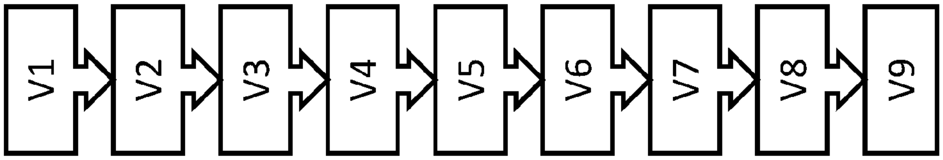
FIG. 18A is a flow chart summarizing an example of installation and operation of an assembly according to the present invention, in which an RTK algorithm is used.
Figure 18:
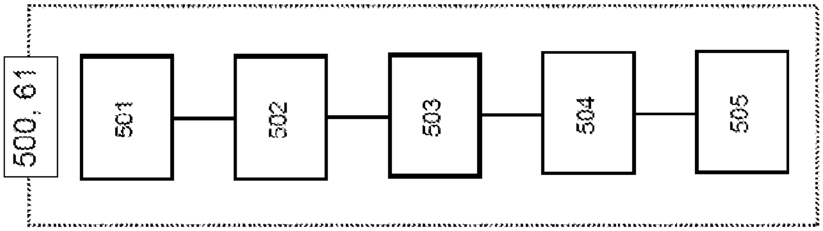
FIG. 18 is a flow chart representative of the second installation procedure executed by moving the mobile support.

The present disclosure further relates to an installation method 500, shown schematically in FIG. 18, by using the above-described mobile support 40. The installation method 500 is aimed at defining the boundaries of the working area 1 within which a self-driving mobile device 2 is configured to operate to execute the land maintenance operations. It should be noted that the installation method 500 corresponds, in terms of steps to be executed, to the installation procedure 61 described above.

The installation method 500 comprises a step of arranging 501 the mobile support 40, arranging 502 the antenna module 10 previously described, and constraining 503 the antenna module 10 to the constraining portion 45 of the mobile support 40.

The installation method 500 further includes moving 504 the mobile support 40 along a perimeter 8*a* of the working area 1 and/or one or more boundary lines delimiting the working area 1 and/or at one or more obstacles 8*b* in the working area 1, and defining 505 a virtual perimeter representative of the perimeter 8*a* and/or the virtual boundary lines representative of the boundary lines and/or the virtual obstacles 8*b* representative of the obstacles 8*b*. It should be noted that the virtual perimeter and/or virtual boundary lines can comprise geographical coordinates.

The movement of the mobile support 40 is determined by an operator who pushes, or pulls, the mobile support 40. In other words, the movement of the mobile support 40 is manual and actuated by an operator.

During the movement of the mobile device 2, the installation method 500 can further comprise the steps of sending the virtual perimeter and/or the virtual boundary lines to a remote device 90, for example a smartphone, a tablet or a computer, and of displaying, by means of a virtual map, the virtual perimeter and/or the virtual boundary lines of the working area 1, for example on a screen of the remote device 90.

The step of displaying the virtual map can be substantially contextual to the step of moving the mobile device 2, so as to allow the operator to display on screen the virtual perimeter which is outlined during the movement. Consequently, the mobile device 2 moves autonomously inside the working area 1 according to the virtual perimeter and/or the virtual boundary lines and/or the virtual obstacles 8*b* defined by the installation method 500 described above.

Installation Method 400 by Means of the Mobile Device 2

Figure 17:
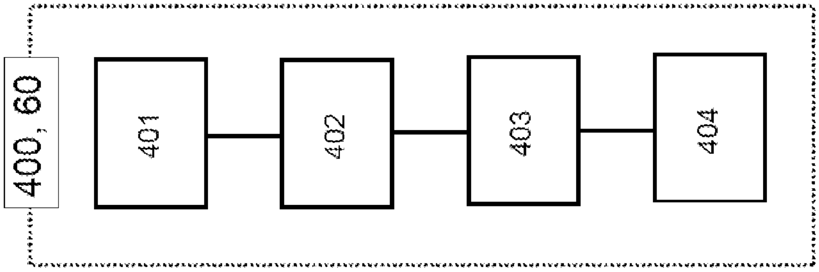
FIG. 17 is a flow chart representative of the first installation procedure executed by moving the mobile device.

The present disclosure further relates to an installation method 400, shown schematically in FIG. 17, of the above-described location system 200.

The installation method 400 substantially corresponds to the installation procedure 60 described above: in particular the installation method 400 comprises the steps useful for defining the working area 1 within which the mobile device 2 is configured to execute the land maintenance operations.

The installation method 400 comprises the step of arranging 401 an antenna module 10, of the type previously described. In summary, the antenna module 10 can comprise the casing 11 defining the containment volume, and the satellite position locator 12 housed in the containment volume and configured to emit a position signal representative of the position of said antenna module 10, in particular of the geolocation, in the form of geographical coordinates, of the antenna module 10. The antenna module 10 can further comprise a transmitter 14 housed in said containment volume and configured to transmit information remotely through a communication network. The antenna module 10 further comprises the control unit 15 housed in the internal containment volume 13 and operatively connected to the satellite locator and to the transmitter 14.

The control unit 15 is then configured to receive the position signal of the antenna module 10, generate at least one piece of information related to the position of the antenna module 10 based on said position signal and command the transmitter 14 to remotely transmit said at least one piece of information related to the position of the antenna module 10.

The installation method 400 includes maintaining the antenna module 10 in a substantially fixed position. The installation method 400 can comprise arranging the antenna module 10 in the seat 21 of the charging station 20. Alternatively, the installation method 400 can comprise the step of installing the antenna module 10 on the external installation 31.

The installation method 400 further comprises the step of arranging 402 at least one mobile device 2, of the type previously described, adapted to execute land maintenance operations inside the working area 1. The mobile device 2 comprises a respective satellite position locator configured to emit a position signal representative of the position of the at least one mobile device 2, in particular of the geolocation, in the form of geographical coordinates, of the mobile device 2, and a remote communication system 4, in particular comprising a receiver or a transceiver 14, and an on-board controller 5 operatively connected to the satellite locator and to the communication system 4. In accordance with the installation method 400, the mobile device 2 can be a manually-driven mobile device 2: the mobile device 2 therefore comprises at least the handle configured to allow an operator to manually guide the mobile device 2.

Alternatively, the mobile device 2 can be manually-driven and comprise a driver's seat adapted to accommodate an operator to allow the mobile device 2 to be driven. In this case, the mobile device 2 comprises driving movement means operable by the operator from the driver's seat.

The installation method 400 thus comprises a step of moving 403 the mobile device 2 along a perimeter 8*a* of the working area 1 and/or one or more boundary lines delimiting the working area 1 and/or at one or more obstacles 8*b* in the working area 1.

The installation method 400 then comprises a step of defining 404, at least as a function of the position signal emitted by the satellite locator 3 of the mobile device 2, a virtual perimeter representative of the perimeter 8*a* and/or of the virtual boundary lines representative of said one or more boundary lines and/or of the virtual obstacles 8*b*. In particular the virtual perimeter, and the virtual boundary lines comprising geographical coordinates.

In an embodiment, the method can include estimating the position of the mobile device 2, during said movement of the installation procedure, only by means of the satellite locator of the mobile device 2. In other words, the step of defining the virtual perimeter and/or the boundary lines and/or the virtual obstacles can be executed as a function of the signal emitted by the satellite locator 3 of the mobile device 2 alone.

In an alternative embodiment, the method can include estimating the position of the mobile device 2, during said movement of the installation procedure, by means of the adjustment procedure 50. In such a case the installation method 400 comprises determining the position of the mobile device 2 as a function:

- of the position signal emitted by the satellite locator 3 of the mobile device 2, and
- of the position signal emitted by the antenna module 10, in which the antenna module is maintained in a fixed position during the installation method 500.

In other words, the step of defining the virtual perimeter and/or the boundary lines and/or the virtual obstacles can be executed as a function of both the signal emitted by the satellite locator 3 of the mobile device 2, and the position signal emitted by the antenna module 10. In this case, the installation method 500 can comprise executing, during the movement of the mobile device, the adjustment procedure by means of the previously described RTK algorithm, in particular according to the position signal of the antenna module 10 and the position signal of the mobile device 2.

Optionally the installation method 400 further comprises the steps of sending the perimeter 8*a* and/or said one or more virtual boundary lines to a remote device 90, for example a smartphone, a tablet or a computer, and displaying, by means of a virtual map, the virtual perimeter and/or the virtual boundary lines of the working area 1, for example on a screen of the remote device 90.

The installation method 400 can further comprise a step of validating the virtual perimeter and/or the virtual boundary lines. The validation step can comprise a step of checking the consistency of said virtual perimeter and/or of the virtual boundary lines, in particular with a view to ascertaining that the positions comprised in said virtual perimeter define a closed outline. The validation step can comprise a step of reproducing the virtual perimeter and/or the virtual boundary lines, in particular aimed at piloting the mobile device 2 so as to autonomously travel the virtual perimeter and/or the virtual boundary lines and consequently provide evidence that the virtual perimeter and/or the virtual boundary lines have been correctly received by the mobile device. The validation step can comprise a step of displaying the virtual perimeter and/or virtual boundary lines on an interface of a remote device 90, in particular aimed at allowing a manual correction of said virtual perimeter and/or of said one or more virtual boundary lines by means of said interface.

Mobile Device in Fixed Position and Antenna Module on Mobile Support

The present disclosure further relates to an installation method 500 for defining a working area 1 for at least one mobile device 2 configured to execute maintenance operations. The mobile device 2 is notably of the self-driving type, such as a robot lawnmower. The installation method 500 can comprise embodiments in which the mobile device 2 is a mobile device belonging to a fleet (in particular to a fleet of a plurality of mobile devices served by a same charging station) and, in such a case, the installation method 500 is applicable to each of the mobile devices of the fleet.

The installation method 500 envisages that, notably for the entire duration of the installation, the mobile device 2 remains in a fixed position, in particular in a position in which it is electrically connected to a charging station 20, while an antenna module 10 is moved, notably manually by an operator using a mobile support 40 to which the antenna module 10 is provisionally constrained, to then be the antenna module 10 (at the end of the installation method) stably associated with the charging station 20 or, alternatively, with an external installation 31. The installation method 500 is preferably based on the use of the real-time kinematics technique (also called RTK technique in industry jargon), according to which the GNSS position of a moving device is made more accurate and reliable by a systematic reference to the GNSS position of a stationary device.

Figure 15A:
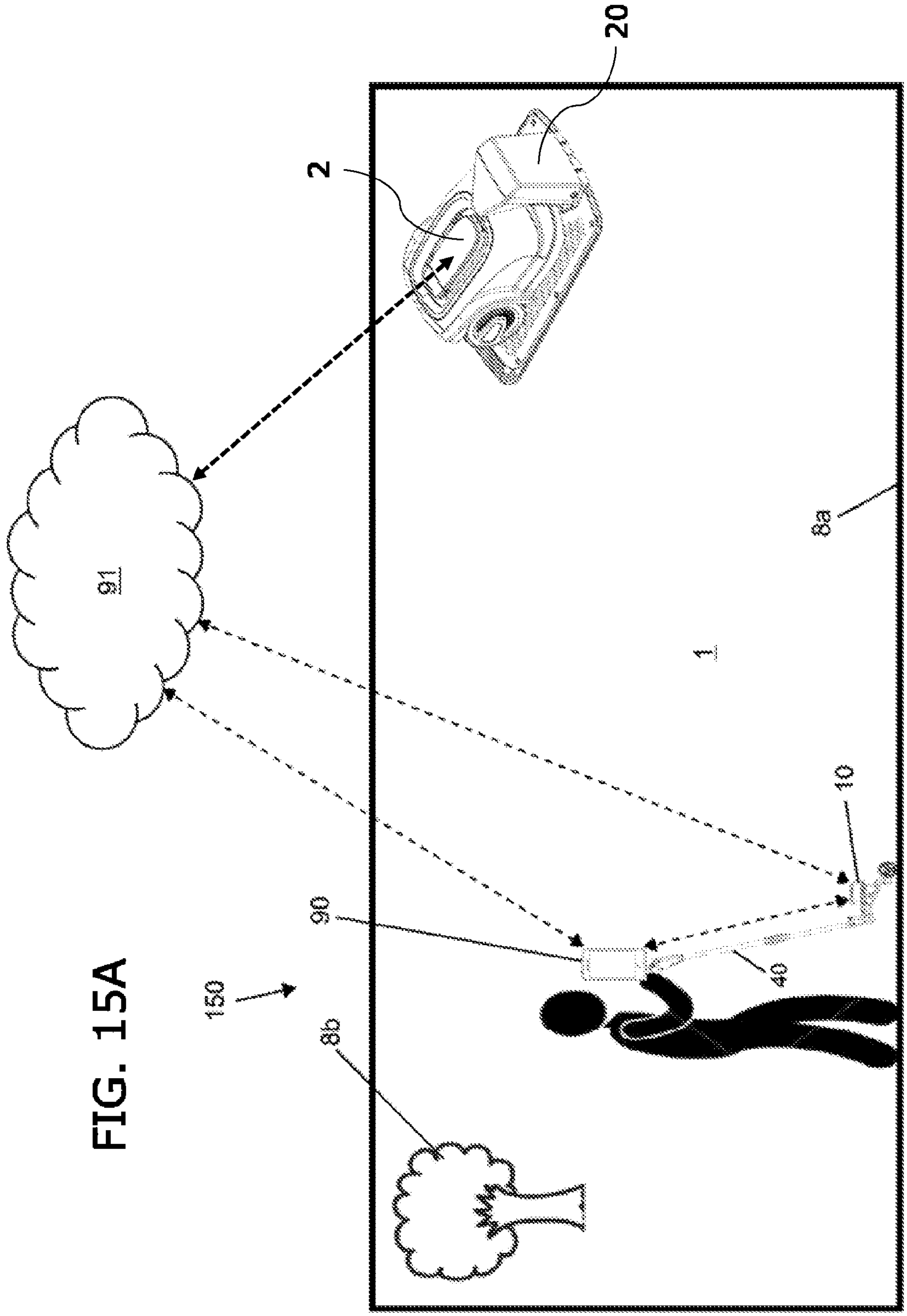
FIG. 15A is a further schematic view of an assembly according to the present invention, according to an embodiment of an installation method according to the present invention.

For the purpose of a detailed exposition of the installation method 500 according to the present invention, reference will be made in particular to the depiction in FIG. 15*a*, to be understood in any case given merely by way of non-limiting explanation.

The installation method 500 envisages arranging at least one mobile device 2 of the type previously described, a charging station 20 of the type previously described, an antenna module 10 of the type previously described and a mobile support 40 of the type previously described (since the essential features of mobile device 2, charging station 20, antenna module 10 and mobile support 40 have already been exhaustively and clearly set forth in the present disclosure, explicit reference is made here to the previous sections of the present disclosure with regard to precisely the features, in particular the essential features, of the antenna module 10, the mobile device 2, the charging station 20 and the mobile support 40).

The step of arranging the at least one mobile device 2 preferably comprises the step of positioning the at least one mobile device 2 with respect to the charging station 21 in a relative position (such as that depicted in FIG. 15A), in which an electrical contact condition is established between the charging station 21 and the at least one mobile device 2. Advantageously, the at least one mobile device 2 and the charging station 21 comprise respective members of a releasable-type connection system, configured to allow a charging system 26 of the charging station 21 to provide electrical power to at least one on-board battery of the at least one mobile device 2. The step of arranging the at least one mobile device 2 can thus comprise the step of positioning the at least one mobile device 2 with respect to the charging station 21 in a relative position whereby the members of the connection system respectively on board the mobile device 2 and the charging station 21 are engaged with each other.

The step of arranging the antenna module 10 preferably comprises the step of extracting the antenna module 10 from the charging station 20. Advantageously, the charging station 20 comprises a seat 21 and optionally a cover 23 switchable between a use position, in which the cover 23 acts to close the seat 21, and a service position, in which the cover 23 does not act to close the seat 21, so that the seat 21 is accessible from the outside. Advantageously, the seat 21 of the charging station 20 houses the antenna module 10, which can be extracted from the seat 21 when the cover 23 is in the service position. The step of arranging the antenna module 10 can therefore comprise the step of extracting the antenna module 10 from the seat 21 of the charging station 20 as a result of possibly switching the cover 23 from the use position to the service position.

The installation method 500 includes constraining the antenna module 10 to the mobile support 40. To such an end, the mobile support 40 can comprise a constraining portion 45, notably arranged at a bottom portion 43, and the installation method 500 can comprise the step of constraining the antenna module 10 to the constraining portion 45 of the mobile support 40.

The installation method 500 includes maintaining the at least one mobile device 2 in a fixed position. In particular, the fixed position of the at least one mobile device 2 maintained during the installation method 500 is the position depicted in the example of FIG. 15*a*, i.e., the position in which the at least one mobile device 2 is established and the charging station 21 is in electrical contact condition, preferably the position in which the members of the connection system respectively on board the mobile device 2 and the charging station 21 are engaged with each other.

The installation method 500 includes moving the mobile support 40 (to which the antenna module 10 is constrained). Such a step of moving the antenna module 10 by means of the mobile support 40 can be executed manually by the operator, who pushes or drags the mobile support 40 in particular along one or more boundary lines delimiting the working area 1.

The installation method 500 includes calculating, during the moving step, a correct position of the antenna module 10, said correct position being preferably expressed in the form of geographical coordinates. The calculation of the correct position of the antenna module 10 can presuppose the execution of an RTK algorithm, according to which the correct position of the antenna module 10 is obtained both as a function of the position signal of the antenna module 10, and as a function of the position signal of a locator on board the at least one mobile device 2. In other words, a procedure which can be called "adjustment procedure" is advantageously executed, since an adjustment and/or correction of the position signal of a mobile element (the antenna module 10) is carried out based on the position signal of an element kept instead in a fixed position (the locator on board the at least one mobile device 2).

The installation method 500 includes defining, as a function of the correct position of the antenna module 10, one or more virtual boundary lines delimiting what will then be the working area 1 for the at least one mobile device 2. In particular, the virtual boundary lines can belong to a perimeter separating the working area 1 from the outside and/or can be inside the working area 1, thereby delimiting regions (e.g., regions in which obstacles are present and/or regions occupied by flowerbeds, shrubs, swimming pools, and so on) which are intended to not be crossed by the at least one mobile device 2. Such a step of defining the one or more virtual boundary lines leads to a mapping of the working area 1, i.e., to the generation of a virtual map which will then govern the operation of the at least one mobile device 2 in the working area 1.

In a preferred embodiment of the installation method according to the invention, the mapping of the working area 1 also includes defining the position of the charging station 20, in particular the geographical coordinates of the charging station 20. Advantageously, the definition of the position of the charging station 20 includes a step of executing a verification regarding the existence of an electrical contact condition between the charging station 20 and the at least one mobile device 2. Subsequently, the position of the at least one mobile device 2 is determined, simply by executing a detection of the position signal of the locator on board the at least one mobile device 2, or by using an adjustment procedure according to the RTK algorithm. Finally, the position of the charging station 20 is obtained starting from the position of the at least one mobile device 2.

In a first option, the position of the charging station 20 is assumed to be coincident with the position of the at least one mobile device 2. In a second option, the position of the charging station 20 is calculated based on the position of the at least one mobile device 2 and a known offset, such a second option being notably adoptable when the antenna module 10 is intended to then be applied to an external installation 31 located remotely with respect to the charging station 20.

Advantageously, once the mapping of the working area 1 is completed with the generation of a virtual map, the installation method comprises the step of storing the geographical coordinates of the virtual map of the working area 1 in a memory, in particular in a non-volatile memory, of the at least one mobile device 2 and optionally also in a memory, in particular in a non-volatile memory, of the antenna module 10.

Once the installation method is completed, the antenna module 10 is disengaged from the mobile support 40 to be placed at the charging station 20 (in particular again housed in the special seat 21 of the charging station 20), or at an external installation 31 (in particular constrained to the external installation 31 by means of a fixing bracket). FIG. 15A highlights how the installation method according to the present invention preferably makes use of a remote infrastructure, such as the remote server 91, and of a remote device 90, such as a smartphone or a tablet or a computer. As depicted in FIG. 15*a*, the remote infrastructure and the remote device 90 are operatively connected to each other by means of a communication network, for example an internet network, and, preferably by means of the same communication network, are operatively connected to the at least one mobile device 2 and/or to the charging station 20 and/or to the antenna module 10.

With regard to the remote device 90, it should be underlined that it, during the execution of the installation method, it advantageously receives from the antenna module 10 or from the remote infrastructure (preferably in real time) the geographical coordinates of the virtual map of the working area 1. By arranging the remote device 90 with display means (e.g., a screen), the installation method according to the invention can comprise a step of displaying (preferably in real time) the virtual map of the working area 1 by display means of the mobile support 40. Thereby, the operator can have immediate feedback on the definition of the working area 1, so that he can take any corrective actions he deems appropriate.

Still with regard to the remote device 90, it should be underlined that it, during the execution of the installation method, it is advantageously applied to the mobile support 40, preferably according to a position and/or an orientation whereby the operator is ensured an adequate visibility of the virtual map of the working area 1, when such a virtual map is displayed by the display means of the remote device 90. In particular, the application of the remote device 90 to the mobile support 40 occurs by means of an auxiliary support structure 47 integrated in the mobile support 40 or constrained to the mobile support 40. Therefore, the installation method according to the invention can comprise a step of applying a remote device 90 to the mobile support 40.

The installation method 500 according to the present invention for defining a working area 1 for at least one mobile device 2 configured to execute maintenance operations allows to obtain numerous advantages and is clearly inventive in light of the state of the art. In fact, in the installation method according to the present invention, the element of the assembly which in the operating step is in motion (i.e., the at least one mobile device with its own on-board locator) acts instead as a stationary element, while the element of the assembly which in the operating step is stationary (i.e., the antenna module 10) acts instead as a moving element, in particular by means of engagement with the mobile support 40. It is clear that such a reversal of roles cannot be considered in any way suggested by the known art solutions.

Real-Time Kinematics

FIG. 18A shows, in the form of a flow chart, an example of real-time kinematics, i.e., of a real algorithm, applied to an assembly according to the present invention, said example being reported herein merely by way of non-limiting explanation.

In a first step V1, the position data of the perimeter of the working area 1, of the charging station 20 in the working area and optionally also of further noteworthy points in the working area are collected (for example, any noteworthy points can be reference trajectory points preferably to be followed for the returns of the mobile device 2 to the charging station 20). Such position data can be collected with the assembly according to the present invention according to the installation arrangement referred to in FIG. 15*a*, in which the element moved by the operator is the antenna module 10 (notably with the aid of the mobile support 40), or with the assembly according to the present invention according to the installation arrangement referred to in FIG. 16A, in which the element moved by the operator is represented by the mobile device 2 with its own locator on board. In both options, the collection of position data uses the RTK algorithm, i.e., the above-described adjustment procedure.

In a second step V2, the collected position data is sent by means of a communication network to a remote infrastructure, for example to the remote server 91 (the sending of the position data can advantageously occur in real time during the collection).

In a third step V3, at the level of the remote infrastructure, for example of the remote server 91, a mapping operation is executed, by means of which the virtual map of the working area 1 is generated (the generation of the virtual map can also advantageously occur in real time).

In a fourth step V4, the virtual map of the working area 1 is sent to the remote device 90 by means of a communication network, for a display to the operator by means of the screen of the remote device 90.

Advantageously, the virtual map is displayed on the screen of the remote device 90 in real time, so that the operator is provided with an immediate feedback regarding the conformity between the virtual map and the working area 1. Optionally, in the event of conformity, the fourth step V4 can require an explicit validation by the operator, possibly following the execution of corrective actions aimed at establishing such conformity.

In a fourth step V5, the position data representative of the working area 1, as defined at the conclusion of the mapping, are sent, by means of a communication network, to the control unit of the mobile device 2, and optionally also to the control unit of the charging station 20, so as to be stored in a non-volatile memory of the mobile device 20.

In a sixth step V6, during operation, the position data representative of the working area 1 is read from the non-volatile memory of the mobile device 2, whereby the mobile device 2 can navigate in the working area 1 based on such data, thus knowing the geographical coordinates of the boundary lines, of any obstacles and of the charging station 20.

In a seventh step V7, always during operation, the position signal of the mobile device 2 and the position signal of the charging station 20 are detected, so as to make it possible to compare the positions expressed by said position signals with the corresponding positions as well as from previous mapping of the working area 1 and so as to consequently make it possible to appreciate the accuracy of the position signals.

In an eighth step V8, always during operation, the position signals are transmitted (advantageously in real time) to a remote infrastructure, for example to the remote server 91, by means of a communication network such as the internet network. The transmission of position signals can occur at a constant rate, or at a variable rate. Based on the position signals, correction parameters are then calculated (always advantageously in real time) by the remote infrastructure, in particular by the remote server 91.

In a ninth step V9, always during operation, the correction parameters are transmitted (advantageously in real time) to the mobile device 2, and possibly also to the charging station 20, by means of a communication network such as the internet network. The transmission of the correction parameters can occur at a constant rate, or at a variable rate. The correction parameters, once received from the mobile device 2, are finally used by the mobile device 2 to correct its position in the working area 1.

The frequency with which the position signals are transmitted from the mobile device 2 to the server 91 and/or with which the correction parameters are transmitted from the server 91 to the mobile device 2 can, according to a first option, occur according to a constant periodicity. In particular, such a constant periodicity can be between one transmission per second to one transmission every ten minutes.

It should be noted that transmissions of position signals and correction parameters at a relatively high frequency make it possible to execute recurrent position corrections of the mobile device 2 and therefore ensure a very precise, safe and reliable navigation of the mobile device 2 in the working area 1. On the other hand, transmissions of position signals and correction parameters at a relatively high frequency require a high bandwidth consumption and therefore increase the costs associated with the navigation of the mobile device 2 in the working area 1. In contrast, transmissions of position signals and correction parameters at a relatively low frequency allow to optimize the costs associated with the navigation of the mobile device 2, albeit at the expense of an ideally lower accuracy of the position of the mobile device 2 during navigation in the working area 1.

Alternatively, the frequency with which the position signals are transmitted from the mobile device 2 to the server

91 and/or with which the correction parameters are transmitted from the server 91 to the mobile device 2 can, according to a second option, occur according to a variable frequency. Advantageously, it can be envisaged that the transmissions of position signals and correction parameters occur at a relatively high frequency when the mobile device 2 is assumed to be positioned in a region of the working area 1 deemed potentially critical (for example in a peripheral region of the working area 1) and instead at a relatively low frequency when the mobile device 2 is assumed to be positioned in a region of the working area 1 not deemed potentially critical (for example in a central region of the working area 1).

The invention claimed is:

1. An assembly comprising:

a charging station configured to electrically charge a mobile device adapted to execute land maintenance operations, an antenna module comprising:

a casing defining a containment volume, a satellite position locator housed in said containment volume and configured to generate and/or emit a position signal representative of the position of said antenna module, wherein a seat configured to house said antenna module is defined in said charging station, wherein the casing of the antenna module can be removably constrained to the charging station and wherein said assembly can be articulated at least according to:

a first arrangement in which the antenna module is constrained to the charging station and located in said seat and a second arrangement in which the antenna module is separate from the charging station and located or can be located remotely from the charging station.

2. The assembly according to claim 1, wherein, in said second arrangement, the antenna module is located remotely from the charging station.

3. The assembly according to claim 1, wherein said satellite locator is a satellite position locator configured to generate and/or emit a position signal representative of the geolocation, in the form of geographical coordinates, of said antenna module.

4. The assembly according to claim 1, wherein the configuration of said assembly is such that, in said second arrangement of said assembly, taking any point belonging to said antenna module and taking any point belonging to said charging station, said points are separate from each other by a distance on a horizontal plane greater than one meter.

5. The assembly according to claim 1, wherein the configuration of said assembly is such that in said second arrangement of said assembly there is no contact between said antenna module and said charging station.

6. The assembly according to claim 1, wherein said charging station comprises a coupling system configured to constrain said casing of the antenna module in said seat.

7. The assembly according to claim 1, wherein the charging station comprises a cover arranged to close the seat, wherein the cover is movable between:

a use position, in which the cover prevents access to said seat; and a service position, in which the cover allows access to said seat.

8. The assembly according to claim 7, wherein the cover is constrained to the charging station by means of releasable hinges or hooks so as to allow switching the position of the cover from the use position to the service position and vice versa.

9. The assembly according to claim 1, said assembly further comprising a fixing bracket configured to constrain the antenna module to an external installation, when in the second arrangement, wherein said fixing bracket comprises a support portion configured to be constrained to said casing of the antenna module and an anchoring portion configured to be constrained to said external installation.

10. The assembly according to claim 1, wherein said charging station comprises an auxiliary socket configured to electrically connect to the antenna module and power the antenna module, to charge the battery of the antenna module and/or to provide electrical power to a control unit and/or to a transmitter and/or to a satellite locator of the antenna module.

11. The assembly according to claim 1, wherein said charging station comprises:

at least one connector configured to establish an electrical connection between said charging station and a power supply network and at least one charging system configured to charge a battery of the mobile device.

12. The assembly according to claim 1, wherein said antenna module further comprises:

a transmitter housed in said containment volume and configured to transmit information remotely through a communication network;

a control unit housed in said containment volume and operatively connected to said satellite locator and to said transmitter, said control unit being configured at least for:

receiving said position signal from the antenna module;

generating at least one piece of information related to the position of the antenna module based on said position signal and commanding the transmitter to remotely transmit said at least one piece of information related to the position of the antenna module.

13. An assembly process of an antenna module, said process comprising the steps of:

arranging an antenna module comprising:

a casing defining a containment volume;

a satellite position locator housed in said containment volume and configured to emit a position signal representative of the position of said antenna module;

a transmitter housed in said containment volume and configured to transmit information remotely through a communication network;

a control unit housed in said containment volume and operatively connected to said satellite locator and to said transmitter, said control unit being configured at least for:

receiving said position signal from the antenna module;

generating at least one piece of information related to the position of the antenna module based on said position signal; and commanding the transmitter to remotely transmit said at least one piece of information related to the position of the antenna module;

arranging a charging station configured to electrically charge the battery of a mobile device adapted to execute land maintenance operations, said charging station comprising:

at least one connector configured to establish a connection between said charging station and a power supply network;

at least one charging system configured to charge a battery of the mobile device;

a seat configured to house said antenna module;

arranging the antenna module in said seat of the charging station.

14. The assembly process according to claim 13, wherein the step of arranging the antenna module in said location of the charging station comprises the step of constraining said antenna module to said casing.

* * * * *